US012376122B2

(12) United States Patent
Guan

(10) Patent No.: US 12,376,122 B2
(45) Date of Patent: Jul. 29, 2025

(54) BEAM INDICATION METHOD AND COMMUNICATIONS APPARATUS

(71) Applicant: HUAWEI TECHNOLOGIES CO., LTD., Shenzhen (CN)

(72) Inventor: Peng Guan, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/088,352

(22) Filed: Dec. 23, 2022

(65) Prior Publication Data

US 2023/0140502 A1 May 4, 2023

Related U.S. Application Data

(63) Continuation of application No. PCT/CN2021/102219, filed on Jun. 24, 2021.

(30) Foreign Application Priority Data

Jun. 24, 2020 (CN) .......................... 202010591523.3

(51) Int. Cl.
*H04B 7/06* (2006.01)
*H04B 7/08* (2006.01)
*H04L 5/00* (2006.01)

(52) U.S. Cl.
CPC ......... *H04B 7/0695* (2013.01); *H04B 7/0626* (2013.01); *H04B 7/088* (2013.01); *H04L 5/0053* (2013.01)

(58) Field of Classification Search
CPC .... H04B 7/0626; H04B 7/088; H04B 7/0686; H04B 7/0695; H04B 7/06952;
(Continued)

(56) References Cited

U.S. PATENT DOCUMENTS 9,788,324 B2 * 10/2017 Yan .................. H04L 5/0098
9,871,573 B2 * 1/2018 Sun .................. H04B 7/0632
(Continued)

FOREIGN PATENT DOCUMENTS

CN 110731055 A 1/2020
CN 111130604 A 5/2020
(Continued)

OTHER PUBLICATIONS

"On beam indication, measurement, and reporting," 3GPP TSG-RAN WG1 #90bis, Prague, Czech Republic, R1-1718433, Total 9 pages, 3rd Generation Partnership Project, Valbonne, France (Oct. 9-13, 2017).

(Continued)

*Primary Examiner* — James M Perez
(74) *Attorney, Agent, or Firm* — Leydig, Voit & Mayer, Ltd.

(57) ABSTRACT

This application discloses a beam indication method and a communications apparatus. The method includes: sending configuration information to a terminal device, wherein the configuration information is used to indicate to determine, based on a unified beam indicator, beams used by the terminal device to transmit a plurality of physical channels and/or physical signals; and sending first information to the terminal device; wherein the first information is used to indicate the unified beam indicator; the unified beam indicator is associated with at least one downlink transmission configuration indicator (TCI) state identifier and at least one uplink TCI state identifier; and the downlink TCI state identifier is used to indicate a receive beam of a downlink physical channel, and the uplink TCI state identifier is used to indicate a transmit beam of an uplink physical channel. It can be learned it is helpful to reduce beam indication signaling overheads.

20 Claims, 19 Drawing Sheets

(58) Field of Classification Search
CPC .............. H04B 7/0696; H04B 7/06962; H04B 7/06966; H04L 5/003; H04L 5/0053
See application file for complete search history.

(56) References Cited

U.S. PATENT DOCUMENTS

| | | | | |
|---|---|---|---|---|
| 10,009,087 | B2* | 6/2018 | Liu | H04B 7/0639 |
| 10,200,104 | B2* | 2/2019 | Sun | H04B 17/345 |
| 10,469,150 | B2* | 11/2019 | Liu | H04B 7/0413 |
| 10,582,479 | B2* | 3/2020 | Liu | H04W 72/21 |
| 10,840,989 | B2* | 11/2020 | Sun | H04B 17/345 |
| 10,873,382 | B2* | 12/2020 | Zhang | H04W 72/046 |
| 10,951,296 | B1* | 3/2021 | Li | H04L 27/2614 |
| 11,051,182 | B2* | 6/2021 | Tang | H04B 7/088 |
| 11,211,988 | B2* | 12/2021 | Liu | H04B 7/0478 |
| 11,240,794 | B2* | 2/2022 | Zhang | H04B 7/06 |
| 11,336,359 | B2* | 5/2022 | Zhang | H04L 5/0053 |
| 11,361,223 | B2* | 6/2022 | Ge | G06N 3/084 |
| 11,395,267 | B2* | 7/2022 | Liu | H04L 5/0051 |
| 11,399,299 | B2* | 7/2022 | Liu | H04L 1/0026 |
| 11,456,786 | B2* | 9/2022 | Wang | H04B 7/0478 |
| 11,626,952 | B2* | 4/2023 | Zhang | H04W 72/54 370/329 |
| 11,653,404 | B2* | 5/2023 | Zhang | H04L 5/0094 370/216 |
| 11,716,647 | B2* | 8/2023 | Liu | H04L 5/0048 370/252 |
| 11,777,686 | B2* | 10/2023 | Farag | H04L 5/0053 370/329 |
| 11,848,729 | B2* | 12/2023 | Wang | H04L 5/0003 |
| 11,888,570 | B2* | 1/2024 | Takeda | H04B 7/088 |
| 11,895,054 | B2* | 2/2024 | Zhang | H04L 5/0023 |
| 11,996,923 | B2* | 5/2024 | Zhou | H04B 7/0695 |
| 12,047,963 | B2* | 7/2024 | Zhang | H04B 7/0695 |
| 12,219,545 | B2* | 2/2025 | Zhang | H04B 7/0695 |
| 2016/0149630 | A1 | 5/2016 | Liu | H04B 7/0639 370/329 |
| 2018/0294862 | A1* | 10/2018 | Liu | H04B 7/0413 |
| 2019/0268053 | A1* | 8/2019 | John Wilson | H04B 7/0695 |
| 2019/0306924 | A1* | 10/2019 | Zhang | H04B 7/063 |
| 2019/0387418 | A1* | 12/2019 | Yerramalli | H04B 7/0617 |
| 2020/0014453 | A1* | 1/2020 | Takeda | H04B 7/088 |
| 2020/0053717 | A1* | 2/2020 | Zhou | H04W 72/21 |
| 2020/0154467 | A1* | 5/2020 | Gong | H04L 5/0055 |
| 2020/0280409 | A1* | 9/2020 | Grant | H04L 5/0044 |
| 2021/0184812 | A1* | 6/2021 | MolavianJazi | H04L 1/0045 |
| 2021/0185512 | A1* | 6/2021 | Zhou | H04B 7/0695 |
| 2021/0185664 | A1* | 6/2021 | Venugopal | H04L 5/0094 |
| 2021/0194654 | A1* | 6/2021 | Zhang | H04L 5/0007 |
| 2021/0195624 | A1* | 6/2021 | Venugopal | H04L 5/0094 |
| 2021/0195626 | A1* | 6/2021 | Venugopal | H04W 72/51 |
| 2021/0314953 | A1* | 10/2021 | Park | H04W 72/046 |
| 2021/0329563 | A1* | 10/2021 | Wu | H04W 52/42 |
| 2022/0036171 | A1* | 2/2022 | Ge | G06N 3/08 |
| 2022/0247538 | A1* | 8/2022 | Farag | H04B 7/088 |
| 2022/0376880 | A1* | 11/2022 | Zhang | H04B 7/0695 |
| 2023/0008939 | A1* | 1/2023 | Gao | H04W 72/12 |
| 2023/0044880 | A1* | 2/2023 | Cao | H04L 5/0094 |
| 2023/0045308 | A1* | 2/2023 | Guan | H04L 5/0051 |
| 2023/0106730 | A1* | 4/2023 | Chen | H04L 5/0064 370/329 |
| 2023/0121938 | A1* | 4/2023 | Zhou | H04W 72/23 375/347 |
| 2023/0128138 | A1* | 4/2023 | Li | H04L 5/0057 370/329 |
| 2023/0140502 | A1* | 5/2023 | Guan | H04L 5/0053 375/262 |
| 2023/0188197 | A1* | 6/2023 | Zhang | H04B 7/0634 370/329 |
| 2023/0224120 | A1* | 7/2023 | Tian | H04L 5/0094 370/329 |
| 2023/0231673 | A1* | 7/2023 | Grant | H04B 7/0617 370/329 |
| 2023/0247618 | A1* | 8/2023 | Yuan | H04L 5/0023 370/328 |
| 2023/0268973 | A1* | 8/2023 | Fan | H04W 36/0085 370/252 |
| 2023/0291525 | A1* | 9/2023 | Zhou | H04B 7/088 |
| 2023/0319591 | A1* | 10/2023 | Zhou | H04W 16/28 370/329 |
| 2023/0337313 | A1* | 10/2023 | Yi | H04L 5/0048 |
| 2023/0354117 | A1* | 11/2023 | Yuan | H04W 36/0094 |
| 2023/0421273 | A1* | 12/2023 | Fan | H04W 24/08 |
| 2024/0064813 | A1* | 2/2024 | Park | H04W 76/20 |
| 2024/0333369 | A1* | 10/2024 | Yuan | H04B 7/0695 |
| 2024/0356706 | A1* | 10/2024 | Yuan | H04B 7/0696 |
| 2025/0007677 | A1* | 1/2025 | Yuan | H04L 5/0035 |
| 2025/0016693 | A1* | 1/2025 | Liu | H04W 52/367 |
| 2025/0048360 | A1* | 2/2025 | Deghel | H04L 5/0053 |
| 2025/0048369 | A1* | 2/2025 | Gao | H04L 5/0023 |
| 2025/0055631 | A1* | 2/2025 | Fan | H04L 5/0053 |
| 2025/0062818 | A1* | 2/2025 | Gao | H04L 5/0053 |

FOREIGN PATENT DOCUMENTS

| | | |
|---|---|---|
| EP | 3018960 A1 | 5/2016 |
| EP | 4106458 A1 | 12/2022 |
| WO | 2018232090 A1 | 12/2018 |
| WO | 2019049096 A1 | 3/2019 |
| WO | 2020063334 A1 | 4/2020 |
| WO | 2020083053 A1 | 4/2020 |
| WO | 2020098661 A1 | 5/2020 |
| WO | 2020108405 A1 | 6/2020 |

OTHER PUBLICATIONS

"New WID: Further enhancements on MIMO for NR," 3GPP TSG RAN Meeting #86, Sitges, Spain, RP-193133, Total 5 pages, 3rd Generation Partnership Project, Valbonne, France (Dec. 9-12, 2019).

"3rd Generation Partnership Project; Technical Specification Group Radio Access Network; NR; Requirements for support of radio resource management (Release 16)," 3GPP TS 38.133 V16.3.0, Total 1169 pages, 3rd Generation Partnership Project, Valbonne, France (Mar. 2020).

"3rd Generation Partnership Project; Technical Specification Group Radio Access Network; NR; Physical channels and modulation (Release 16)," 3GPP TS 38.211 V16.1.0, pp. 1-130, 3rd Generation Partnership Project, Valbonne, France (Mar. 2020).

"3rd Generation Partnership Project; Technical Specification Group Radio Access Network; NR; Physical layer procedures for control (Release 16)," 3GPP TS 38.213 V16.1.0, pp. 1-156, 3rd Generation Partnership Project, Valbonne, France (Mar. 2020).

"3rd Generation Partnership Project; Technical Specification Group Radio Access Network; NR; Multiplexing and channel coding (Release 16)," 3GPP TS 38.212 V16.1.0, pp. 1-146, 3rd Generation Partnership Project, Valbonne, France (Mar. 2020).

"3rd Generation Partnership Project; Technical Specification Group Radio Access Network; NR; Physical layer procedures for data (Release 16)," 3GPP TS 38.214 V16.1.0, pp. 1-151, 3rd Generation Partnership Project, Valbonne, France (Mar. 2020).

"3rd Generation Partnership Project; Technical Specification Group Radio Access Network; NR; User Equipment (UE) radio access capabilities (Release 16)," 3GPP TS 38.306 V16.0.0, pp. 1-64, 3rd Generation Partnership Project, Valbonne, France (Mar. 2020).

"3rd Generation Partnership Project; Technical Specification Group Radio Access Network; NR; Medium Access Control (MAC) protocol specification (Release 16)," 3GPP TS 38.321 V16.0.0, pp. 1-141, 3rd Generation Partnership Project, Valbonne, France (Mar. 2020).

"3rd Generation Partnership Project; Technical Specification Group Radio Access Network; NR; Radio Resource Control (RRC) protocol specification (Release 16)," 3GPP TS 38.331 V16.0.0, pp. 1-835, 3rd Generation Partnership Project, Valbonne, France (Mar. 2020).

Fraunhofer Iis et al., "Enhancements on UE multi-beam operation," 3GPP TSG RAN WG1 Meeting #97, Prague, Czech Republic,

(56) References Cited

OTHER PUBLICATIONS

R1-1908973, Total 7 pages, 3rd Generation Partnership Project, Valbonne, France (Aug. 26-30, 2019).
Sony, "Further enhancement on multi-beam operation," 3GPP TSG RAN WG1#104e, E-meeting, R1-2100844, Total 18 pages, 3rd Generation Partnership Project, Valbonne, France (Jan. 25-Feb. 5, 2021).
Ericsson, "On beam indication, measurement, and reporting," 3GPP TSG-RAN WG1 NR Ad Hoc #3, Nagoya, Japan, R1-1716350, Total 13 pages, 3rd Generation Partnership Program, Valbonne, France (Sep. 18-21, 2017).
CN/202010591523.3, Office Action, Aug. 1, 2024.

\* cited by examiner

BEAM INDICATION METHOD AND COMMUNICATIONS APPARATUS

CROSS-REFERENCE TO RELATED APPLICATIONS

This application is a continuation of International Application No. PCT/CN2021/102219, filed on Jun. 24, 2021, which claims priority to Chinese Patent Application No. 202010591523.3, filed on Jun. 24, 2020. The disclosures of the aforementioned applications are hereby incorporated by reference in their entireties.

TECHNICAL FIELD

Embodiments of this application relate to the field of communications technologies, and in particular, to a beam indication method and a communications apparatus.

BACKGROUND

In a high-frequency communications system, to overcome a path loss, an access network device and a terminal device each usually form an analog beam by using a directional high-gain antenna array, to perform communication. Only when a sending direction is aligned with a receiving direction, normal communication can be implemented between the access network device and the terminal device. For example, in downlink communication (the access network device performs sending and the terminal device performs receiving), a transmit beam of the access network device needs to be aligned with a receive beam of the terminal device. In uplink communication (the access network device performs receiving and the terminal device performs sending), a receive beam of the access network device needs to be aligned with a transmit beam of the terminal device. A transmit beam of the access network device and a receive beam of the terminal device that align with each other may be referred to as a downlink beam pair or downlink beams. A receive beam of the access network device and a transmit beam of the terminal device that align with each other may be referred to as an uplink beam pair or uplink beams.

For each physical channel or physical signal, the access network device may indicate, to the terminal device, how to receive a physical downlink channel or physical downlink signal, or may indicate, to the terminal device, how to send a physical uplink channel or physical uplink signal. The access network device may perform downlink beam indication or uplink beam indication for the terminal device by using beam indication signaling, such as higher layer signaling (such as RRC signaling or MAC-CE signaling) and/or physical layer signaling (such as DCI signaling). Downlink beam indication is performed based on a transmission configuration indicator state (TCI state), and uplink beam indication is performed based on a spatial relation.

The access network device independently performs beam indication on different physical channels or physical signals. For example, the access network device indicates, by using a three-level signaling structure of radio resource control (RRC) signaling 1+medium access control-control element (MAC-CE) signaling 1+downlink control information (DCI) signaling 1, a beam for receiving a PDSCH by the terminal device. The RRC signaling 1 is used to configure a plurality of TCI states for the PDSCH, the MAC-CE signaling 1 is used to activate one or more TCI states for the PDSCH, the DCI signaling 1 is used to indicate one activated TCI state, and a receive beam indicated by the TCI state is used by the terminal device to receive the PDSCH scheduled by using the DCI signaling 1.

The access network device indicates, by using a two-level signaling structure of radio resource control (RRC) signaling 2+medium access control-control element (MAC-CE) signaling 2, a beam for receiving a PDCCH by the terminal device. The RRC signaling 2 is used to configure a plurality of TCI states for the PDCCH, the MAC-CE signaling 2 is used to indicate one TCI state for a specific control resource set (CORESET) of the PDDCH, and a receive beam indicated by the TCI state is used by the terminal device to receive the PDCCH in the specific control resource set.

It can be learned that in the conventional technology, the access network device needs to independently indicate beams of different physical channels or physical signals by using a large amount of beam indication signaling. Therefore, beam indication signaling overheads are relatively large.

SUMMARY

This application provides a beam indication method and a communications apparatus, to help reduce beam indication signaling overheads.

According to a first aspect, this application provides a beam indication method. The method includes: a terminal device receives configuration information sent by an access network device, where the configuration information is used to indicate the terminal device to transmit a plurality of physical channels and/or physical signals based on a unified beam; the terminal device receives downlink control information (DCI) signaling sent by the access network device; and the terminal device determines, based on the configuration information and a beam indicated by the DCI signaling, a beam used by the terminal device to transmit a first physical channel or signal, where the beam used by the terminal device to transmit the first physical channel or signal is the unified beam. The first physical channel or signal is one of the plurality of physical channels and/or physical signals.

It can be learned that, based on the method described in the first aspect, because the beam used by the terminal device to transmit the first physical channel or signal (which may be referred to as a beam of the first physical channel or signal for ease of description) is the unified beam (also referred to as an anchor), after configuring the terminal device to transmit the plurality of physical channels and/or physical signals based on the unified beam, the access network device only needs to notify the beam of the first physical channel or signal by using the DCI signaling, and after determining the beam of the first physical channel or signal, the terminal device can determine beams of one or more other physical channels and/or physical signals based on the beam of the first physical channel or signal, so that the access network device does not need to separately indicate beams of the plurality of physical channels and/or physical signals by using different signaling. Therefore, based on the method described in the first aspect, it is helpful to reduce beam indication signaling overheads. In addition, the beam of the first physical channel or signal can be updated in time by using the DCI signaling.

The transmitting the physical channel or signal may be specifically receiving the physical channel or signal, or sending the physical channel or signal. For example, if the physical channel or signal is a physical downlink channel or signal, the transmitting the physical channel or signal is receiving the physical channel or signal. If the physical channel or signal is a physical uplink channel or signal, the transmitting the physical channel or signal is sending the physical channel or signal.

Throughout this application, the DCI signaling may also be replaced with DCI, and MAC CE signaling in the following may also be replaced with MAC CE.

In a possible implementation, after receiving the DCI signaling, the terminal device may have the following two processing cases:

Case 1: The DCI signaling is used to schedule a second physical channel or signal, and the second physical channel or signal is a physical channel or signal transmitted based on the unified beam. The terminal device may further determine, as a beam used by the terminal device to transmit the second physical channel or signal scheduled by using the DCI signaling, the beam indicated by the DCI signaling. In this way, the beam used by the terminal device to transmit the second physical channel or signal is not determined based on the beam of the first physical channel or signal, and the beam of the second physical channel or signal may be updated before the first physical channel or signal, or may be updated after the first physical channel or signal, so that update time of the beam of the second physical channel or signal is more flexible.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required by the terminal device to adjust a beam to the beam of the second physical channel or signal scheduled by using the DCI signaling. The time interval between the DCI signaling and the second physical channel or signal scheduled by using the DCI signaling is a time interval between end time of the DCI signaling and start time of the second physical channel or signal scheduled by using the DCI signaling. The time required by the terminal device to adjust the beam to the beam of the second physical channel or signal scheduled by using the DCI signaling is time required by the terminal device to switch from a first target beam to the beam of the second physical channel or signal scheduled by using the DCI signaling. The first target beam is a beam that is different from the beam of the second physical channel or signal scheduled by using the DCI signaling and that is recently used by the terminal device before the terminal device transmits the second physical channel or signal scheduled by using the DCI signaling.

In this optional manner, if a time interval between the DCI signaling and the second physical channel or signal scheduled by using the DCI signaling is less than the first duration, the terminal device cannot successfully receive the second physical channel or signal. Therefore, based on this optional manner, it is helpful for the terminal device to successfully receive the second physical channel or signal.

Optionally, a time interval between the DCI signaling and the first physical channel or signal is greater than or equal to third duration, and the third duration is greater than or equal to a sum of the time required by the terminal device to decode the DCI signaling and time required to adjust a beam to the beam of the first physical channel or signal. The time interval between the DCI signaling and the first physical channel or signal is a time interval between the end time of the DCI signaling and start time of the first physical channel or signal. The time required by the terminal device to adjust the beam to the beam of the first physical channel or signal is time required by the terminal device to switch from a second target beam to the beam of the first physical channel or signal. The second target beam is a beam that is different from the beam of the first physical channel or signal and that is recently used by the terminal device before the terminal device transmits the first physical channel or signal. In this optional manner, if a time interval between the DCI signaling and the first physical channel or signal is less than the third duration, the terminal device cannot successfully receive the first physical channel or signal. Therefore, based on this optional manner, it is helpful for the terminal device to successfully receive the first physical channel or signal.

Case 2: After the terminal device determines, based on the configuration information and the beam indicated by the DCI signaling, the beam used by the terminal device to transmit the first physical channel or signal, the terminal device may further determine, based on the beam used by the terminal device to transmit the first physical channel or signal, a beam used to transmit at least one of the plurality of physical channels or signals. Based on this possible implementation, a beam used by the terminal device to transmit another physical channel or signal can be determined based on the beam used to transmit the first physical channel or signal. In this way, the beam used by the terminal device to transmit the another physical channel or signal does not need to be indicated by using additional beam indication signaling, thereby helping reduce beam indication signaling overheads.

Optionally, the DCI signaling is used to schedule a second physical channel or signal, the at least one physical channel or signal includes the second physical channel or signal (a beam of the second physical channel or signal is determined by the terminal device based on the beam of the first physical channel or signal), a time interval between the DCI signaling and the second physical channel or signal scheduled by using the DCI signaling is less than or equal to second duration, and the second duration is greater than or equal to time required by the terminal device to decode the DCI signaling. The time interval between the DCI signaling and the second physical channel or signal scheduled by using the DCI signaling is a time interval between end time of the DCI signaling and start time of the second physical channel or signal scheduled by using the DCI signaling. Based on this optional manner, it is helpful to schedule the second physical channel or signal in time.

Optionally, a time interval between the DCI signaling and the first physical channel or signal is greater than or equal to third duration, and the third duration is greater than or equal to a sum of the time required by the terminal device to decode the DCI signaling and time required to adjust a beam to the beam of the first physical channel or signal. The time interval between the DCI signaling and the first physical channel or signal is a time interval between the end time of the DCI signaling and start time of the first physical channel or signal. The time required by the terminal device to adjust the beam to the beam of the first physical channel or signal is time required by the terminal device to switch from a second target beam to the beam of the first physical channel or signal. The second target beam is a beam that is different from the beam of the first physical channel or signal and that is recently used by the terminal device before the terminal device transmits the first physical channel or signal. In this optional manner, if a time interval between the DCI signaling and the first physical channel or signal is less than the third duration, the terminal device cannot successfully receive the first physical channel or signal. Therefore, based on this optional manner, it is helpful for the terminal device to successfully receive the first physical channel or signal.

In a possible implementation, before the terminal device receives the configuration information sent by the access network device, the terminal device may further send capability information to the access network device, where the capability information is used to indicate that the terminal device supports the plurality of physical channels and/or physical signals in being transmitted based on the unified beam. Based on this possible implementation, the terminal device can report the capability information to the access network device, so that the access network device can determine, based on the capability information of the terminal device, whether the configuration information used to indicate to transmit the plurality of physical channels and/or physical signals by using the unified beam can be sent to the terminal device.

Optionally, the capability information is further used to indicate channels or signals whose beams are supported by the terminal device in being used as the unified beam, and the configuration information is further used to indicate a channel or signal whose beam is used as the unified beam. That is, the capability information is further used to indicate specific channels or signals whose beams are supported by the terminal device in being used as the unified beam, and the configuration information is further used to indicate a specific channel or signal whose beam is used as the unified beam. Based on this optional manner, the terminal device can report, to the access network device, the channels or signals whose beams are supported by the terminal device in being used as the unified beam, so that the access network device can flexibly configure, for the terminal device, the channel or signal whose beam is used as the unified beam.

Optionally, the capability information is further used to indicate physical channels and/or physical signals supported by the terminal device in being transmitted based on the unified beam, and the configuration information is further used to indicate a physical channel and/or physical signal transmitted by the terminal device based on the unified beam. That is, the capability information is further used to indicate specific physical channels and/or physical signals supported by the terminal device in being transmitted based on the unified beam, and the configuration information is further used to indicate a specific physical channel and/or physical signal transmitted by the terminal device based on the unified beam. Based on this optional manner, the terminal device can report, to the access network device, the physical channels and/or physical signals supported by the terminal device in being transmitted based on the unified beam, so that the access network device can flexibly configure, for the terminal device, the physical channel and/or physical signal transmitted based on the unified beam.

In a possible implementation, the configuration information is specifically used to indicate the terminal device to transmit the plurality of physical channels and/or physical signals based on the unified beam in a same carrier. Based on this possible implementation, the terminal device can be configured to transmit the plurality of physical channels and/or physical signals based on the unified beam by using a carrier as a unit, thereby helping reduce beam indication signaling overheads.

In a possible implementation, the configuration information is specifically used to indicate the terminal device to transmit the plurality of physical channels and/or physical signals based on the unified beam in a same carrier group. Based on this possible implementation, the terminal device can be configured to transmit the plurality of physical channels and/or physical signals based on the unified beam by using a carrier group as a unit, thereby helping reduce beam indication signaling overheads.

In a possible implementation, the configuration information is specifically used to indicate the terminal device to transmit the plurality of physical channels and/or physical signals based on the unified beam in a same bandwidth. Based on this possible implementation, the terminal device can be configured to transmit the plurality of physical channels and/or physical signals based on the unified beam by using a bandwidth as a unit, thereby helping reduce beam indication signaling overheads.

In a possible implementation, the configuration information is specifically used to indicate the terminal device to transmit the plurality of physical channels and/or physical signals based on the unified beam in a same bandwidth group. Based on this possible implementation, the terminal device can be configured to transmit the plurality of physical channels and/or physical signals based on the unified beam by using a bandwidth group as a unit, thereby helping reduce beam indication signaling overheads.

In a possible implementation, the configuration information is specifically used to signals based on the unified beam in a same frequency band. Based on this possible implementation, the terminal device can be configured to transmit the plurality of physical channels and/or physical signals based on the unified beam by using a frequency band as a unit, thereby helping reduce beam indication signaling overheads.

In a possible implementation, the configuration information is specifically used to indicate the terminal device to transmit the plurality of physical channels and/or physical signals based on the unified beam in a same frequency band group. Based on this possible implementation, the terminal device can be configured to transmit the plurality of physical channels and/or physical signals based on the unified beam by using a frequency band group as a unit, thereby helping reduce beam indication signaling overheads.

In a possible implementation, there are the following four specific implementations in which the terminal device determines, based on the configuration information and the beam indicated by the DCI signaling, the beam used by the terminal device to transmit the first physical channel or signal:

Specific implementation 1: The configuration information is further used to indicate the terminal device to transmit the first physical channel or signal on control resource sets in a same group by using a same beam. The terminal device determines, based on the configuration information and the beam indicated by the DCI signaling, a beam used by the terminal device to transmit the first physical channel or signal on control resource sets in a first group, where the first group is a group to which a control resource set that carries the DCI signaling belongs. Based on this specific implementation, a beam corresponding to one group of control resource sets can be updated by using DCI signaling on one control resource set, thereby helping reduce beam indication signaling overheads.

Optionally, after the terminal device receives the configuration information sent by the access network device, before the terminal device receives the DCI signaling sent by the access network device, the terminal device may further receive MAC CE signaling sent by the access network device, where the MAC CE signaling indicates a beam used by the terminal device to initially transmit the DCI signaling on a first control resource set, where the first control resource set may be any control resource set. The terminal device determines, as a beam used by the terminal device to initially transmit the DCI signaling on control resource sets in a second group, the beam indicated by the MAC CE signaling, where the second group is a group to which the first control resource set belongs.

Based on this optional manner, an initial beam corresponding to one group of control resource sets can be indicated by using one piece of MAC CE signaling, thereby helping reduce beam indication signaling overheads.

Specific implementation 2: The configuration information is further used to indicate the terminal device to transmit the first physical channel or signal on all control resource sets by using a same beam. The terminal device determines, based on the configuration information and the beam indicated by the DCI signaling, a beam used by the terminal device to transmit the first physical channel or signal on all the control resource sets. The DCI signaling is carried in any control resource set. Based on this specific implementation, the beam corresponding to all the control resource sets can be updated by using DCI signaling on one control resource set, thereby helping reduce beam indication signaling overheads.

Optionally, the terminal device receives MAC CE signaling sent by the access network device, where the MAC CE signaling indicates a beam used by the terminal device to initially transmit the DCI on a first control resource set. The terminal device determines, as a beam used by the terminal device to initially transmit the DCI on all the control resource sets, the beam indicated by the MAC CE signaling. The first control resource set is any control resource set.

Based on this optional manner, an initial beam corresponding to all the control resource sets can be indicated by using one piece of MAC CE signaling, thereby helping reduce beam indication signaling overheads.

Specific implementation 3: The configuration information is further used to indicate a plurality of control resource sets, and indicate the terminal device to transmit the first physical channel or signal on the plurality of control resource sets by using a same beam. The DCI signaling is carried in one of the plurality of control resource sets. The terminal device determines, based on the configuration information and the beam indicated by the DCI signaling, a beam used by the terminal device to transmit the first physical channel or signal on the plurality of control resource sets. Based on this specific implementation, the beam corresponding to the plurality of control resource sets can be updated by using DCI signaling on one control resource set, thereby helping reduce beam indication signaling overheads.

Optionally, the terminal device receives MAC CE signaling sent by the access network device, where the MAC CE signaling indicates a beam used by the terminal device to initially transmit the DCI on a first control resource set, and the first control resource set is one of the plurality of control resource sets. The terminal device determines, as a beam used by the terminal device to initially transmit the DCI on the plurality of control resource sets, the beam indicated by the MAC CE signaling.

Based on this optional manner, an initial beam corresponding to the plurality of control resource sets can be indicated by using one piece of MAC CE signaling, thereby helping reduce beam indication signaling overheads.

Specific implementation 4: The DCI signaling is carried in a first control resource set. The terminal device determines, based on the configuration information and the beam indicated by the DCI signaling, a beam used by the terminal device to transmit the first physical channel or signal on the first control resource set. The first control resource set is any control resource set. Based on this specific implementation, DCI signaling on one control resource set is used to update only a beam corresponding to the control resource set on which the DCI signaling is located. In this way, beams corresponding to control resource sets can be more flexibly updated.

In a possible implementation, the protocol may predefine a specific resource identifier (resource ID), the configuration information may indicate a specific resource identifier, or the terminal device may report a specific resource identifier. For example, the specific resource identifier may be of a time-frequency resource with a lowest or highest resource identifier, or a time-frequency resource corresponding to any resource identifier. When the terminal device receives the DCI signaling on a control resource set corresponding to the specific resource identifier, the terminal device determines, based on the configuration information and the beam indicated by the DCI signaling, a beam used by the terminal device to transmit a PDCCH on all control resource sets. Based on this possible implementation, the beam corresponding to all the control resource sets can be updated by using DCI signaling on one control resource set, thereby helping reduce beam indication signaling overheads.

According to a second aspect, this application provides a beam indication method. The method includes: an access network device sends configuration information to a terminal device, where the configuration information is used to indicate the terminal device to transmit a plurality of physical channels and/or physical signals based on a unified beam; and the access network device sends downlink control information (DCI) signaling to the terminal device, where the DCI signaling is used to indicate a beam used by the terminal device to transmit a first physical channel or signal, and the beam used by the terminal device to transmit the first physical channel or signal is the unified beam.

In a possible implementation, the DCI signaling is used to schedule a second physical channel or signal, the second physical channel or signal is a physical channel or signal transmitted based on the unified beam, and the DCI signaling is further used to indicate a beam used by the terminal device to transmit the second physical channel or signal scheduled by using the DCI signaling.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam corresponding to the second physical channel or signal scheduled by using the DCI signaling. For specific descriptions of the time interval between the DCI signaling and the second physical channel or signal scheduled by using the DCI signaling and the time required by the terminal device to adjust the beam to the beam corresponding to the second physical channel or signal scheduled by using the DCI signaling, refer to the descriptions in the foregoing first aspect. Details are not described herein again.

In a possible implementation, the DCI signaling is used to schedule a second physical channel or signal, the second physical channel or signal is a physical channel or signal transmitted by the terminal device based on the unified beam, a time interval between the DCI signaling and the second physical channel or signal scheduled by using the DCI signaling is less than or equal to second duration, and the second duration is greater than or equal to time required by the terminal device to decode the DCI signaling. For specific descriptions of the time interval between the DCI signaling and the second physical channel or signal scheduled by using the DCI signaling, refer to the descriptions in the foregoing first aspect. Details are not described herein again.

In a possible implementation, a time interval between the DCI signaling and the first physical channel or signal is greater than or equal to third duration, and the third duration is greater than or equal to a sum of the time required by the terminal device to decode the DCI signaling and time required to adjust a beam to the beam corresponding to the first physical channel or signal. For specific descriptions of the time interval between the DCI signaling and the first physical channel or signal and the time required by the terminal device to adjust the beam to the beam corresponding to the first physical channel or signal, refer to the descriptions in the foregoing first aspect. Details are not described herein again.

In a possible implementation, before sending the configuration information to the terminal device, the access network device may further receive capability information sent by the terminal device, where the capability information is used to indicate that the terminal device supports the plurality of physical channels and/or physical signals in being transmitted based on the unified beam.

Optionally, the capability information is further used to indicate channels or signals whose beams are supported by the terminal device in being used as the unified beam, and the configuration information is further used to indicate a channel or signal whose beam is used as the unified beam. That is, the capability information is further used to indicate specific channels or signals whose beams are supported by the terminal device in being used as the unified beam, and the configuration information is further used to indicate a specific channel or signal whose beam is used as the unified beam.

Optionally, the capability information is further used to indicate physical channels and/or physical signals supported by the terminal device in being transmitted based on the unified beam, and the configuration information is further used to indicate a physical channel and/or physical signal transmitted by the terminal device based on the unified beam. That is, the capability information is further used to indicate specific physical channels and/or physical signals supported by the terminal device in being transmitted based on the unified beam, and the configuration information is further used to indicate a specific physical channel and/or physical signal transmitted by the terminal device based on the unified beam.

In a possible implementation, the configuration information is specifically used to indicate the terminal device to transmit the plurality of physical channels and/or physical signals based on the unified beam in a same carrier.

In a possible implementation, the configuration information is specifically used to indicate the terminal device to transmit the plurality of physical channels and/or physical signals based on the unified beam in a same carrier group.

In a possible implementation, the configuration information is specifically used to indicate the terminal device to transmit the plurality of physical channels and/or physical signals based on the unified beam in a same bandwidth.

In a possible implementation, the configuration information is specifically used to indicate the terminal device to transmit the plurality of physical channels and/or physical signals based on the unified beam in a same bandwidth group.

In a possible implementation, the configuration information is specifically used to indicate the terminal device to transmit the plurality of physical channels and/or physical signals based on the unified beam in a same frequency band.

In a possible implementation, the configuration information is specifically used to indicate the terminal device to transmit the plurality of physical channels and/or physical signals based on the unified beam in a same frequency band group.

In a possible implementation, the configuration information is further used to indicate the terminal device to transmit the first physical channel or signal on control resource sets in a same group by using a same beam, the DCI signaling is specifically used to indicate a beam used by the terminal device to transmit the first physical channel or signal on control resource sets in a first group, and the first group is a group to which a control resource set that carries the DCI signaling belongs.

In a possible implementation, the configuration information is further used to indicate the terminal device to transmit the first physical channel or signal on all control resource sets by using a same beam, and the DCI signaling is specifically used to indicate a beam used by the terminal device to transmit the first physical channel or signal on all the control resource sets.

In a possible implementation, the configuration information is further used to indicate a plurality of control resource sets, and indicate the terminal device to transmit the first physical channel or signal on the plurality of control resource sets by using a same beam, the DCI signaling is carried in one of the plurality of control resource sets, and the DCI signaling is specifically used to indicate a beam used by the terminal device to transmit the first physical channel or signal on the plurality of control resource sets.

In a possible implementation, the DCI signaling is carried in a first control resource set, and the DCI signaling is used to indicate a beam used by the terminal device to transmit the first physical channel or signal on the first control resource set.

For beneficial effects of the second aspect, refer to the beneficial effects of the first aspect. Details are not described herein again.

According to a third aspect, this application provides a beam indication method. The method includes: a terminal device receives configuration information sent by an access network device, where the configuration information is used to indicate to determine, based on a unified beam indicator, beams used by the terminal device to transmit a plurality of physical channels and/or physical signals; the terminal device receives downlink control information (DCI) signaling sent by the access network device, where the DCI signaling is used to indicate the unified beam indicator, and the unified beam indicator is used to indicate the beams used by the terminal device to transmit the plurality of physical channels and/or physical signals; and the terminal device determines, based on the configuration information and the unified beam indicator, the beams used by the terminal device to transmit the plurality of physical channels and/or physical signals. It can be learned that, based on the method described in the third aspect, provided that the access network device indicates one unified beam indicator, the terminal device can determine the beams used for the plurality of physical channels and/or physical signals. Therefore, based on the method described in the third aspect, it is helpful to reduce beam indication signaling overheads.

In a possible implementation, that the terminal device determines, based on the configuration information and the unified beam indicator, the beams used by the terminal device to transmit the plurality of physical channels and/or physical signals may include the following two specific implementations:

Specific implementation 1: The DCI signaling is used to schedule a second physical channel or signal, and the unified beam indicator indicated by the DCI signaling includes a beam indicator corresponding to the second physical channel or signal and includes a beam indicator corresponding to at least one physical channel or signal other than the second physical channel or signal. The terminal device determines, based on the configuration information and the unified beam indicator, a beam corresponding to the second physical channel or signal scheduled by using the DCI signaling and a beam corresponding to the at least one physical channel or signal other than the second physical channel or signal. In this way, beam update time of the second physical channel or signal can be more flexible.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required by the terminal device to adjust a beam to the beam corresponding to the second physical channel or signal scheduled by using the DCI signaling. For specific descriptions of the time interval between the DCI signaling and the second physical channel or signal scheduled by using the DCI signaling and the time required by the terminal device to adjust the beam to the beam corresponding to the second physical channel or signal scheduled by using the DCI signaling, refer to the descriptions in the foregoing first aspect. Details are not described herein again. In this optional manner, if a time interval between the second physical channel or signal scheduled by using the DCI signaling and the DCI signaling is less than the first duration, the terminal device cannot successfully receive the second physical channel or signal scheduled by using the DCI signaling. Therefore, based on this optional manner, it is helpful for the terminal device to successfully receive the second physical channel or signal scheduled by using the DCI signaling.

Optionally, the unified beam indicator includes the beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust a beam to the beam used to transmit the other physical channel or signal. The time interval between the DCI signaling and the other physical channel or signal is a time interval between end time of the DCI signaling and start time of the other physical channel or signal. The time required by the terminal device to adjust the beam to the beam of the other physical channel or signal is time required by the terminal device to switch from a second target beam to the beam of the other physical channel or signal. The second target beam is a beam that is different from the beam of the other physical channel or signal and that is recently used by the terminal device before the terminal device transmits the other physical channel or signal. Based on this optional manner, it is helpful for the terminal device to successfully receive the other physical channel or signal.

Specific implementation 2: The DCI signaling is used to schedule a second physical channel or signal of first time, and the unified beam indicator indicated by the DCI signaling includes a beam indicator corresponding to a second physical channel or signal and includes a beam indicator corresponding to at least one physical channel or signal other than the second physical channel or signal. The terminal device determines, based on the configuration information and the unified beam indicator, a beam corresponding to the second physical channel or signal of second time and a beam corresponding to the at least one physical channel or signal other than the second physical channel or signal. Based on this possible implementation, it is helpful to schedule the second physical channel or signal in time.

Optionally, a time interval between the DCI signaling and the second physical channel or signal scheduled by using the DCI signaling is less than or equal to second duration, and the second duration is greater than or equal to time required by the terminal device to decode the DCI signaling. For specific descriptions of the time interval between the DCI signaling and the second physical channel or signal scheduled by using the DCI signaling, refer to the descriptions in the foregoing first aspect. Details are not described herein again. Based on this possible implementation, it is helpful to schedule the second physical channel or signal in time.

Optionally, the DCI signaling includes the beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust the beam used to transmit the other physical channel or signal. For specific descriptions of the time interval between the DCI signaling and the other physical channel or signal and the time required by the terminal device to adjust the beam to the beam corresponding to the other physical channel or signal, refer to the foregoing descriptions. Details are not described herein again. Based on this optional manner, it is helpful for the terminal device to successfully receive the other physical channel or signal.

In a possible implementation, before receiving the configuration information sent by the access network device, the terminal device may further send capability information to the access network device, where the capability information is used to indicate that the terminal device supports the unified beam indicator. Based on this possible implementation, it is helpful for the access network device to accurately determine whether the configuration information can be sent to the terminal device.

Optionally, the capability information is further used to indicate that the terminal device supports the beam indicators that are of the physical channels/signals and that are included in the unified beam indicator.

Optionally, the capability information is used to indicate a quantity of unified beam indicators supported by the terminal device. Only based on this optional manner, the access network device can accurately indicate the unified beam indicator to the terminal device.

According to a fourth aspect, this application provides a beam indication method. The method includes: an access network device sends configuration information to a terminal device, where the configuration information is used to indicate to determine, based on a unified beam indicator, beams used by the terminal device to transmit a plurality of physical channels and/or physical signals; and the access network device sends downlink control information (DCI) signaling to the terminal device, where the DCI signaling is used to indicate the unified beam indicator, and the unified beam indicator is used to indicate the beams used by the terminal device to transmit the plurality of physical channels and/or physical signals.

In a possible implementation, the DCI signaling is used to schedule a second physical channel or signal, and the unified beam indicator indicated by the DCI signaling is used to indicate a beam of the second physical channel or signal scheduled by using the DCI signaling, and is used to indicate a beam of at least one physical channel or signal other than the second physical channel or signal.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam corresponding to the second physical channel or signal scheduled by using the DCI signaling. For specific descriptions of the time interval between the DCI signaling and the second physical channel or signal scheduled by using the DCI signaling and the time required by the terminal device to adjust the beam to the beam corresponding to the second physical channel or signal scheduled by using the DCI signaling, refer to the descriptions in the foregoing first aspect. Details are not described herein again.

Optionally, the unified beam indicator includes a beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust a beam to the beam used to transmit the other physical channel or signal. For specific descriptions of the time interval between the DCI signaling and the other physical channel or signal and the time required by the terminal device to adjust the beam to the beam corresponding to the other physical channel or signal, refer to the descriptions in the foregoing third aspect. Details are not described herein again.

In another possible implementation, the DCI signaling is used to schedule a second physical channel or signal of first time, and the unified beam indicator indicated by the DCI signaling is used to indicate a beam of the second physical channel or signal of second time and is used to indicate a beam of the at least one physical channel or signal other than the second physical channel or signal.

Optionally, a time interval between the DCI signaling and the second physical channel or signal scheduled by using the DCI signaling is less than or equal to second duration, and the second duration is greater than or equal to time required by the terminal device to decode the DCI signaling. For specific descriptions of the time interval between the DCI signaling and the second physical channel or signal scheduled by using the DCI signaling, refer to the descriptions in the foregoing first aspect. Details are not described herein again.

Optionally, the DCI signaling includes a beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust the beam used to transmit the other physical channel or signal. For specific descriptions of the time interval between the DCI signaling and the other physical channel or signal and the time required by the terminal device to adjust the beam to the beam corresponding to the other physical channel or signal, refer to the descriptions in the foregoing third aspect. Details are not described herein again.

In a possible implementation, before sending the configuration information, the access network device may further receive capability information sent by the terminal device, where the capability information is used to indicate that the terminal device supports the unified beam indicator.

Optionally, the capability information is further used to indicate physical channels/signals whose beam indicators are supported by the terminal device in being included in the unified beam indicator.

Optionally, the capability information is used to indicate a quantity of unified beam indicators supported by the terminal device.

For beneficial effects of the fourth aspect, refer to the beneficial effects of the third aspect. Details are not described herein again.

According to a fifth aspect, this application provides a communications apparatus. The apparatus may be a terminal device, may be an apparatus in the terminal device, or may be an apparatus that can be used in matching with the terminal device. The communications apparatus may alternatively be a chip system. The communications apparatus may perform the method according to the first aspect or the third aspect. A function of the communications apparatus may be implemented by hardware, or may be implemented by hardware executing corresponding software. The hardware or the software includes one or more units corresponding to the foregoing function. The unit may be software and/or hardware. For performed operations and beneficial effects of the communications apparatus, refer to the method and the beneficial effects in the foregoing first aspect or third aspect. Repeated parts are not described again.

According to a sixth aspect, this application provides a communications apparatus. The apparatus may be an access network device, may be an apparatus in the access network device, or may be an apparatus that can be used in matching with the access network device. The communications apparatus may alternatively be a chip system. The communications apparatus may perform the method according to the second aspect or the fourth aspect. A function of the communications apparatus may be implemented by hardware, or may be implemented by hardware executing corresponding software. The hardware or the software includes one or more units corresponding to the foregoing function. The unit may be software and/or hardware. For performed operations and beneficial effects of the communications apparatus, refer to the method and the beneficial effects in the foregoing second aspect or fourth aspect. Repeated parts are not described again.

According to a seventh aspect, this application provides a communications apparatus. The communications apparatus includes a processor. When the processor invokes a computer program in a memory, the method according to any one of the first aspect to the fourth aspect is performed.

According to an eighth aspect, this application provides a communications apparatus. The communications apparatus includes a processor and a memory. The memory is configured to store computer-executable instructions. The processor is configured to execute the computer-executable instructions stored in the memory, to enable the communications apparatus to perform the method according to any one of the first aspect to the fourth aspect.

According to a ninth aspect, this application provides a communications apparatus. The communications apparatus includes a processor, a memory, and a transceiver. The transceiver is configured to receive a channel or signal, or send a channel or signal. The memory is configured to store program code. The processor is configured to invoke the program code from the memory to perform the method according to any one of the first aspect to the fourth aspect.

According to a tenth aspect, this application provides a communications apparatus. The communications apparatus includes a processor and an interface circuit. The interface circuit is configured to receive code instructions and transmit the code instructions to the processor. The processor runs the code instructions to perform the method according to any one of the first aspect to the fourth aspect.

According to an eleventh aspect, this application provides a computer-readable storage medium. The computer-readable storage medium is configured to store instructions. When the instructions are executed, the method according to any one of the first aspect to the fourth aspect is implemented.

According to a twelfth aspect, this application provides a computer program product including instructions. When the instructions are executed, the method according to any one of the first aspect to the fourth aspect is implemented.

DESCRIPTION OF EMBODIMENTS

Figure 1:
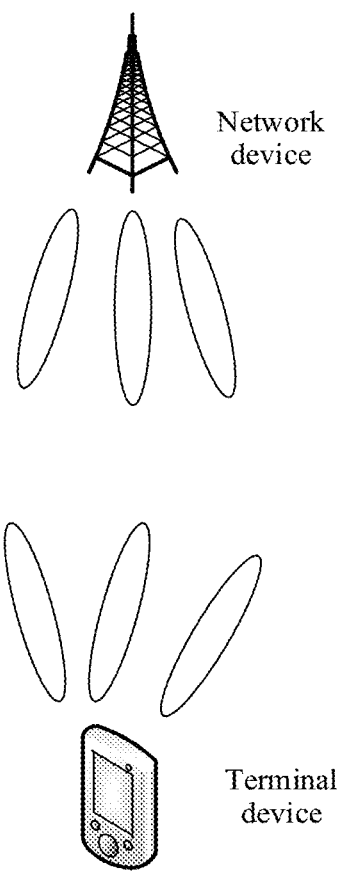
FIG. 1 is a schematic diagram of an architecture of a system according to an embodiment of this application.

In the specification, claims, and accompanying drawings of this application, the terms "first", "second", and the like are intended to distinguish between different objects but do not indicate a particular order. In addition, terms "include", "have", and any variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or alternative embodiment exclusive from another embodiment. It is explicitly and implicitly understood by persons skilled in the art that embodiments described in the specification may be combined with another embodiment.

In this application, "at least one" means one or more, "a plurality of" means two or more, "at least two" means two or three or more, and "and/or" is used to describe an association relationship between associated objects and indicates that three relationships may exist. For example, "A and/or B" may represent the following three cases: Only A exists, only B exists, and both A and B exist, where A and B may be singular or plural. The character "/" usually indicates an "or" relationship between associated objects. "At least one of the following" or a similar expression thereof refers to any combination of these items, including a singular item or any combination of plural items. For example, at least one of a, b, or c may indicate a, b, c, a and b, a and c, b and c, or a, b, and c, where a, b, and c may be singular or plural.

To better understand the embodiments of this application, the following first describes related concepts in the embodiments of this application.

I. Quasi-co-location (QCL): A co-location relationship is used to indicate that a plurality of resources have one or more same or similar communication characteristics, and same or similar communication configurations may be used for a plurality of resources that have a co-location relationship. For example, if two antenna ports have a co-location relationship, a large-scale channel characteristic in which one port transmits a symbol may be inferred from a large-scale channel characteristic in which the other port transmits a symbol. The large-scale characteristic may include a delay spread, an average delay, a Doppler spread, a Doppler frequency shift, an average gain, a receive parameter, a receive beam number of a terminal device, transmit/receive channel correlation, a receive angle of arrival, spatial correlation of a receiver antenna, a dominant angle of arrival (AoA), an average angle of arrival, an AoA spread, and the like.

II. Transmission configuration indicator state (TCI state): In the R15, downlink beam indication is implemented by using a TCI state. That is, a receive parameter of a physical downlink channel or physical downlink signal may be indicated by using the TCI state. The physical downlink channel may be a physical downlink control channel (PDCCH) or a physical downlink shared channel (PDSCH). The physical downlink signal may be a channel state information-reference signal (CSI-RS).

The TCI state includes a QCL type (two different QCL types may be configured) and reference signal information of each QCL type. The reference signal information specifically includes a carrier component (CC) identification (ID) and/or a bandwidth part (BWP) ID of a reference signal, and a number (such as an SSB resource index or a CSI-RS resource index) of each reference signal resource. In an existing protocol, configuration of the TCI state is completed by using radio resource control (RRC) signaling, and the RRC signaling describes configuration signaling in a form of pseudo code abstract syntax notation one (ASN.1). For example, one TCI state includes the following content:

```
TCI-State ::=         SEQUENCE {
   tci-StateId          TCI-StateId,
   qcl-Type1            QCL-Info,
   qcl-Type2            QCL-Info
}
QCL-Info ::=          SEQUENCE {
   cell                 ServCellIndex
   bwp-Id               BWP-Id
   referenceSignal      CHOICE {
      csi-rs               NZP-CSI-RS-ResourceId,
      ssb                  SSB-Index
   },
   qcl-Type             ENUMERATED {typeA, typeB, typeC, typeD},
}
```

QCL type classification may be shown as follows:

QCL typeA: QCL typeA represents a delay, a Doppler shift, a delay spread, and a Doppler spread, that is, QCL typeA may be referred to as time-frequency shift information;

QCL typeB: QCL typeB represents a Doppler shift and a Doppler spread;

QCL typeC: QCL typeC represents a delay and a Doppler shift; and

QCL typeD: QCL typeD represents a spatial receive parameter, namely, a receive beam.

A value of the referenceSignal field in the TCI state means that an access network device indicates a terminal device to receive a physical downlink channel by using a receive parameter of a reference signal resource corresponding to a reference signal resource identifier. For example, when a referenceSignal field of QCL typeA in a TCI state of a PDSCH includes an identifier of a CSI-RS resource 1 (for example, an index or a sequence number of the CSI-RS resource), a terminal device receives the PDSCH by using a time-frequency shift information of the CSI-RS resource 1. When a referenceSignal field of QCL typeD in the TCI state of the PDSCH includes the identifier of the CSI-RS resource 1, the terminal device receives the PDSCH by using a receive beam of the CSI-RS resource 1. Likewise, the terminal device determines a receive parameter of another physical downlink channel or signal based on a TCI status of the another physical downlink channel or signal.

III. Control resource set (COREST): The control resource set defines a frequency domain detection possibility of a PDCCH. An access network device may configure, for a terminal device, information such as an identifier of the CORESET, a DMRS scrambling ID of the PDCCH, a frequency domain precoding granularity, a symbol length, a frequency domain location, a mapping manner between a CCE and a REG, a quasi-co-location assumption for receiving the PDCCH, and whether a TCI field exists in DCI of the PDCCH received on the CORESET.

IV. Spatial relation information (spatial relation info): The spatial relation information may also be referred to as an uplink TCI (UL TCI). A spatial relation may be used to determine a transmit beam of a terminal device for a physical uplink channel or signal. In a communication process, the terminal device may determine a transmit beam of a physical uplink channel or signal based on a spatial relation indicated by an access network device, and the access network device may determine a receive beam of the physical uplink channel or signal based on the same spatial relation.

The spatial relation information may include a cell identifier and a reference signal identifier. The cell identifier may indicate a physical cell and/or a serving cell. The reference signal identifier may be an identifier of an uplink reference signal, or may be an identifier of a downlink synchronization signal/PBCH block (SSB) or a downlink reference signal. When a reference signal in the spatial relation information is a sounding reference signal (SRS), the terminal needs to send a target signal or channel by using a transmit beam for sending the SRS. When a reference signal in the spatial relation indicator is an SSB or a CSI-RS, the terminal needs to send a target signal or channel by using a transmit beam corresponding to a receive beam for receiving the SSB/CSI-RS. Optionally, one piece of spatial relation information may further include a BWP identifier.

In a current standard framework, only a physical uplink control channel (PUCCH) and an SRS have spatial relation information (SpatialRelationInfo) configurations. However, specifically, the configurations of the PUCCH and the SRS are different. A PUCCH transmit beam indicator is configured as follows: It is clear that PUCCH-SpatialRelationInfo includes more information. In addition to a reference (referenceSignal) of a transmit beam, PUCCH-SpatialRelationInfo further includes related information (pucch-PathlossReferenceRS-Id, p0-PUCCH-Id, and closedLoopIndex) of uplink power control.

```
PUCCH-SpatialRelationInfo ::=       SEQUENCE {
   pucch-SpatialRelationInfoId         PUCCH-SpatialRelationInfoId,
   servingCellIdServCellIndex
OPTIONAL, -- Need S
   referenceSignal                     CHOICE {
      ssb-Index                           SSB-Index,
      csi-RS-Index                        NZP-CSI-RS-ResourceId,
      srs                                 PUCCH-SRS
   },
   pucch-PathlossReferenceRS-Id        PUCCH-PathlossReferenceRS-Id,
   p0-PUCCH-Id                         P0-PUCCH-Id,
   closedLoopIndex                     ENUMERATED { i0, i1 }
}
```

An SRS transmit beam indicator is configured as follows: SRS-SpatialRelationInfo includes less content than PUCCH-SpatialRelationInfo. For example, SRS-SpatialRelationInfo does not include a related parameter of SRS transmit power.

```
SRS-SpatialRelationInfo ::=   SEQUENCE {
    servingCellId               ServCellIndex
    referenceSignal             CHOICE {
        ssb-Index                   SSB-Index,
        csi-RS-Index                NZP-CSI-RS-
Resourceld,
        srs                         SEQUENCE {
            resourceId                  SRS-
Resourceld,
            uplinkBWP                   BWP-Id
        }
    }
}
```

The following describes how to indicate beams used by a terminal device to transmit physical channels and signals in an existing standard.

In the existing standard, related signaling for performing beam indication on physical channels and signals in one carrier may be shown in the following Table 1. As shown in the following Table 1, an access network device may perform beam indication for a terminal device by using higher layer signaling (such as RRC signaling or MAC-CE signaling) and/or physical layer signaling (such as DCI signaling).

TABLE 1

| Physical channel/signal | RRC signaling | MAC CE signaling | DCI signaling |
|---|---|---|---|
| PDSCH | RRC signaling includes PDSCH-config, used to configure a plurality of TCI states, and each TCI state is identified by a unique ID | MAC CE signaling includes PDSCH TCI state activation/deactivation, used to activate or deactivation one or more TCI states | DCI signaling includes a TCI field, used to indicate an activated TCI state |
| PDCCH | RRC signaling includes PDCCH-config, used to configure a TCI state ID list, and each TCI state ID points to a TCI state configured by using PDSCH-config in a previous line | MAC CE signaling includes PDCCH TCI state indication, used to indicate a TCI state ID for a specific CORESET | None |
| CSI-RS | Periodic CSI-RS: In RRC signaling, a qcl-info field is configured for each CSI-RS resource, and the field includes a TCI state ID, pointing to a TCI state configured in the first line Semi-persistent CSI-RS: None or invalid Aperiodic CSI-RS: In RRC signaling, each CSI-RS resource is configured in one or more trigger states, a different qcl-info field may be configured in each trigger state, and the field includes a TCI state ID, pointing to a TCI state configured in the first line | Periodic CSI-RS: None Semi-persistent CSI-RS: MAC CE signaling includes CSI-RS activation/deactivation signaling, used to activate or deactivate a CSI-RS, and also notify a TCI state ID that should be used for the activated CSI-RS Aperiodic CSI-RS: MAC CE signaling includes trigger state selection signaling, used to select one or more trigger states | Periodic CSI-RS: None Semi-persistent CSI-RS: None Aperiodic CSI-RS: DCI signaling includes a CSI request field, used to point to a trigger state, so that a TCI State of the CSI-RS can be determined |
| SRS | Periodic SRS: In RRC signaling, an SRS-SpatialRelationInfo field is configured for each SRS resource, the field points to a reference signal ID, and reference signals include an SSB. a CSI-RS, and an SRS Semi-persistent SRS: None or invalid Aperiodic SRS: The aperiodic SRS has a similar configuration to the periodic SRS, but is associated with one SRS-TriggerState | Periodic SRS: None Semi-persistent SRS: MAC CE signaling includes SRS activation/deactivation signaling, used to activate or deactivate an SRS, and also notify a reference signal ID used for a transmit beam of the activated SRS Aperiodic SRS: MAC CE signaling includes AP SRS spatial relation indication signaling, including a reference signal ID used for an SRS transmit beam, and the reference signal ID is used to update a reference signal in SRS-TriggerState | Periodic SRS: None Semi-persistent SRS: None Aperiodic SRS: DCI signaling includes an SRS request field, used to point to one SRS-TriggerState |
| PUCCH | RRC signaling includes PUCCH-config, used to configure a | MAC CE signaling includes PUCCH | None |

TABLE 1-continued

| Physical channel/signal | RRC signaling | MAC CE signaling | DCI signaling |
|---|---|---|---|
| | plurality of PUCCH spatial relations, identified by respective unique IDs | spatial relation activation/deactivation signaling, used to activate one PUCCH spatial relation for each PUCCH resource | |
| PUSCH | None | None | DCI signaling includes an SRI field, used to point to an SRS resource, and a same transmit beam as the SRS resource is used for the PUSCH |

In the existing standard, the access network device independently performs beam indication on different physical channels or signals, that is, indicates different physical channels or signals by using different beam indication signaling. For example, the access network device indicates, by using RRC signaling 1+medium access control-control element (MAC CE) signaling 1+downlink control information (DCI) 1, a beam used by the terminal device to receive a PDSCH. The access network device indicates, by using RRC signaling 2+MAC CE signaling 2, a beam used by the terminal device to receive a PDCCH. The access network device indicates, by using RRC signaling 3, a beam used by the terminal device to receive a periodic CSI-RS. The access network device indicates, by using RRC signaling 4, a beam used by the terminal device to send a periodic SRS. The access network device indicates, by using RRC signaling 5+MAC CE signaling 5, a beam used by the terminal device to send a PUCCH. The access network device indicates, by using DCI signaling 6, a beam used by the terminal device to send a physical uplink shared channel (PUSCH). It can be learned that this causes very large beam indication signaling overheads.

To reduce beam indication signaling overheads, the embodiments of this application provide a beam indication method and a communications apparatus. To better understand the embodiments of this application, the following first describes an architecture of a system in the embodiments of this application.

The method provided in this application may be applied to various communications systems. For example, the communications system may be an internet of things (IoT) system, a narrow band internet of things (NB-IoT) system, or a long term evolution (LTE) system, may be a 5th-generation (5G) communications system, may be a hybrid architecture of LTE and 5G, or may be a 5G new radio (NR) system, or a new communications system emerging in future communications development. The method provided in the embodiments of this application can be used in any communications system in which a receive parameter of a physical downlink channel needs to be determined.

FIG. 1 is a schematic diagram of an architecture of a communications system according to an embodiment of this application. The solutions in this application are applicable to the communications system. The communications system may include at least one access network device and at least one terminal device. FIG. 1 shows an example in which the communications system includes one access network device and one terminal device. As shown in FIG. 1, the access network device and the terminal device may communicate with each other by using beams. The access network device and the terminal device each can generate a plurality of beams.

The access network device in this embodiment of this application is an entity that is on a network side and that is configured to transmit or receive a signal, may be configured to perform mutual conversion between a received over-the-air frame and an internet protocol (IP) packet, and serves as a router between the terminal device and a remaining part of an access network, where the remaining part of the access network may include an IP network or the like. The access network device may further coordinate attribute management of an air interface. For example, the access network device may be an evolved NodeB (eNB or eNodeB) in LTE, may be a new radio controller (NR controller), may be a gNodeB (gNB) in a 5G system, may be a centralized unit, may be a new radio base station, may be a remote radio unit, may be a micro base station, may be a relay may be a distributed unit, or may be a transmission reception point (TRP), a transmission point (TP), or any other radio access device. However, this embodiment of this application is not limited thereto.

The terminal device in this embodiment of this application is an entity that is on a user side and that is configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile (mobile), a remote station, an access point, a remote terminal, an access terminal, a user terminal, a user agent, a user device, user equipment, UE, or the like. The terminal device may be a mobile terminal, for example, a mobile phone (or also referred to as a "cellular" phone), and a computer that has a mobile terminal. For example, the terminal device may be a portable, pocket-size, handheld, computer-integrated, or in-vehicle mobile apparatus, which exchanges voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, this embodiment of this application is not limited thereto.

The following further describes in detail the beam indication method provided in the embodiments of this application.

Figure 2:
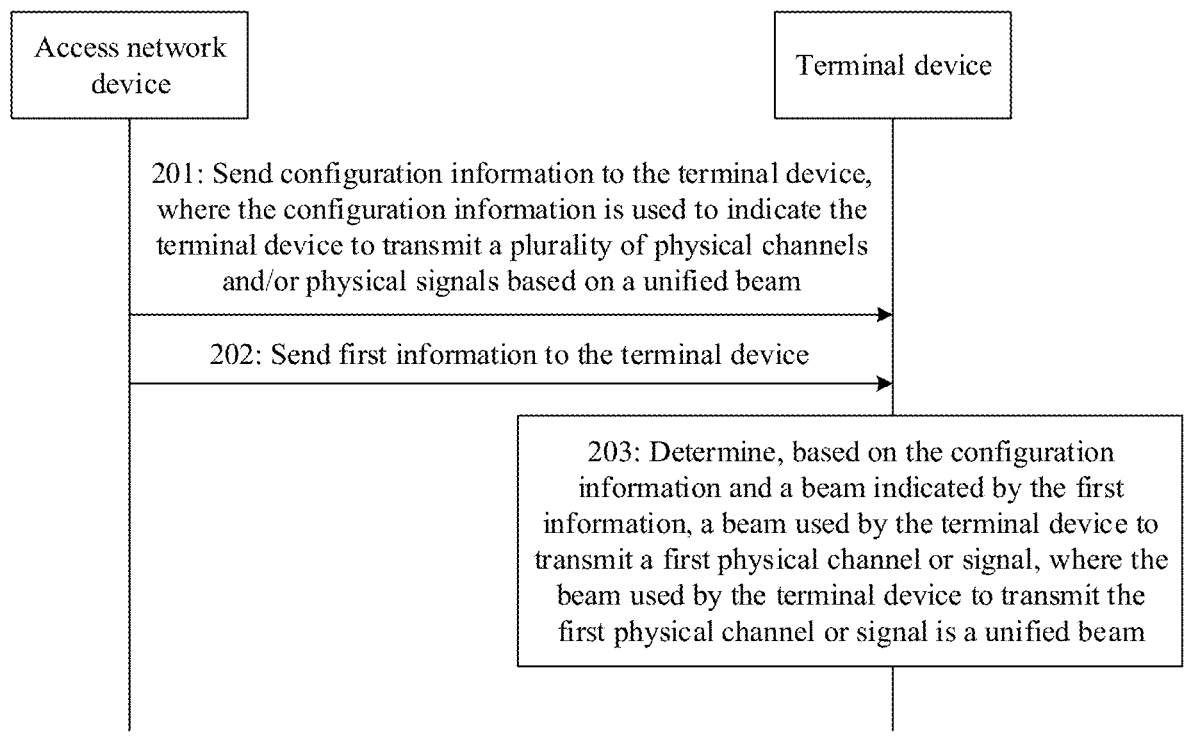
FIG. 2 is a schematic flowchart of a beam indication method according to an embodiment of this application.

FIG. 2 is a schematic flowchart of a beam indication method according to an embodiment of this application. As shown in FIG. 2, the beam indication method includes the following operation 201 to operation 203. The method shown in FIG. 2 may be performed by an access network device and a terminal device, or may be performed by a chip in the access network device and a chip in the terminal device. In FIG. 2, descriptions are provided by using an example in which the access network device and the terminal device perform the method. The description is also applicable to execution bodies of beam indication methods shown in the other accompanying drawings in the embodiments of this application. Details are not described later.

201: The access network device sends configuration information to the terminal device, where the configuration information is used to indicate the terminal device to transmit a plurality of physical channels and/or physical signals based on a unified beam. Correspondingly, the terminal device may receive the configuration information sent by the access network device.

In this embodiment of this application, the plurality of physical channels and/or physical signals transmitted by the terminal device based on the unified beam may include a plurality of the following channels and signals: a PDCCH, a PDSCH, a CSI-RS, a PUSCH, a PUCCH, or an SRS.

The unified beam may be a beam of any channel or signal in the PDCCH, the PDSCH, the CSI-RS, the PUSCH, the PUCCH, or the SRS. Throughout the embodiments of this application, a beam of a channel or signal may be understood as a beam used by the terminal device to transmit the channel or signal.

In this embodiment of this application, a specific implementation in which the terminal device transmits a physical channel or signal based on the unified beam may include the following several manners:

1. The unified beam is a receive beam of the terminal device, and a specific implementation in which the terminal device transmits a physical downlink channel or signal based on the unified beam is that the terminal device receives the physical downlink channel or signal by using the unified beam.

For example, the unified beam is a beam 1 used by the terminal device to receive a PDCCH, and a specific implementation in which the terminal device transmits the PDCCH, a PDSCH, and a CSI-RS based on the unified beam is that the terminal device receives the PDCCH, the PDSCH, and the CSI-RS by using the beam 1.

2. The unified beam is a receive beam of the terminal device, and a specific implementation in which the terminal device transmits a physical uplink channel or signal based on the unified beam is that the terminal device sends the physical uplink channel or signal by using a transmit beam corresponding to the unified beam. The transmit beam corresponding to the unified beam is a transmit beam whose beam sending direction is the same as a beam receiving direction of the unified beam, or the transmit beam corresponding to the unified beam is a transmit beam that performs transmission by using a same spatial transmission filter as the unified beam.

For example, the unified beam is a beam 1 used by the terminal device to receive a PDCCH, and a specific implementation in which the terminal device transmits a PUSCH, a PUCCH, and an SRS based on the unified beam is sending the PUSCH, the PUCCH, and the SRS by using a transmit beam corresponding to the beam 1.

For another example, the unified beam is a beam 1 used by the terminal device to receive a PDCCH, and a specific implementation in which the terminal device transmits the PDCCH, a PDSCH, a CSI-RS, a PUSCH, a PUCCH, and an SRS based on the unified beam is that the terminal device receives the PDCCH, the PDSCH, and the CSI-RS by using the beam 1, and sends the PUSCH, the PUCCH, and the SRS by using a transmit beam corresponding to the beam 1.

3. The unified beam is a transmit beam of the terminal device, and a specific implementation in which the terminal device transmits a physical uplink channel or signal based on the unified beam is that the terminal device sends the physical uplink channel or signal by using the unified beam.

For example, the unified beam is a beam 1 used by the terminal device to send a PUCCH, and a specific implementation in which the terminal device transmits a PUSCH, a PUCCH, and an SRS based on the unified beam is that the terminal device sends the PUSCH, the PUCCH, and the SRS by using the beam 1.

4. The unified beam is a transmit beam of the terminal device, and a specific implementation in which the terminal device transmits a physical downlink channel or signal based on the unified beam is that the terminal device receives the physical downlink channel and/or physical downlink signal by using a receive beam corresponding to the unified beam. The receive beam corresponding to the unified beam is a receive beam whose beam receiving direction is the same as a beam sending direction of the unified beam, or the receive beam corresponding to the unified beam is a receive beam that performs transmission by using a same spatial transmission filter as the unified beam.

For example, the unified beam is a beam 1 used by the terminal device to send a PUCCH, and a specific implementation in which the terminal device transmits a PDCCH, a PDSCH, and a CSI-RS based on the unified beam is that the terminal device receives the PDCCH, the PDSCH, and the CSI-RS by using a receive beam corresponding to the beam 1.

For another example, the unified beam is a beam 1 used by the terminal device to send a PUCCH, and a specific implementation in which the terminal device transmits a PDCCH, a PDSCH, a CSI-RS, a PUSCH, the PUCCH, and an SRS based on the unified beam is that the terminal device sends the PUSCH, the PUCCH, and the SRS by using the beam 1, and receives the PDCCH, the PDSCH, and the CSI-RS by using a receive beam corresponding to the beam 1.

In a possible implementation, before receiving the configuration information sent by the access network device, the terminal device may further send capability information to the access network device, where the capability information is used to indicate that the terminal device supports the plurality of physical channels and/or physical signals in being transmitted based on the unified beam. Correspondingly, before sending the configuration information, the access network device may further receive the capability information. After receiving the capability information, the access network device can send the configuration information to the terminal device, to indicate the terminal device to transmit the plurality of physical channels and/or physical signals based on the unified beam.

On the contrary, if the capability information is used to indicate that the terminal device does not support the plurality of physical channels and/or physical signals in being transmitted based on the unified beam, after receiving the capability information, the access network device does not send the configuration information to the terminal device. In this case, the access network device may indicate, in a beam indication manner (for example, the beam indication manner described in the foregoing Table 1) in an existing standard, beams used by the terminal device to transmit the plurality of physical channels and/or physical signals.

It can be learned that the capability information is reported to the access network device, so that it is helpful for the access network device to accurately determine whether the configuration information used to indicate to transmit the plurality of physical channels and/or physical signals by using the unified beam can be sent to the terminal device.

Optionally the capability information is further used to indicate channels or signals whose beams are supported by the terminal device in being used as the unified beam, and the configuration information is further used to indicate a channel or signal whose beam is used as the unified beam. That is, the capability information is further used to indicate specific channels or signals whose beams are supported by the terminal device in being used as the unified beam, and the configuration information is further used to indicate a specific channel or signal whose beam is used as the unified beam. Based on this optional manner, the terminal device can report, to the access network device, the channels or signals whose beams are supported by the terminal device in being used as the unified beam, so that the access network device can flexibly configure, for the terminal device, the channel or signal whose beam is used as the unified beam.

For example, the capability information indicates that the terminal device supports a beam of a PDCCH and a beam of a PDSCH in being used as the unified beam. After receiving the capability information, the access network device may select a channel from the PDCCH and the PDSCH, and indicate the terminal device to use a beam of the channel as the unified beam. For example, if the access network device selects the PDCCH, the configuration information sent by the access network device is further used to indicate the terminal device to use the beam of the PDCCH as the unified beam.

Optionally, the capability information is further used to indicate physical channels and/or physical signals supported by the terminal device in being transmitted based on the unified beam, and the configuration information is further used to indicate a physical channel and/or physical signal transmitted based on the unified beam. That is, the capability information is further used to indicate specific physical channels and/or physical signals supported by the terminal device in being transmitted based on the unified beam, and the configuration information is further used to indicate a specific physical channel and/or physical signal transmitted by the terminal device based on the unified beam. Based on this optional manner, the terminal device can report, to the access network device, the physical channels and/or physical signals supported by the terminal device in being transmitted based on the unified beam, so that the access network device can flexibly configure, for the terminal device, the physical channel and/or physical signal transmitted based on the unified beam.

For example, the capability information indicates that a PDSCH, a PDCCH, a CSI-RS, an SRS, a PUCCH, and a PUSCH are supported in being transmitted based on the unified beam. After receiving the capability information, the access network device may select one or more of the PDSCH, the PDCCH, the CSI-RS, the SRS, the PUCCH, and the PUSCH, and indicate the terminal device to transmit the selected channel or signals based on the unified beam. For example, if the access network device selects the PDSCH, the PDCCH, and the CSI-RS, the configuration information sent by the access network device is further used to indicate the terminal device to transmit the PDSCH, the PDCCH, and the CSI-RS based on the unified beam.

Optionally, even if the terminal device does not send the capability information, the configuration information sent by the access network device may indicate a channel or signal whose beam is used as the unified beam, and the configuration information sent by the access network device may indicate a physical channel and/or physical signal transmitted based on the unified beam.

Optionally, the configuration information may not specifically indicate a channel or signal whose beam is used as the unified beam, and may not specifically indicate a physical channel and/or physical signal transmitted based on the unified beam. The protocol may specify, in advance, a channel or signal whose beam is used as the unified beam, and a physical channel and/or physical signal transmitted based on the unified beam. For example, the protocol specifies, in advance, that a beam used by the terminal device to transmit a PDCCH is used as the unified beam, and a PDSCH, the PDCCH, a CSI-RS, an SRS, a PUCCH, and a PUSCH are transmitted based on the unified beam. In this case, the configuration information only needs to indicate to transmit the plurality of physical channels and/or physical signals based on the unified beam; and does not need to indicate that a channel whose beam is used as the unified beam is the PDCCH, and also does not need to indicate that physical channels and/or physical signals transmitted based on the unified beam are the PDSCH, the PDCCH, the CSI-RS, the SRS, the PUCCH, and the PUSCH.

In a possible implementation, the configuration information is specifically used to indicate the terminal device to transmit the plurality of physical channels and/or physical signals based on the unified beam in a same carrier. Based on this possible implementation, the terminal device can be configured to transmit the plurality of physical channels and/or physical signals based on the unified beam by using a carrier as a unit, thereby helping reduce beam indication signaling overheads.

Two carriers are used as an example. If the configuration information is used to indicate the terminal device to transmit the plurality of physical channels and/or physical signals based on the unified beam in a same carrier, after receiving the configuration information, the terminal device transmits, in a carrier 1, the plurality of physical channels and/or physical signals based on a unified beam corresponding to the carrier 1, and the terminal device transmits, in a carrier 2, the plurality of physical channels and/or physical signals based on a unified beam corresponding to the carrier 2. For example, the unified beam corresponding to the carrier 1 may be a beam used by the terminal device to receive a PDCCH in the carrier 1, and the unified beam corresponding to the carrier 2 may be a beam used by the terminal device to receive the PDCCH in the carrier 2. The beam used by the terminal device to receive the PDCCH in the carrier 1 may be the same as or different from the beam used by the terminal device to receive the PDCCH in the carrier 2. For different carriers, the terminal device may independently indicate beams used by the terminal device to receive the PDCCH.

Optionally, in addition to being used to indicate the terminal device to transmit the plurality of physical channels and/or physical signals based on the unified beam in a same carrier, the configuration information may further indicate carriers in which the plurality of physical channels and/or physical signals are transmitted based on unified beam. For example, the configuration information may specifically indicate to transmit, in a carrier 1, the plurality of physical channels and/or physical signals based on a unified beam corresponding to the carrier 1, and transmit, in a carrier 2, the plurality of physical channels and/or physical signals based on a unified beam corresponding to the carrier 2. Certainly, the configuration information may alternatively not indicate carriers in which the plurality of physical channels and/or physical signals are transmitted based on unified beams, and the protocol may specify, in advance, specific carriers in which the plurality of physical channels and/or physical signals are transmitted based on unified beams. After receiving the configuration information used to signals based on the unified beam in a same carrier, the terminal device can transmit the plurality of physical channels and/or physical signals based on the unified beams in the carriers specified by the protocol.

Optionally, channels whose beams are used as unified beams in different carriers may be the same or different, and a plurality of physical channels and/or physical signals transmitted by using unified beams in different carriers may be the same or different. For example, a unified beam corresponding to a carrier 1 may be a beam used by the terminal device to receive a PDCCH in the carrier 1, and a unified beam corresponding to a carrier 2 may be a beam used by the terminal device to send a PUCCH in the carrier 2. In the carrier 1, the PDCCH and a PDSCH are transmitted by using the unified beam corresponding to the carrier 1, and in the carrier 2, the PUCCH and a CSI-RS are transmitted by using the unified beam corresponding to the carrier 2. Channels whose beams are used as unified beams in different carriers may be indicated by the configuration information, or may be specified by the protocol in advance. A plurality of physical channels and/or physical signals transmitted by using unified beams in different carriers may be indicated by the configuration information, or may be specified by the protocol in advance.

In another possible implementation, the configuration information is specifically used to indicate the terminal device to transmit the plurality of physical channels and/or physical signals based on the unified beam in a same carrier group. The carrier group is a set including a plurality of carriers. A principle in which the configuration information indicates the terminal device to transmit the plurality of physical channels and/or physical signals based on the unified beam in a same carrier group is the same as the principle in which the configuration information indicates the terminal device to transmit the plurality of physical channels and/or physical signals based on the unified beam in a same carrier. Details are not described herein. Based on this possible implementation, the terminal device can be configured to transmit the plurality of physical channels and/or physical signals based on the unified beam by using a carrier group as a unit, thereby helping reduce beam indication signaling overheads.

In still another possible implementation, the configuration information is specifically used to indicate the terminal device to transmit the plurality of physical channels and/or physical signals based on the unified beam in a same bandwidth. A principle in which the configuration information indicates the terminal device to transmit the plurality of physical channels and/or physical signals based on the unified beam in a same bandwidth is the same as the principle in which the configuration information indicates the terminal device to transmit the plurality of physical channels and/or physical signals based on the unified beam in a same carrier. Details are not described herein. Based on this possible implementation, the terminal device can be configured to transmit the plurality of physical channels and/or physical signals based on the unified beam by using a bandwidth as a unit, thereby helping reduce beam indication signaling overheads.

In still another possible implementation, the configuration information is specifically used to indicate the terminal device to transmit the plurality of physical channels and/or physical signals based on the unified beam in a same bandwidth group. The bandwidth group is a set including a plurality of bandwidths. A principle in which the configuration information indicates the terminal device to transmit the plurality of physical channels and/or physical signals based on the unified beam in a same bandwidth group is the same as the principle in which the configuration information indicates the terminal device to transmit the plurality of physical channels and/or physical signals based on the unified beam in a same carrier. Details are not described herein. Based on this possible implementation, the terminal device can be configured to transmit the plurality of physical channels and/or physical signals based on the unified beam by using a bandwidth group as a unit, thereby helping reduce beam indication signaling overheads.

In still another possible implementation, the configuration information is specifically used to indicate the terminal device to transmit the plurality of physical channels and/or physical signals based on the unified beam in a same frequency band. A principle in which the configuration information indicates the terminal device to transmit the plurality of physical channels and/or physical signals based on the unified beam in a same frequency band is the same as the principle in which the configuration information indicates the terminal device to transmit the plurality of physical channels and/or physical signals based on the unified beam in a same carrier. Details are not described herein. Based on this possible implementation, the terminal device can be configured to transmit the plurality of physical channels and/or physical signals based on the unified beam by using a frequency band as a unit, thereby helping reduce beam indication signaling overheads.

In still another possible implementation, the configuration information is specifically used to indicate the terminal device to transmit the plurality of physical channels and/or physical signals based on the unified beam in a same frequency band group. The frequency band group is a set including a plurality of frequency bands. A principle in which the configuration information indicates the terminal device to transmit the plurality of physical channels and/or physical signals based on the unified beam in a same frequency band group is the same as the principle in which the configuration information indicates the terminal device to transmit the plurality of physical channels and/or physical signals based on the unified beam in a same carrier. Details are not described herein. Based on this possible implementation, the terminal device can be configured to transmit the plurality of physical channels and/or physical signals based on the unified beam by using a frequency band group as a unit, thereby helping reduce beam indication signaling overheads.

In still another possible implementation, the configuration information is specifically used to indicate to transmit the plurality of physical channels and/or physical signals based on the unified beam in an entire bandwidth. Based on this possible implementation, the terminal device can be configured to transmit the plurality of physical channels and/or physical signals based on the unified beam by using an entire bandwidth as a unit, thereby helping reduce beam indication signaling overheads.

202: The access network device sends first information to the terminal device. Correspondingly, the terminal device may receive the first information sent by the access network device.

In this embodiment of this application, after sending the configuration information to the terminal device, the access network device sends the first information to the terminal device. The first information is used to indicate a beam. The first information may be DCI signaling, or may be other signaling that can indicate a beam.

For example, the first information is DCI signaling. When the DCI signaling is used to schedule a PDSCH, the DCI signaling may include a TCI field, and the TCI field indicates a TCI state. As described above, the TCI state indicates a receive beam of the terminal device.

When the DCI signaling is used to trigger reporting of an aperiodic CSI-RS, the DCI signaling may include a CSI request field, the CSI request field indicates a trigger state, and the terminal device may determine a TCI state from the trigger state.

When the DCI signaling is used to trigger sending of an aperiodic SRS, the DCI signaling may include an SRS request field, the SRS request field points to SRS-TriggerState, and the terminal device may determine a spatial relation from SRS-TriggerState. As described above, the spatial relation indicates a transmit beam of the terminal device.

When the DCI signaling is used to schedule a PUSCH, the DCI signaling may include a spatial relation info (SRI) field, and a spatial relation is indicated by using the SRI field.

Therefore, when the DCI signaling is used to schedule a PDSCH or trigger reporting of an aperiodic CSI-RS, the DCI signaling indicates a receive beam of the terminal device. When the DCI signaling is used to trigger sending of an aperiodic SRS or schedule a PUSCH, DCI signaling indicates a transmit beam of the terminal device.

203: The terminal device determines, based on the configuration information and the beam indicated by the first information, a beam used by the terminal device to transmit a first physical channel or signal, where the beam used by the terminal device to transmit the first physical channel or signal is the unified beam.

In this embodiment of this application, after receiving the first information, the terminal device determines, based on the beam indicated by the first information, the beam used by the terminal device to transmit the first physical channel or signal.

It may also be understood that the first information is used to indicate the beam used by the terminal device to transmit the first physical channel or signal. The first physical channel or signal may be any one of the PDCCH, the PDSCH, the CSI-RS, the PUSCH, the PUCCH, and the SRS.

If the beam indicated by the first information is a receive beam of the terminal device, and the first physical channel or signal is a physical downlink channel or signal, the terminal device determines, as a beam used by the terminal device to receive the first physical channel or signal, the beam indicated by the first information.

If the beam indicated by the first information is a receive beam of the terminal device, and the first physical channel or signal is a physical uplink channel or signal, the terminal device determines, as a beam used by the terminal device to send the first physical channel or signal, a transmit beam corresponding to the beam indicated by the first information.

If the beam indicated by the first information is a transmit beam of the terminal device, and the first physical channel or signal is a physical downlink channel or signal, the terminal device determines, as a beam used by the terminal device to receive the first physical channel or signal, a receive beam corresponding to the beam indicated by the first information.

If the beam indicated by the first information is a transmit beam of the terminal device, and the first physical channel or signal is a physical uplink channel or signal, the terminal device determines, as a beam used by the terminal device to send the first physical channel or signal, the beam indicated by the first information.

It can be learned that in the method described in FIG. 2, the beam of the first physical channel or signal may be used as an anchor, to transmit another physical channel and/or physical signal based on the beam of the first physical channel or signal. In this way, provided that the access network device notifies, to the terminal device, the beam used to transmit the first physical channel or signal, the terminal device can determine, based on the beam used to transmit the first physical channel or signal, a beam used to transmit the another physical channel and/or physical signal. The access network device does not need to indicate beams for all physical channels and/or physical signals by using beam indication signaling. It can be learned that, based on the method described in FIG. 2, it is helpful to reduce beam indication signaling overheads.

The following uses an example in which the first information is DCI signaling to describe two processing cases performed after the terminal device receives the first information.

Figure 3:
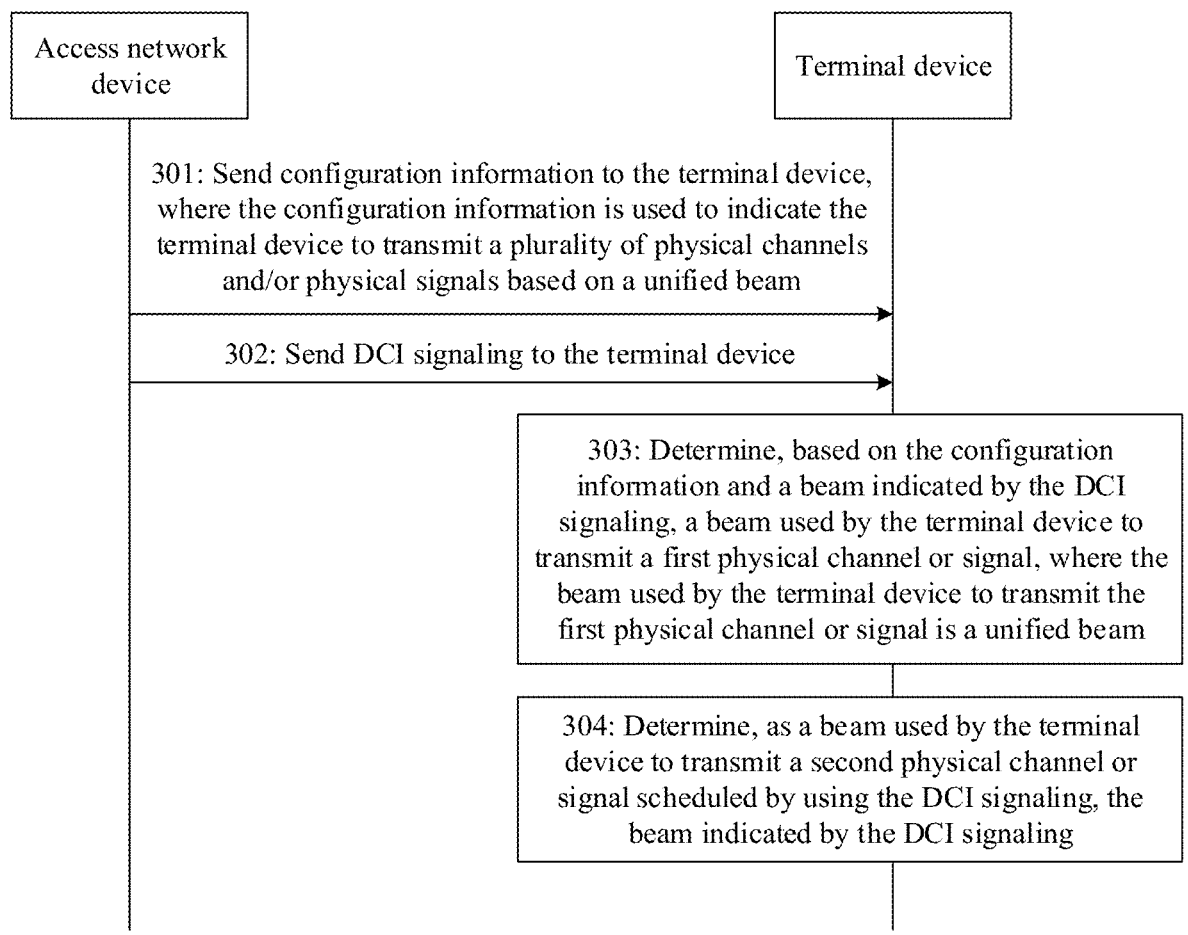
FIG. 3 is a schematic flowchart of another beam indication method according to an embodiment of this application.

Case 1: FIG. 3 is a schematic flowchart of another beam indication method according to an embodiment of this application. As shown in FIG. 3, the beam indication method includes the following operation 301 to operation 304. Specific implementations of the operation 301 to the operation 303 are the same as the specific implementations of the operation 201 to the operation 203. Details are not described herein again.

304: The terminal device determines, as a beam used by the terminal device to transmit a second physical channel or signal scheduled by using the DCI signaling, the beam indicated by the DCI signaling.

The DCI signaling is used to schedule the second physical channel or signal, and the second physical channel or signal is a physical channel or signal transmitted by the terminal device based on the unified beam. That is, the DCI signaling is used to schedule the second physical channel or signal and is also used to indicate the beam corresponding to the scheduled second physical channel or signal; and is used to indicate the beam corresponding to the first physical channel or signal.

Optionally, the second physical channel or signal may be any one of the following channels or signals transmitted based on the unified beam: a PDSCH, an aperiodic CSI-RS, an aperiodic SRS, or a PUSCH. The first physical channel or signal may be any one of the following channels or signals:

a PDCCH, a periodic CSI-RS, a semi-persistent CSI-RS, a periodic SRS, a semi-persistent SRS, or a PUCCH.

For example, the first physical channel is a PDCCH, that is, the unified beam is a beam used by the terminal device to receive the PDCCH. Channels or signals transmitted by the terminal device based on the unified beam include a PDCCH, a PDSCH, a periodic CSI-RS, a PUSCH, a PUCCH, and a periodic SRS. In this case, the second physical channel or signal scheduled by using the DCI signaling may be a PDSCH or a PUSCH.

It can be learned that, the operation 304 is implemented, so that the beam used by the terminal device to transmit the second physical channel or signal is not determined based on the beam of the first physical channel or signal, and the beam of the second physical channel or signal may be updated before the first physical channel or signal, or may be updated after the first physical channel or signal, so that update time of the beam of the second physical channel or signal is more flexible.

Optionally, if there is another physical channel or signal transmitted based on the unified beam in addition to the first physical channel or signal and the second physical channel or signal, a beam used by the terminal device to transmit the another physical channel or signal is determined based on the beam used to transmit the first physical channel or signal, that is, the beam used by the terminal device to transmit the another physical channel or signal is determined based on the unified beam.

The following further describes, by using several specific examples, the solution described in the case 1:

Example 1: The access network device sends the configuration information to the terminal device, where the configuration information indicates to use, as the unified beam, a beam used by the terminal device to receive a PDCCH (the first physical channel is the PDCCH), and indicates the terminal device to receive a PDSCH and the PDCCH by using the unified beam.

Figure 4:
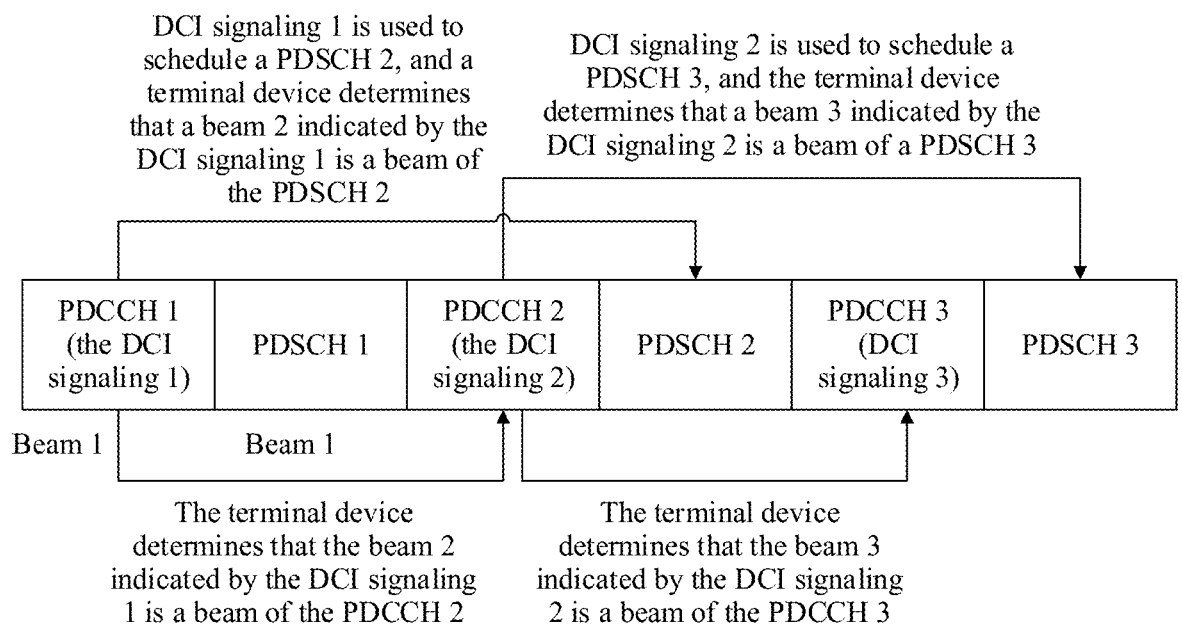
FIG. 4 is a schematic diagram of a beam indicator according to an embodiment of this application.

As shown in FIG. 4, a PDCCH 1 carries DCI signaling 1, and the DCI signaling 1 is used to schedule a PDSCH 2 and indicate a beam 2. The DCI signaling 1 includes scheduling information of the PDSCH 2, for example, may include an antenna port and a modulation and coding scheme MCS. After receiving the PDCCH 1, the terminal device determines, as a beam used by the terminal device to receive the PDSCH 2 and a beam used by the terminal device to receive a PDCCH 2, the beam 2 indicated by the DCI signaling 1. Likewise, DCI signaling 2 in the PDCCH 2 is used to schedule a PDSCH 3 and indicate a beam 3. After receiving the PDCCH 2, the terminal device determines, as a beam used by the terminal device to receive the PDSCH 3 and a beam used by the terminal device to receive a PDCCH 3, the beam 3 indicated by the DCI signaling 2.

Example 2: The access network device sends the configuration information to the terminal device, where the configuration information indicates to use, as the unified beam, a beam used by the terminal device to receive a PDCCH, and indicates the terminal device to receive a PDSCH and the PDCCH by using the unified beam and send a PUCCH by using a transmit beam corresponding to the unified beam.

Figure 5:
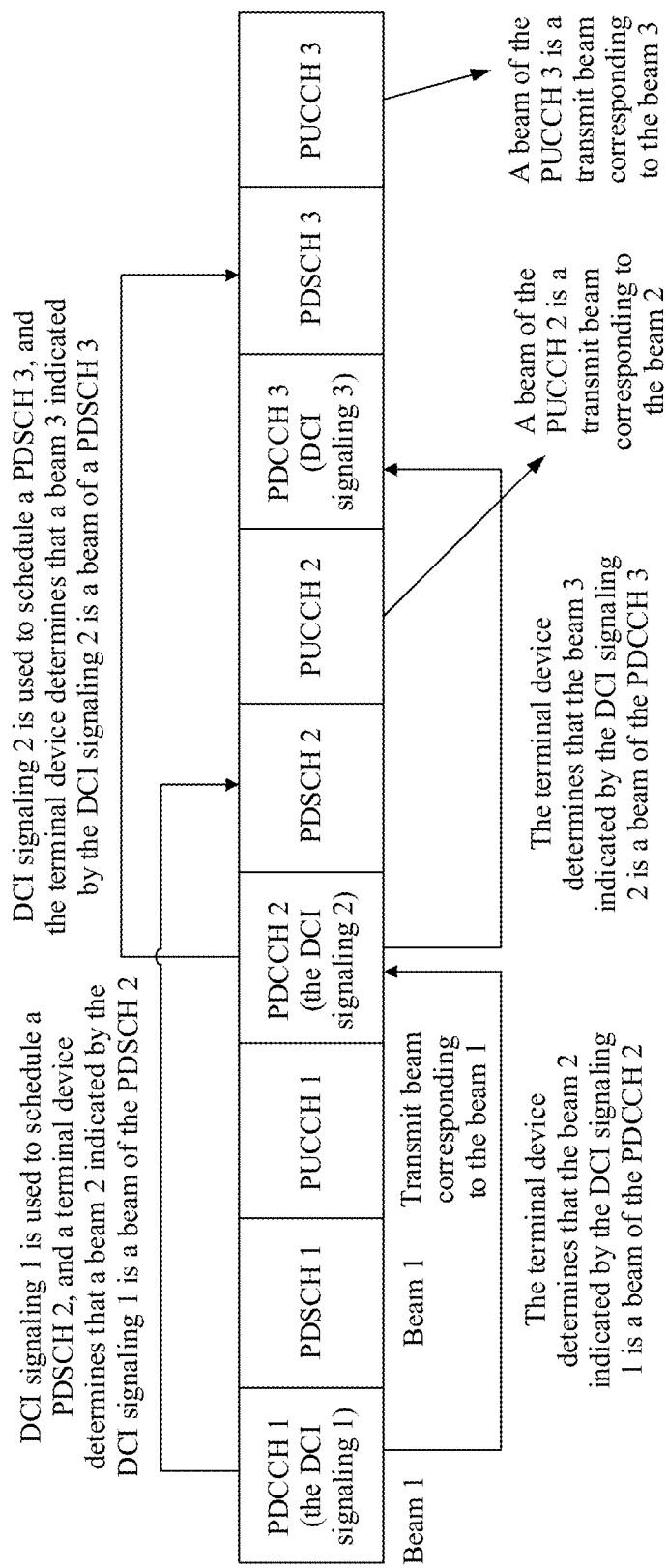
FIG. 5 is a schematic diagram of another beam indicator according to an embodiment of this application.

As shown in FIG. 5, DCI signaling 1 in a PDCCH 1 is used to schedule a PDSCH 2 and indicate a beam 2. After receiving the PDCCH 1, the terminal device determines, as a beam used by the terminal device to receive the PDSCH 2 and a beam used by the terminal device to receive a PDCCH 2, the beam 2 indicated by the DCI signaling 1. After determining that the beam used to receive the PDCCH 2 is the beam 2, the terminal device determines, based on the beam used to receive the PDCCH 2, a beam used to send a PUCCH 2. As shown in FIG. 5, a transmit beam corresponding to the beam 2 is determined as the beam used to send the PUCCH 2.

Likewise, DCI signaling 2 in the PDCCH 2 is used to schedule a PDSCH 3 and indicate a beam 3. After receiving the PDCCH 2, the terminal device determines, as a beam used by the terminal device to receive the PDSCH 3 and a beam used by the terminal device to receive a PDCCH 3, the beam 3 indicated by the DCI signaling 2. After determining that the beam used to receive the PDCCH 3 is the beam 3, the terminal device determines, based on the beam used to receive the PDCCH 3, a beam used to send a PUCCH 3. As shown in FIG. 5, the terminal device determines, as the beam used to send the PUCCH 3, a transmit beam corresponding to the beam 3.

Example 3: The access network device sends the configuration information to the terminal device, where the configuration information indicates to use, as the unified beam, a beam used by the terminal device to receive a PDCCH, and indicates the terminal device to receive a PDSCH, the PDCCH, and an aperiodic CSI-RS by using the unified beam and send a PUCCH by using a transmit beam corresponding to the unified beam.

Figure 6:
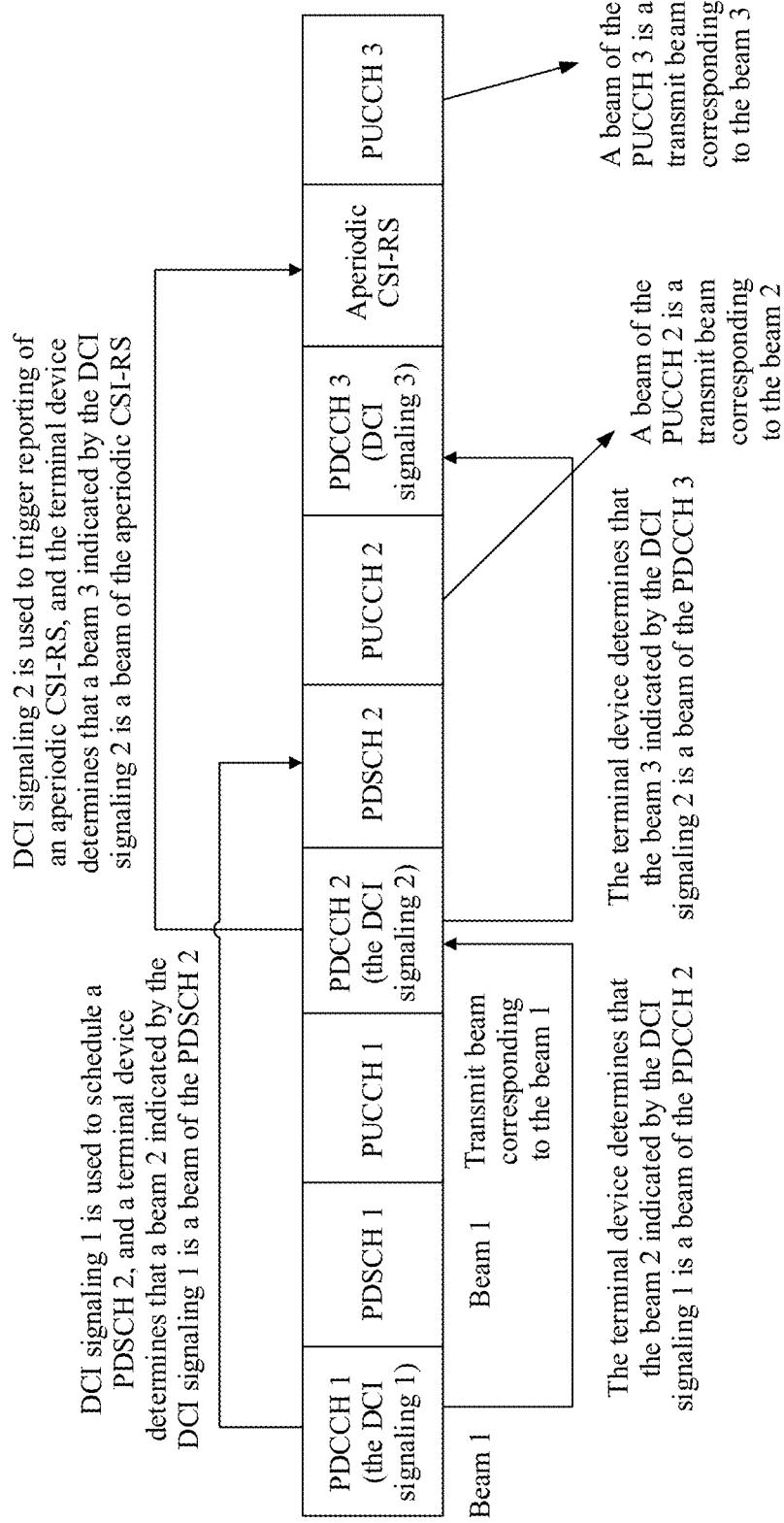
FIG. 6 is a schematic diagram of still another beam indicator according to an embodiment of this application.

As shown in FIG. 6, DCI signaling 1 in a PDCCH 1 is used to schedule a PDSCH 2 and indicate a beam 2. After receiving the PDCCH 1, the terminal device determines, as a beam used by the terminal device to receive the PDSCH 2 and a beam used by the terminal device to receive a PDCCH 2, the beam 2 indicated by the DCI signaling 1. After determining that the beam used to receive the PDCCH 2 is the beam 2, the terminal device determines, based on the beam used to receive the PDCCH 2, a beam used to send a PUCCH 2. As shown in FIG. 6, a transmit beam corresponding to the beam 2 is determined as the beam used to send the PUCCH 2.

DCI signaling 2 in the PDCCH 2 is used to trigger reporting of an aperiodic CSI-RS and indicate a beam 3. After receiving the PDCCH 2, the terminal device determines, as a beam used by the terminal device to receive the aperiodic CSI-RS, the beam 3 indicated by the DCI signaling 2, and determines the beam 3 as a beam used by the terminal device to receive a PDCCH 3. After determining that the beam used to receive the PDCCH 3 is the beam 3, the terminal device determines, based on the beam used to receive the PDCCH 3, a beam used to send a PUCCH 3. As shown in FIG. 6, a transmit beam corresponding to the beam 3 is determined as the beam used to send the PUCCH 3.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam of the second physical channel or signal scheduled by using the DCI signaling. The time interval between the DCI signaling and the second physical channel or signal scheduled by using the DCI signaling is a time interval between end time of the DCI signaling and start time of the second physical channel or signal scheduled by using the DCI signaling. The time required by the terminal device to adjust the beam to the beam of the second physical channel or signal scheduled by using the DCI signaling is time required by the terminal device to switch from a first target beam to the beam of the second physical channel or signal scheduled by using the DCI signaling. The first target beam is a beam that is different from the beam of the second physical channel or signal scheduled by using the DCI signaling and that is recently used by the terminal device before the terminal device transmits the second physical channel or signal scheduled by using the DCI signaling. In this optional manner, if a time interval between the DCI signaling and the second physical channel or signal scheduled by using the DCI signaling is less than the first duration, the terminal device cannot successfully receive the second physical channel or signal scheduled by using the DCI signaling. Therefore, based on this optional manner, it is helpful for the terminal device to successfully receive the second physical channel or signal scheduled by using the DCI signaling.

For example, as shown in FIG. 4, one PDCCH and one PDSCH belong to one slot, and FIG. 4 shows three slots. For ease of description, the three slots are referred to as a slot n−1, a slot n, and a slot n+1. A time interval between the DCI signaling 1 and the PDSCH 2 is greater than or equal to first duration. The time interval between the DCI signaling 1 and the PDSCH 2 is a time interval between end time of the DCI signaling 1 and start time of the PDSCH 2. The first duration is greater than or equal to a sum of time required by the terminal device to decode the DCI signaling 1 and time required to switch a beam 1 to the beam 2 used to transmit the PDSCH 2. FIG. 4 shows an example in which the time interval between the DCI signaling 1 and the PDSCH 2 is one slot. Likewise, a time interval between the DCI signaling 2 and the PDSCH 3 is greater than or equal to first duration, and the first duration is greater than or equal to a sum of time required by the terminal device to decode the DCI signaling 2 and time required to switch the beam 2 to the beam 3 used to transmit the PDSCH 3. FIG. 4 shows an example in which the time interval between the DCI signaling 2 and the PDSCH 3 is one slot.

Optionally, a time interval between the DCI signaling and the first physical channel or signal is greater than or equal to third duration, and the third duration is greater than or equal to a sum of the time required by the terminal device to decode the DCI signaling and time required to adjust a beam to the beam of the first physical channel or signal. Optionally, the first duration may be the same as or different from the third duration. The time interval between the DCI signaling and the first physical channel or signal is a time interval between the end time of the DCI signaling and start time of the first physical channel or signal. The time required by the terminal device to adjust the beam to the beam of the first physical channel or signal is time required by the terminal device to switch from a second target beam to the beam of the first physical channel or signal. The second target beam is a beam that is different from the beam of the first physical channel or signal and that is recently used by the terminal device before the terminal device transmits the first physical channel or signal. In this optional manner, if a time interval between the DCI signaling and the first physical channel or signal is less than the third duration, the terminal device cannot successfully receive the first physical channel or signal. Therefore, based on this optional manner, it is helpful for the terminal device to successfully receive the first physical channel or signal.

For example, as shown in FIG. 4, a time interval between the DCI signaling 1 and the PDCCH 2 is greater than or equal to third duration. The time interval between the DCI signaling 1 and the PDCCH 2 is a time interval between the end time of the DCI signaling 1 and start time of the PDCCH 2. The third duration is greater than or equal to a sum of the time required by the terminal device to decode the DCI signaling 1 and time required to switch the beam 1 to the beam 2 used to transmit the PDCCH 2. FIG. 4 shows an example in which the time interval between the DCI signaling 1 and the PDCCH 2 is one slot. Likewise, a time interval between the DCI signaling 2 and the PDCCH 3 is greater than or equal to third duration, and the third duration is greater than or equal to a sum of time required by the terminal device to decode the DCI signaling 2 and time required to switch the beam 2 to the beam 3 used to transmit the PDCCH 3. FIG. 4 shows an example in which the time interval between the DCI signaling 2 and the PDCCH 3 is one slot.

According to analysis, a default beam mechanism of the existing R16 can be used as a starting point for designing a "unified beam" of uplink and downlink data and control channels in the R17, and should be used even for an intra-cell carrier aggregation scenario. However, complicated RRC configurations are required, for example, the network needs to set a plurality of enablers for different channels/signals. In addition, in different default modes, the terminal device may assume different control channel resource set TCI states (different receive beams). For example, for a default mode of a PUSCH, refer to a TCI state corresponding to a CORESET with a lowest configured CORESET ID, and for a default mode of a PDSCH, refer to a TCI state corresponding to a CORESET with a lowest CORESET ID in the latest slot. This may lead to frequent beam switching of the terminal. (According to our analysis, the existing Rel-16 default beam modes can be the starting point to enable the 'unified beam' in Rel-17 for DL and UL data and control in Rel-17, even for the intra-cell CA case. However, complicated RRC configurations are required, for example, the network needs to set the multiple enablers for different channels/signals. In addition, different CORESET TCI state (a.k.a., different Rx beam) may be assumed by the UE for different default modes, for example, the default beam for PUSCH is the TCI state of the CORESET with lowest ID configured, while the default beam for PDSCH is the TCI state of the CORESET with the lowest ID in the latest slot. This may lead to frequent beam switch on the UE side.)

To reduce signaling overheads and also mitigate the ambiguities in the foregoing protocol, a unified beam enabler can be introduced. Provided that the access network device sets one single enabler, the terminal device can use a unified beam to receive uplink and downlink data and control channels in a group of cells. Particularly, following a design idea of the R16, a beam of a PDCCH can be used as a unified beam. Specifically, all CORESETs can be updated to a same common TCI state, and the access network device can reuse a TCI field in DCI for beam indication. The indication includes a beam of a PDSCH and a beam of the PDCCH. (To further reduce the signaling overhead and to mitigate the ambiguities and, a unified beam enabler can be introduced. With one single enabler. UE should use the configured unified beam for all the DL/UL data/control transmission in a group of CCs. Particularly, following Rel-16 design. PDCCH beam can be the unified beam. To be more specific, all CORESETs can be updated with a same common TCI state, and gNB can reuse the TCI field in the DCI for the beam indication, including the beam used for both PDCCH and PDSCH.)

Figure 7:
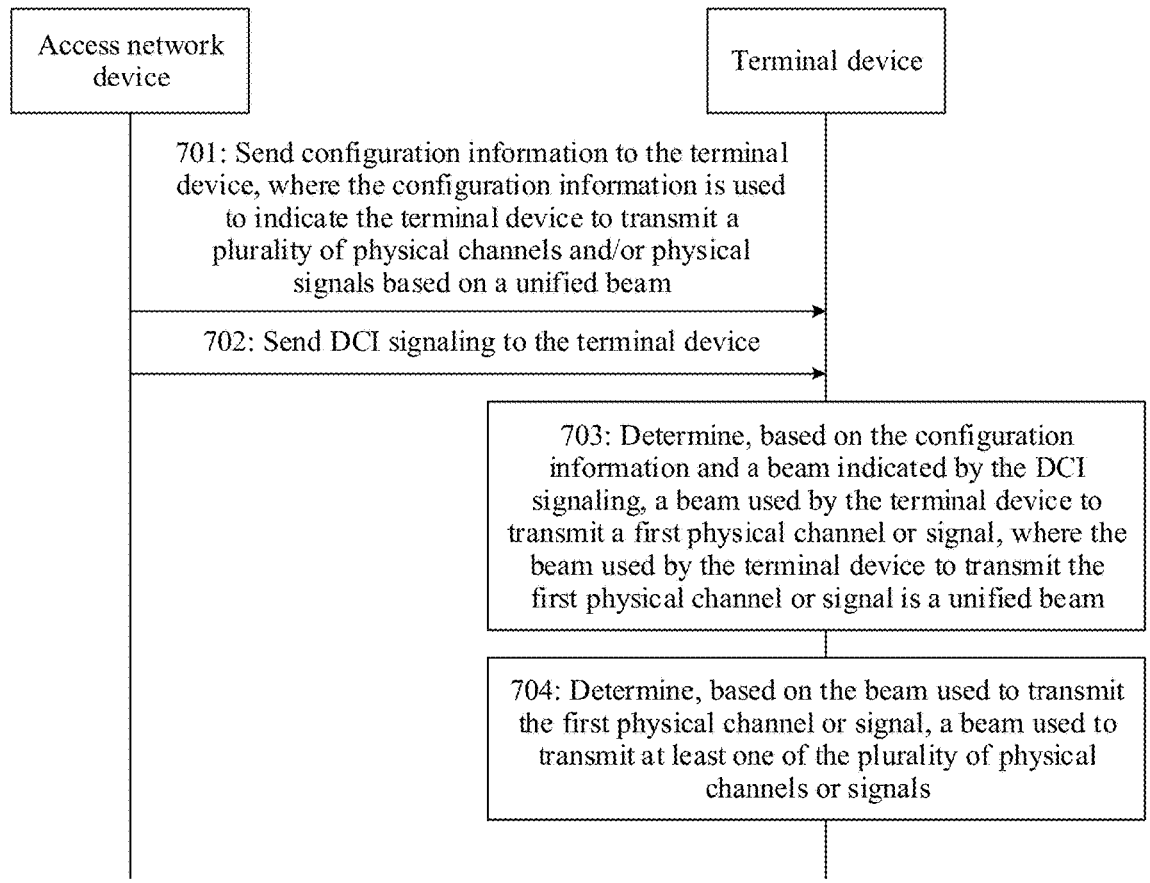
FIG. 7 is a schematic flowchart of still another beam indication method according to an embodiment of this application.

Case 2: FIG. 7 is a schematic flowchart of a beam indication method according to an embodiment of this application. As shown in FIG. 7, the beam indication method includes the following operation 701 to operation 704. Specific implementations of the operation 701 to the operation 703 are the same as the specific implementations of the operation 201 to the operation 203. Details are not described herein again.

704: The terminal device determines, based on the beam used to transmit the first physical channel or signal, a beam used to transmit at least one of the plurality of physical channels or signals. The plurality of physical channels or signals are a plurality of physical channels or signals transmitted based on the unified beam.

The first physical channel or signal may be any one of the PDCCH, the PDSCH, the CSI-RS, the PUSCH, the PUCCH, and the SRS.

The DCI signaling may be used to schedule the first physical channel or signal. For example, the first physical channel is a PDSCH, and the DCI signaling is used to schedule the PDSCH. Alternatively, a physical channel or signal scheduled by using the DCI signaling is different from the first physical channel or signal. For example, the first physical channel is a PDCCH, and the DCI signaling is used to schedule a PDSCH.

The terminal device may determine, based on the beam used to transmit the first physical channel or signal, a beam corresponding to a second physical channel or signal scheduled by using the DCI signaling or a beam corresponding to another physical channel or signal.

It can be learned that, the operation 704 is implemented, so that a beam used by the terminal device to transmit another physical channel or signal can be determined based on the beam used to transmit the first physical channel or signal. In this way, the beam used by the terminal device to transmit the another physical channel or signal does not need to be indicated by using additional beam indication signaling, thereby helping reduce beam indication signaling overheads.

The following further describes, by using several specific examples, the solution described in the case 2:

Example 1: The access network device sends the configuration information to the terminal device, where the configuration information indicates to use, as the unified beam, a beam used by the terminal device to receive a PDCCH (the first physical channel is the PDCCH), and indicates the terminal device to receive a PDSCH and the PDCCH by using the unified beam.

Figure 8:
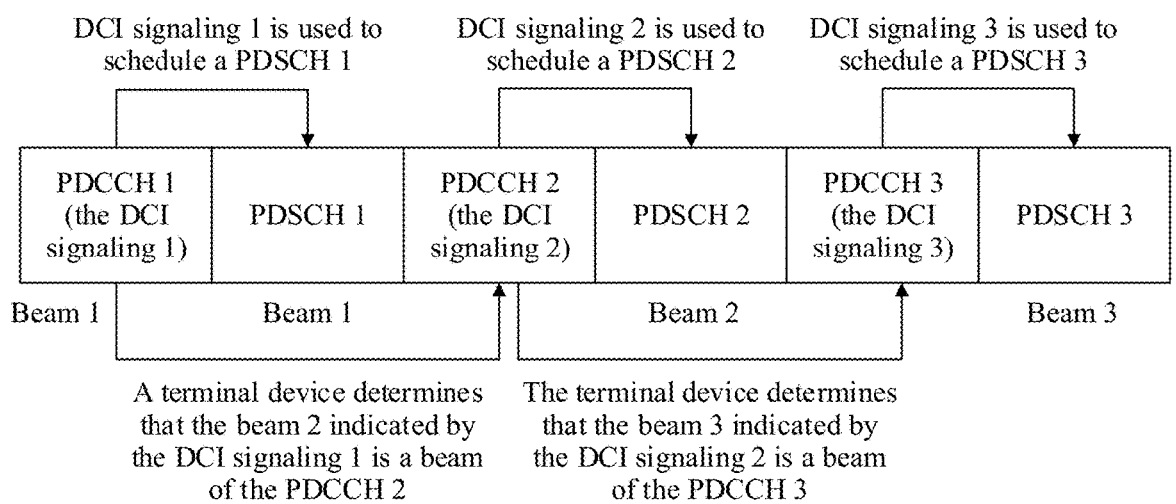
FIG. 8 is a schematic diagram of still another beam indicator according to an embodiment of this application.

As shown in FIG. 8, DCI signaling 1 in a PDCCH 1 is used to schedule a PDSCH 1 and indicate a beam 2. After receiving the PDCCH 1, the terminal device determines, as a beam used by the terminal device to receive a PDCCH 2, the beam 2 indicated by the DCI signaling 1. After determining that the beam used to receive the PDCCH 2 is the beam 2, the terminal device determines, based on the beam used to receive the PDCCH 2, a beam used to receive a PDSCH 2. As shown in FIG. 8, the beam 2 is determined as the beam used to receive the PDSCH 2.

Likewise, DCI signaling 2 in the PDCCH 2 is used to schedule the PDSCH 2 and indicate a beam 3. After receiving the PDCCH 2, the terminal device determines, as a beam used by the terminal device to receive a PDCCH 3, the beam 3 indicated by the DCI signaling 2. After determining that the beam used to receive the PDCCH 3 is the beam 3, the terminal device determines, based on the beam used to receive the PDCCH 3, a beam used to receive a PDSCH 3. As shown in FIG. 8, the beam 3 is determined as the beam used to receive the PDSCH 3.

Example 2: The access network device sends the configuration information to the terminal device, where the configuration information indicates to use, as the unified beam, a beam used by the terminal device to receive a PDCCH, and indicates the terminal device to receive a PDSCH and the PDCCH by using the unified beam and send a PUCCH by using a transmit beam corresponding to the unified beam.

Figure 9:
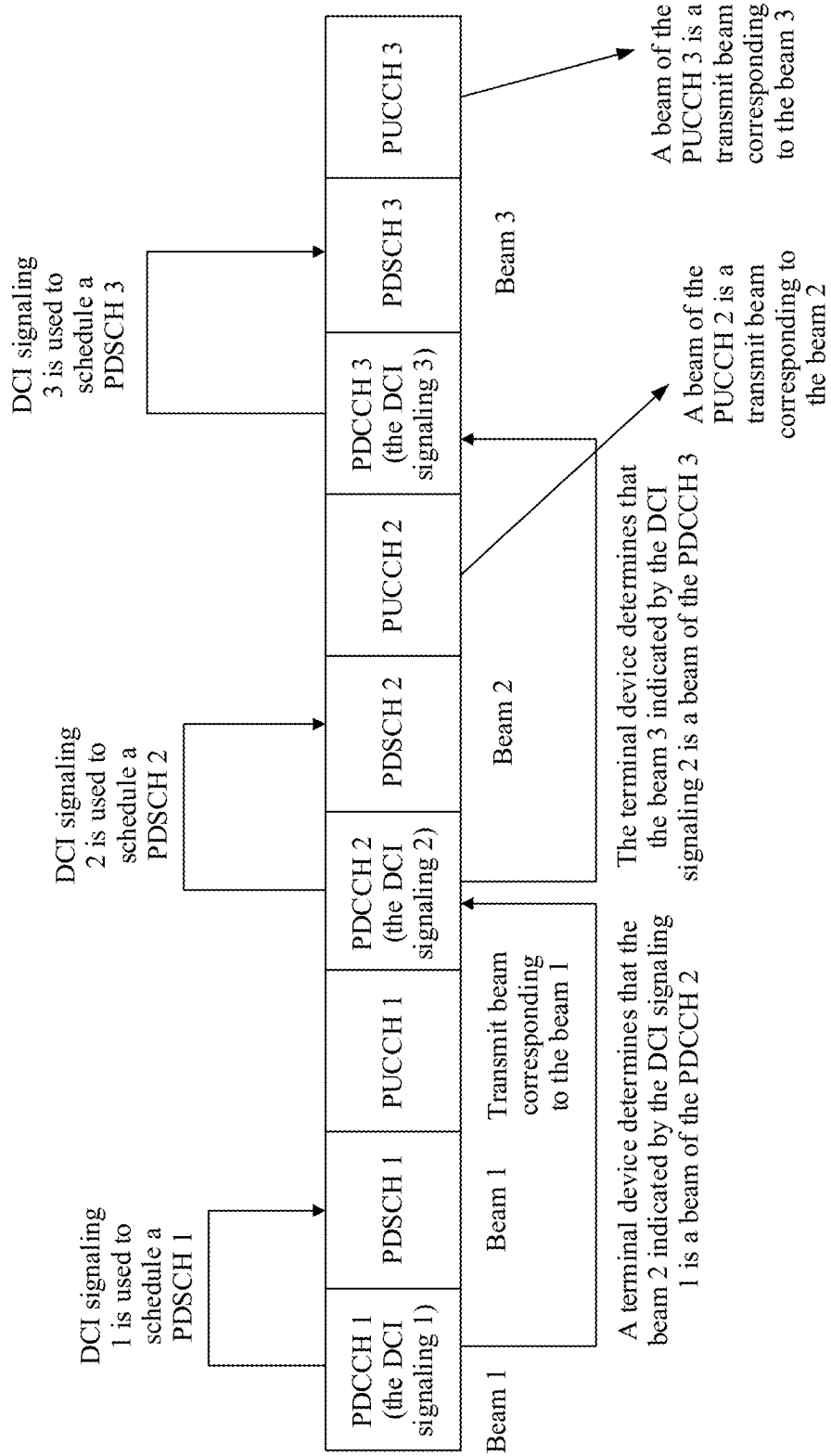
FIG. 9 is a schematic diagram of still another beam indicator according to an embodiment of this application.

As shown in FIG. 9. DCI signaling 1 in a PDCCH 1 is used to schedule a PDSCH 1 and indicate a beam 2. After receiving the PDCCH 1, the terminal device determines, as a beam used by the terminal device to receive a PDCCH 2, the beam 2 indicated by the DCI signaling 1. After determining that the beam used to receive the PDCCH 2 is the beam 2, the terminal device determines, based on the beam used to receive the PDCCH 2, a beam used to receive a PDSCH 2 and a beam used to send a PUCCH 2. As shown in FIG. 9, the terminal device determines the beam 2 as the beam used to receive the PDSCH 2, and determines, as the beam used to send the PUCCH 2, a transmit beam corresponding to the beam 2.

Likewise. DCI signaling 2 in the PDCCH 2 is used to schedule the PDSCH 2 and indicate a beam 3. After receiving the PDCCH 2, the terminal device determines, as a beam used by the terminal device to receive a PDCCH 3, the beam 3 indicated by the DCI signaling 2. After determining that the beam used to receive the PDCCH 3 is the beam 3, the terminal device determines, based on the beam used to receive the PDCCH 3, a beam used to receive a PDSCH 3 and a beam used to send a PUCCH 3. As shown in FIG. 9, the terminal device determines the beam 3 as the beam used to receive the PDSCH 3, and determines, as the beam used to send the PUCCH 3, a transmit beam corresponding to the beam 3.

Example 3: The access network device sends the configuration information to the terminal device, where the configuration information indicates to use, as the unified beam, a beam used by the terminal device to receive a PDCCH, and indicates the terminal device to receive a PDSCH, the PDCCH, and an aperiodic CSI-RS by using the unified beam and send a PUCCH by using a transmit beam corresponding to the unified beam.

Figure 10:
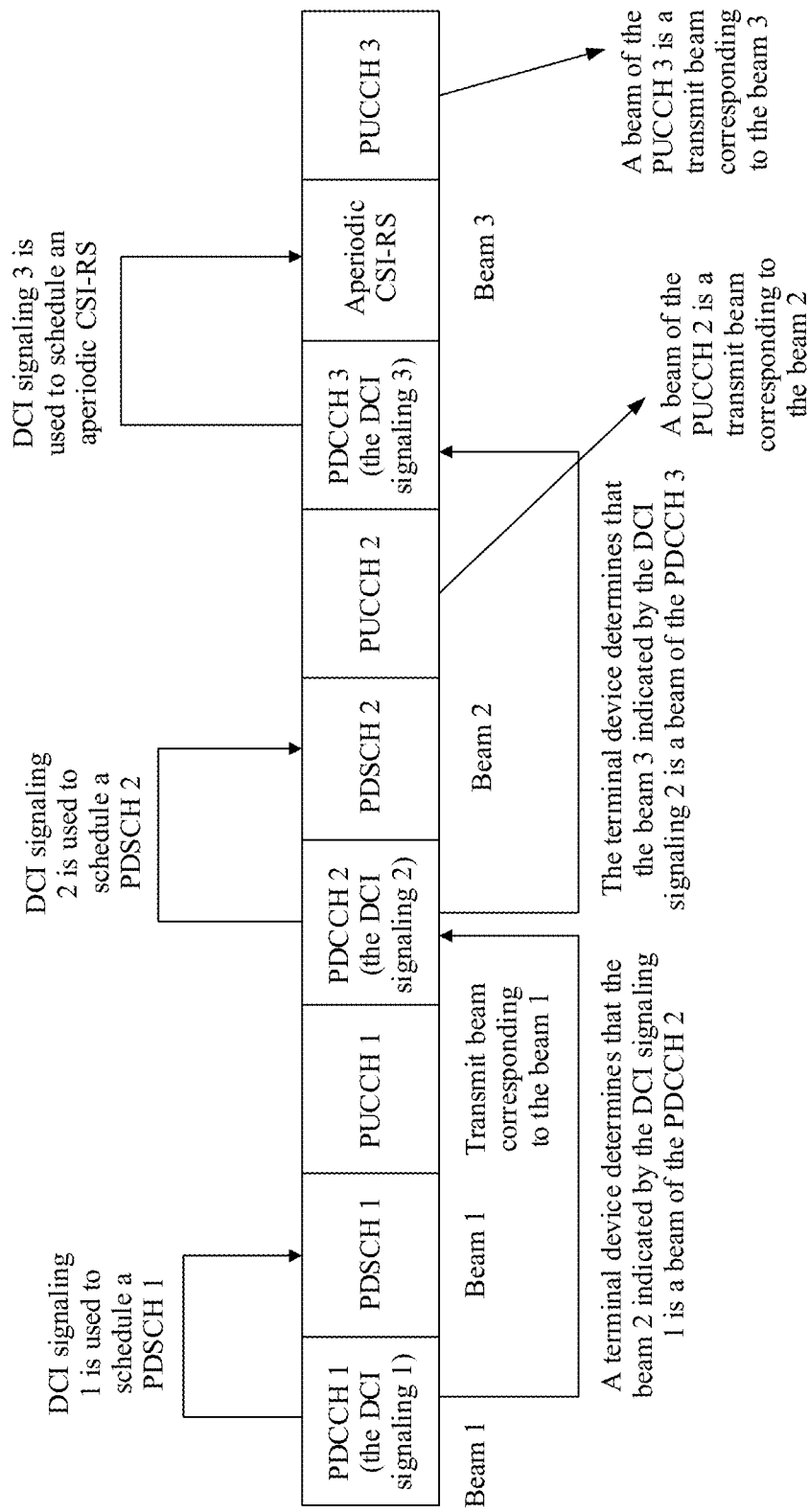
FIG. 10 is a schematic diagram of still another beam indicator according to an embodiment of this application.

As shown in FIG. 10. DCI signaling 1 in a PDCCH 1 is used to schedule a PDSCH 1 and indicate a beam 2. After receiving the PDCCH 1, the terminal device determines, as a beam used by the terminal device to receive a PDCCH 2, the beam 2 indicated by the DCI signaling 1. After determining that the beam used to receive the PDCCH 2 is the beam 2, the terminal device determines, based on the beam used to receive the PDCCH 2, a beam used to receive a PDSCH 2 and a beam used to send a PUCCH 2. As shown in FIG. 10, the terminal device determines the beam 2 as the beam used to receive the PDSCH 2, and determines, as the beam used to send the PUCCH 2, a transmit beam corresponding to the beam 2.

Likewise. DCI signaling 3 in the PDCCH 3 is used to trigger reporting of an aperiodic CSI-RS and indicate a beam 3. After receiving the PDCCH 2, the terminal device determines, as a beam used by the terminal device to receive a PDCCH 3, the beam 3 indicated by the DCI signaling 2. After determining that the beam used to receive the PDCCH 3 is the beam 3, the terminal device determines, based on the beam used to receive the PDCCH 3, a beam used to receive the aperiodic CSI-RS and a beam used to send a PUCCH 3. As shown in FIG. 10, the terminal device determines the beam 3 as the beam used to receive the aperiodic CSI-RS, and determines, as the beam used to send the PUCCH 3, a transmit beam corresponding to the beam 3.

Optionally, the DCI signaling is used to schedule the second physical channel or signal, and the at least one physical channel or signal includes the second physical channel or signal. A time interval between the DCI signaling and the second physical channel or signal is less than or equal to second duration, and the second duration is greater than or equal to time required by the terminal device to decode the DCI signaling. The time interval between the DCI signaling and the second physical channel or signal scheduled by using the DCI signaling is a time interval between end time of the DCI signaling and start time of the second physical channel or signal scheduled by using the DCI signaling. Optionally, the second duration may be equal to the foregoing first duration. Based on this optional manner, it is helpful to schedule the second physical channel or signal in time.

For example, as shown in FIG. 8, one PDCCH and one PDSCH belong to one slot, and FIG. 8 shows three slots. For ease of description, the three slots are referred to as a slot n−1, a slot n, and a slot n+1. A time interval between the DCI signaling 1 and the PDSCH 1 is less than or equal to second duration. The time interval between the DCI signaling 1 and the PDSCH 1 is a time interval between end time of the DCI signaling 1 and start time of the PDSCH 1. The second duration is greater than or equal to time required by the terminal device to decode the DCI signaling 1. FIG. 8 shows an example in which the time interval between the DCI signaling 1 and the PDSCH 1 is zero slots. Likewise, a time interval between the DCI signaling 2 and the PDSCH 2 is less than or equal to second duration, and the second duration is greater than or equal to time required by the terminal device to decode the DCI signaling 2. FIG. 8 shows an example in which the time interval between the DCI signaling 2 and the PDSCH 2 is zero slots.

Optionally, a time interval between the DCI signaling and the first physical channel or signal is greater than or equal to third duration, and the third duration is greater than or equal to a sum of the time required by the terminal device to decode the DCI signaling and time required to adjust a beam to the beam of the first physical channel or signal. The time interval between the DCI signaling and the first physical channel or signal is a time interval between the end time of the DCI signaling and start time of the first physical channel or signal. The time required by the terminal device to adjust the beam to the beam of the first physical channel or signal is time required by the terminal device to switch from a second target beam to the beam of the first physical channel or signal. The second target beam is a beam that is different from the beam of the first physical channel or signal and that is recently used by the terminal device before the terminal device transmits the first physical channel or signal. In this optional manner, if a time interval between the DCI signaling and the first physical channel or signal is less than the third duration, the terminal device cannot successfully receive the first physical channel or signal. Therefore, based on this optional manner, it is helpful for the terminal device to successfully receive the first physical channel or signal.

For example, as shown in FIG. 8, a time interval between the DCI signaling 1 and the PDCCH 2 is greater than or equal to third duration. The time interval between the DCI signaling 1 and the PDCCH 2 is a time interval between the end time of the DCI signaling 1 and start time of the PDCCH 2. The third duration is greater than or equal to a sum of the time required by the terminal device to decode the DCI signaling 1 and time required to switch a beam 1 to the beam 2 used to transmit the PDCCH 2. FIG. 8 shows an example in which the time interval between the DCI signaling 1 and the PDCCH 2 is one slot. Likewise, a time interval between the DCI signaling 2 and the PDCCH 3 is greater than or equal to third duration, and the third duration is greater than or equal to a sum of time required by the terminal device to decode the DCI signaling 2 and time required to switch the beam 2 to the beam 3 used to transmit the PDCCH 3. FIG. 8 shows an example in which the time interval between the DCI signaling 2 and the PDCCH 3 is one slot.

The first physical channel or signal may have a plurality of time-frequency resources. The foregoing embodiment does not describe a specific manner in which the terminal device determines, based on the configuration information and the beam indicated by the first information, a beam used by the terminal device to transmit the first physical channel or signal when the first physical channel or signal has a plurality of time-frequency resources. The following uses an example in which the first information is DCI signaling and the first physical channel is a PDCCH to describe several specific implementations in which the terminal device determines, based on the configuration information and the beam indicated by the first information, a beam used by the terminal device to transmit the first physical channel or signal when the first physical channel or signal has a plurality of time-frequency resources.

Specific Implementation 1

The configuration information is further used to indicate the terminal device to transmit the PDCCH on control resource sets in a same group by using a same beam. The terminal device determines, based on the configuration information and the beam indicated by the DCI signaling, a beam used by the terminal device to transmit the PDCCH on control resource sets in a first group, where the first group is a group to which a control resource set that carries the DCI signaling belongs. Based on this specific implementation, a beam corresponding to one group of control resource sets can be updated by using DCI signaling on one control resource set, thereby helping reduce beam indication signaling overheads.

The PDCCH has a plurality of control resource sets. The control resource set is a possible frequency domain resource of the PDCCH. The terminal device may detect the PDCCH on one or more control resource sets, and may obtain the PDCCH on a specific control resource set through detection. The plurality of control resource sets of the PDCCH may be grouped. Control resource set groups may be specified by the protocol, or may be preconfigured by the access network device.

Figure 11:
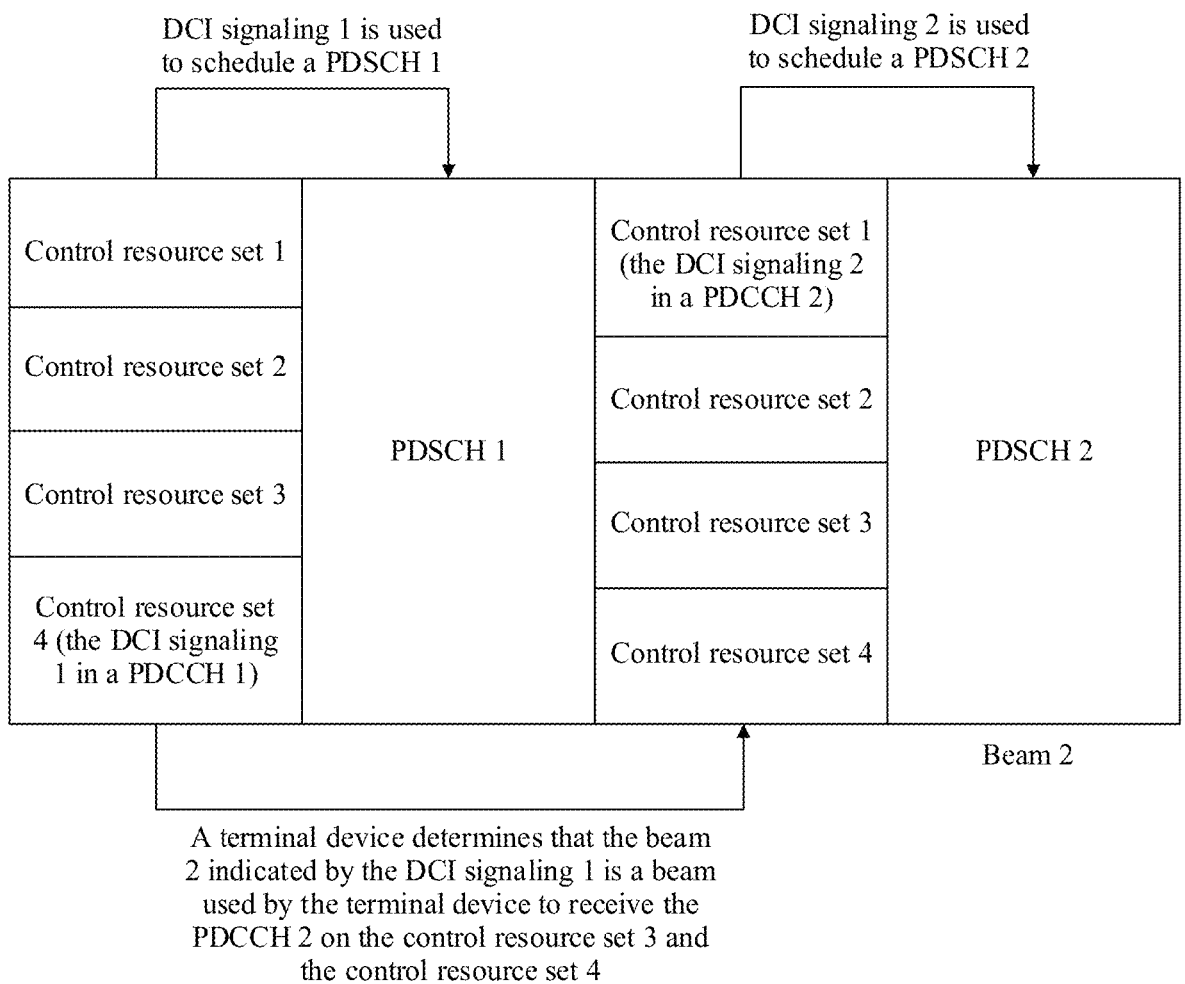
FIG. 11 is a schematic diagram of still another beam indicator according to an embodiment of this application.

For example, as shown in FIG. 11, the PDCCH has four control resource sets. A control resource set 1 and a control resource set 2 belong to a group 1, and a control resource set 3 and a control resource set 4 belong to a group 2. The configuration information indicates to use, as the unified beam, a beam used by the terminal device to receive the PDCCH (the first physical channel is the PDCCH), and indicates the terminal device to receive a PDSCH and the PDCCH by using the unified beam. The configuration information further indicates the terminal device to receive the PDCCH on control resource sets in a same group by using a same beam.

As shown in FIG. 11, DCI signaling 1 in a PDCCH 1 is used to schedule a PDSCH 1 and indicate a beam 2. If the terminal device obtains the DCI signaling 1 on the control resource set 4 through detection, the terminal device determines, as a beam used by the terminal device to receive a PDCCH 2 on the control resource set 3 and the control resource set 4, the beam 2 indicated by the DCI signaling 1. After determining that the beam used to receive the PDCCH 2 on the control resource set 3 and the control resource set 4 is the beam 2, the terminal device may determine the beam 2 as a beam used by the terminal device to receive the PDSCH 2.

Optionally, the terminal device may further receive MAC CE signaling sent by the access network device, where the MAC CE signaling indicates a beam used by the terminal device to initially transmit the DCI signaling on a first control resource set. The first control resource set may be any control resource set. The terminal device determines, as a beam used by the terminal device to initially transmit the DCI signaling on control resource sets in a second group, the beam indicated by the MAC CE signaling, where the second group is a group to which the first control resource set belongs. Based on this optional manner, an initial beam corresponding to one group of control resource sets can be indicated by using only one piece of MAC CE signaling, thereby helping reduce beam indication signaling overheads.

Figure 12:
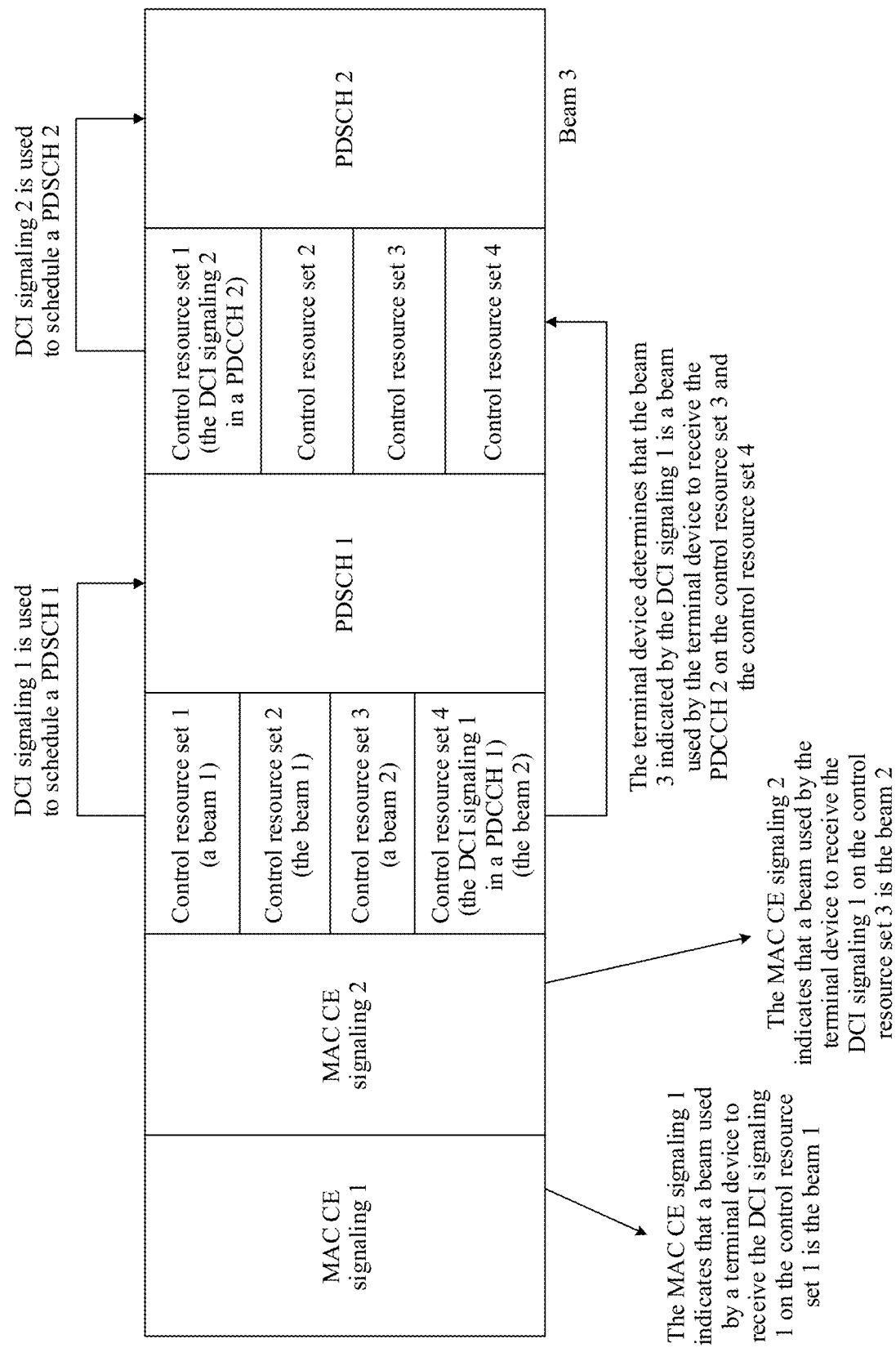
FIG. 12 is a schematic diagram of still another beam indicator according to an embodiment of this application.

For example, as shown in FIG. 12, the PDCCH has four control resource sets. A control resource set 1 and a control resource set 2 belong to a group 1, and a control resource set 3 and a control resource set 4 belong to a group 2. The configuration information indicates to use, as the unified beam, a beam used by the terminal device to receive the PDCCH (the first physical channel is the PDCCH), and indicates the terminal device to receive a PDSCH and the PDCCH by using the unified beam. The configuration information further indicates the terminal device to transmit the PDCCH on control resource sets in a same group by using a same beam.

Before receiving a PDCCH 1, the terminal device receives MAC CE signaling 1 sent by the access network device. The MAC CE signaling 1 indicates that a beam used by the terminal device to receive DCI signaling 1 on the control resource set 1 is a beam 1. Because the control resource set 1 and the control resource set 2 belong to the same group, the terminal device determines the beam 1 as a beam used by the terminal device to receive the DCI signaling 1 on the control resource set 1 and the control resource set 2.

Before receiving the PDCCH 1, the terminal device further receives MAC CE signaling 2 sent by the access network device. The MAC CE signaling 2 indicates that a beam used by the terminal device to receive the DCI signaling 1 on the control resource set 3 is a beam 2. Because the control resource set 3 and the control resource set 4 belong to the same group, the terminal device determines the beam 2 as a beam used by the terminal device to receive the DCI signaling 1 on the control resource set 3 and the control resource set 4.

Figures 13, 14:
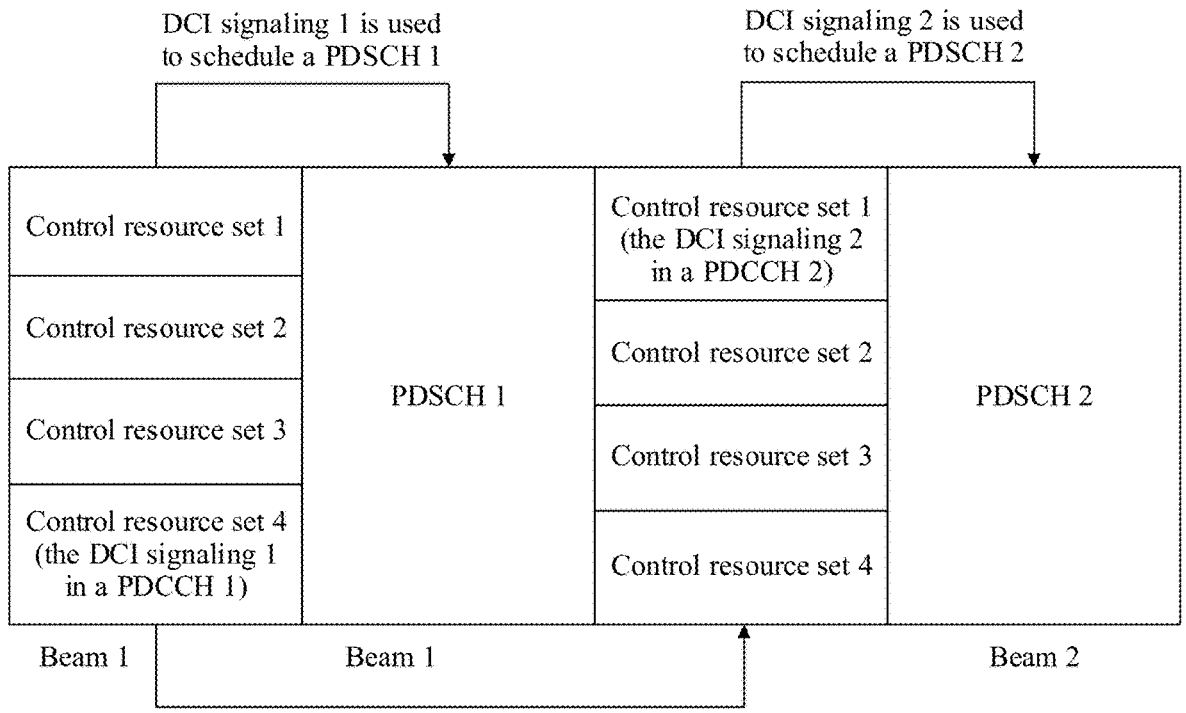
FIG. 13 is a schematic diagram of still another beam indicator according to an embodiment of this application.
FIG. 14 is a schematic diagram of still another beam indicator according to an embodiment of this application.

As shown in FIG. 13, the MAC CE signaling may include a serving cell identifier (serving cell ID) field, a control resource set identifier (CORESET ID) field, and a TCI state field. The serving cell identifier field and the control resource set identifier field are used to uniquely determine a control resource set to which the MAC CE signaling is applicable, and the TCI state field is used to indicate a beam used by the terminal device to initially transmit the DCI signaling on the control resource set.

Optionally, the protocol may predefine that the terminal device transmits the PDCCH on control resource sets in a same group by using a same beam. In this way, the configuration information does not need to indicate the terminal device to transmit the PDCCH on control resource sets in a same group by using a same beam.

Specific Implementation 2

The configuration information is further used to indicate the terminal device to transmit the PDCCH on all control resource sets by using a same beam. The terminal device determines, based on the configuration information and the beam indicated by the DCI signaling, a beam used by the terminal device to transmit the PDCCH on all the control resource sets. The DCI signaling is carried in any control resource set. Based on this specific implementation, the beam corresponding to all the control resource sets can be updated by using DCI signaling on one control resource set, thereby helping reduce beam indication signaling overheads. In addition, the PDCCH is transmitted on all the control resource sets by using a same beam, so that the terminal device can be prevented from frequent beam switching.

For example, as shown in FIG. 14, the PDCCH has four control resource sets. The configuration information indicates to use, as the unified beam, a beam used by the terminal device to receive the PDCCH (the first physical channel is the PDCCH), and indicates the terminal device to receive a PDSCH and the PDCCH by using the unified beam. The configuration information further indicates the terminal device to transmit the PDCCH on all the control resource sets by using a same beam.

As shown in FIG. 14. DCI signaling 1 in a PDCCH 1 is used to schedule a PDSCH 1 and indicate a beam 2. The terminal device obtains the DCI signaling 1 on a control resource set 4 through detection, and the terminal device determines, as a beam used by the terminal device to receive a PDCCH 2 on a control resource set 1 to the control resource set 4, the beam 2 indicated by the DCI signaling 1. After determining that the beam used to receive the PDCCH 2 on the control resource set 1 to the control resource set 4 is the beam 2, the terminal device determines the beam 2 as a beam used by the terminal device to receive a PDSCH 2.

Optionally, the terminal device receives MAC CE signaling sent by the access network device, where the MAC CE signaling indicates a beam used by the terminal device to initially transmit the DCI on a first control resource set. The terminal device determines, as a beam used by the terminal device to initially transmit the DCI on all the control resource sets, the beam indicated by the MAC CE signaling. The first control resource set is any control resource set. Based on this optional manner, an initial beam corresponding to all the control resource sets can be indicated by using one piece of MAC CE signaling, thereby helping reduce beam indication signaling overheads.

Figure 15:
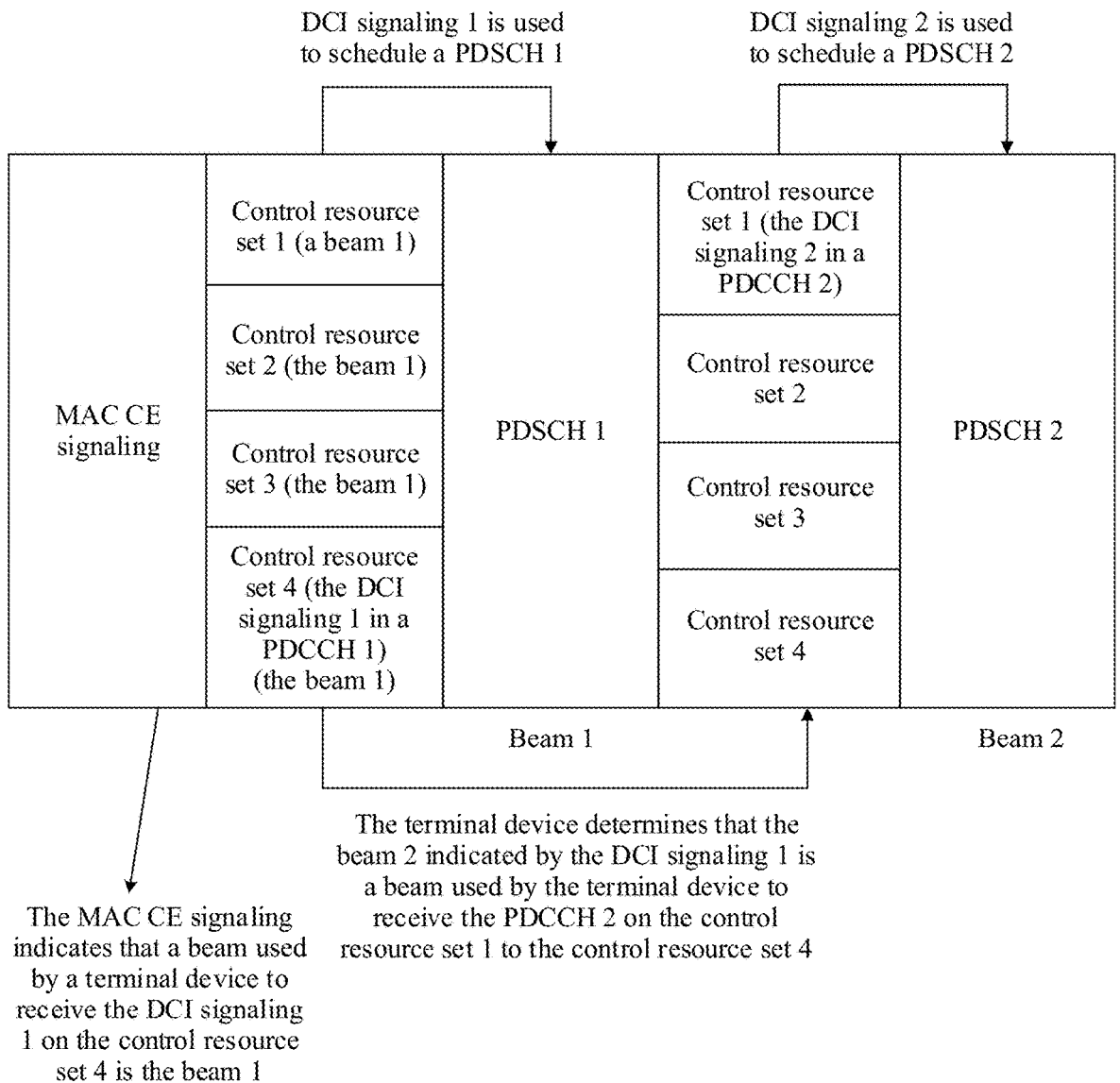
FIG. 15 is a schematic diagram of still another beam indicator according to an embodiment of this application.

For example, as shown in FIG. 15, the PDCCH has four control resource sets. The configuration information indicates to use, as the unified beam, a beam used by the terminal device to receive the PDCCH (the first physical channel is the PDCCH), and indicates the terminal device to receive a PDSCH and the PDCCH by using the unified beam. The configuration information further indicates the terminal device to transmit the PDCCH on all the control resource sets by using a same beam.

Before receiving a PDCCH 1, the terminal device receives MAC CE signaling sent by the access network device. The MAC CE signaling indicates that a beam used by the terminal device to receive DCI signaling 1 on a control resource set 4 is a beam 1. After the terminal device receives the MAC CE signaling, the terminal device determines the beam 1 as a beam used by the terminal device to receive the DCI signaling 1 on a control resource set 1 to the control resource set 4.

Optionally, the protocol may predefine that the terminal device transmits the PDCCH on all the control resource sets by using a same beam. In this way, the configuration information does not need to indicate the terminal device to transmit the PDCCH on all the control resource sets by using a same beam.

Specific Implementation 3

The configuration information is further used to indicate a plurality of control resource sets, and indicate the terminal device to transmit the PDCCH on the plurality of control resource sets by using a same beam. The DCI signaling is carried in one of the plurality of control resource sets. The terminal device determines, based on the configuration information and the beam indicated by the DCI signaling, a beam used by the terminal device to transmit the PDCCH on the plurality of control resource sets. Based on this specific implementation, the beam corresponding to the plurality of control resource sets can be updated by using DCI signaling on one control resource set, thereby helping reduce beam indication signaling overheads.

Figure 16:
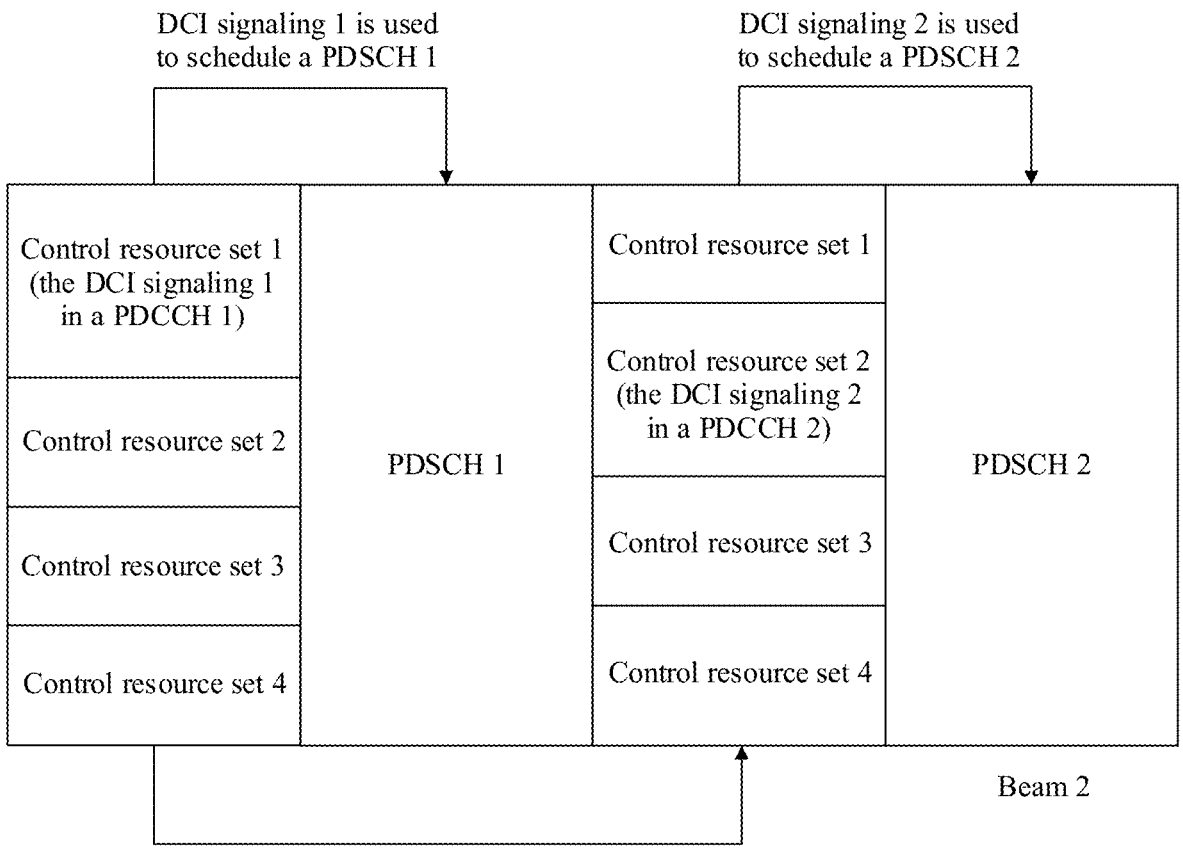
FIG. 16 is a schematic diagram of still another beam indicator according to an embodiment of this application.

For example, as shown in FIG. 16, the PDCCH has four control resource sets. The configuration information indicates to use, as the unified beam, a beam used by the terminal device to receive the PDCCH (the first physical channel is the PDCCH), and indicates the terminal device to receive a PDSCH and the PDCCH by using the unified beam. The configuration information further indicates the terminal device to transmit the PDCCH on a control resource set 1 to a control resource set 3 by using a same beam.

As shown in FIG. 16. DCI signaling 1 in a PDCCH 1 is used to schedule a PDSCH 1 and indicate a beam 2. The terminal device obtains the DCI signaling 1 on the control resource set 1 through detection, and the terminal device determines, as a beam used by the terminal device to receive a PDCCH 2 on the control resource set 1 to the control resource set 3, the beam 2 indicated by the DCI signaling 1. After determining that the beam used to receive the PDCCH 2 on the control resource set 1 to the control resource set 3 is the beam 2, the terminal device determines the beam 2 as a beam used by the terminal device to receive a PDSCH 2.

Optionally, the terminal device receives MAC CE signaling sent by the access network device, where the MAC CE signaling indicates a beam used by the terminal device to initially transmit the DCI on a first control resource set, and the first control resource set is one of the plurality of control resource sets. The terminal device determines, as a beam used by the terminal device to initially transmit the DCI on the plurality of control resource sets, the beam indicated by the MAC CE signaling. Based on this optional manner, an initial beam corresponding to the plurality of control resource sets can be indicated by using one piece of MAC CE signaling, thereby helping reduce beam indication signaling overheads.

Figure 17:
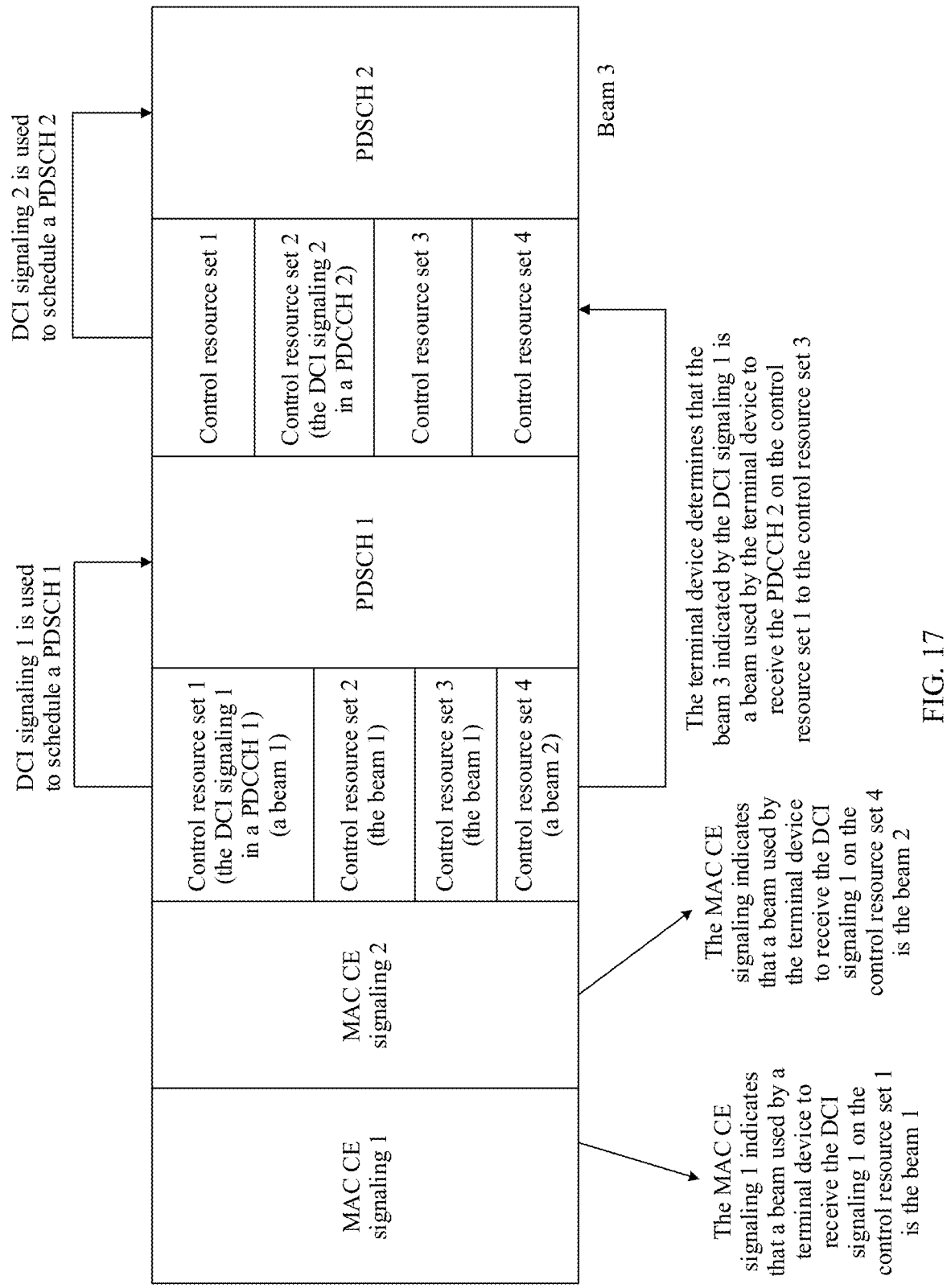
FIG. 17 is a schematic diagram of still another beam indicator according to an embodiment of this application.

For example, as shown in FIG. 17, the PDCCH has four control resource sets. The configuration information indicates to use, as the unified beam, a beam used by the terminal device to receive the PDCCH (the first physical channel is the PDCCH), and indicates the terminal device to receive a PDSCH and the PDCCH by using the unified beam. The configuration information further indicates the terminal device to transmit the PDCCH on a control resource set 1 to a control resource set 2 by using a same beam.

Before receiving a PDCCH 1, the terminal device receives MAC CE signaling 1 sent by the access network device. The MAC CE signaling 1 indicates that a beam used by the terminal device to receive DCI signaling 1 on the control resource set 1 is a beam 1. After the terminal device receives the MAC CE signaling, the terminal device determines the beam 1 as a beam used by the terminal device to receive the DCI signaling 1 on the control resource set 1 to the control resource set 3.

Before receiving the PDCCH 1, the terminal device further receives MAC CE signaling 2 sent by the access network device. The MAC CE signaling 2 indicates that a beam used by the terminal device to receive the DCI signaling 1 on the control resource set 4 is a beam 2. The terminal device determines the beam 2 as the beam used by the terminal device to receive the DCI signaling 1 on the control resource set 4.

Optionally, the protocol may predefine that the terminal device transmits the PDCCH on the plurality of control resource sets by using a same beam. In this way, the configuration information does not need to indicate the terminal device to transmit the PDCCH on the plurality of control resource sets by using a same beam.

Specific Implementation 4

The DCI signaling is carried in a first control resource set. The terminal device determines, based on the configuration information and the beam indicated by the DCI signaling, a beam used by the terminal device to transmit the PDCCH on the first control resource set. The first control resource set is any control resource set. Based on this specific implementation. DCI signaling on one control resource set is used to update only a beam corresponding to the control resource set on which the DCI signaling is located. In this way, beams corresponding to control resource sets can be more flexibly updated.

Figure 18:
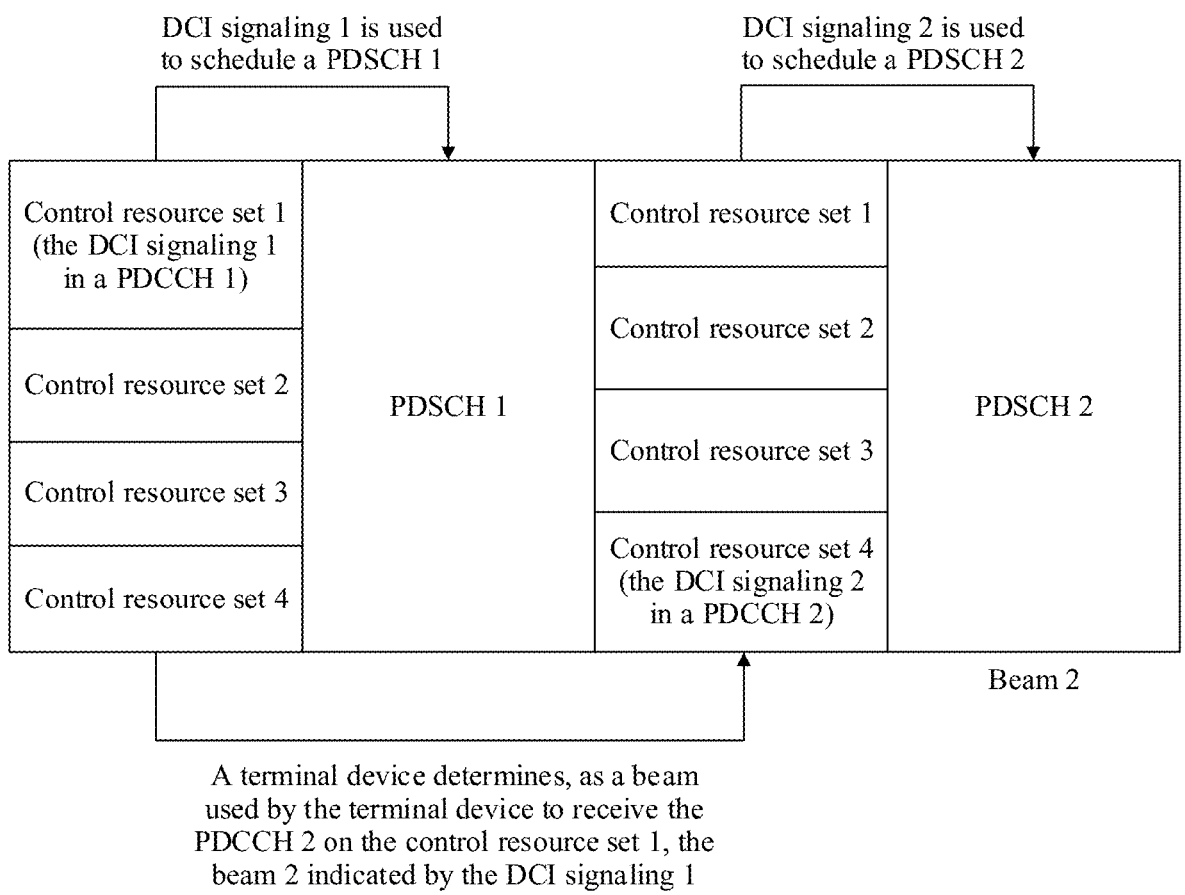
FIG. 18 is a schematic diagram of still another beam indicator according to an embodiment of this application.

For example, as shown in FIG. 18, the PDCCH has four control resource sets. The configuration information indicates to use, as the unified beam, a beam used by the terminal device to receive the PDCCH (the first physical channel is the PDCCH), and indicates the terminal device to receive a PDSCH and the PDCCH by using the unified beam.

As shown in FIG. 18. DCI signaling 1 in a PDCCH 1 is used to schedule a PDSCH 1 and indicate a beam 2. The terminal device obtains the DCI signaling 1 on a control resource set 1 through detection, and the terminal device determines, as a beam used by the terminal device to receive a PDCCH 2 on the control resource set 1, the beam 2 indicated by the DCI signaling 1. After determining that the beam used to receive the PDCCH 2 on the control resource set 1 is the beam 2, the terminal device determines the beam 2 as a beam used by the terminal device to receive a PDSCH 2.

In a possible implementation, the protocol may predefine a specific resource identifier (resource ID), the configuration information may indicate a specific resource identifier, or the terminal device may report a specific resource identifier. For example, the specific resource identifier may be of a time-frequency resource with a lowest or highest resource identifier, or a time-frequency resource corresponding to any resource identifier. When the terminal device receives the DCI signaling on a control resource set corresponding to the specific resource identifier, the terminal device determines, based on the configuration information and the beam indicated by the DCI signaling, a beam used by the terminal device to transmit the PDCCH on all control resource sets. Based on this possible implementation, the beam corresponding to all the control resource sets can be updated by using DCI signaling on one control resource set, thereby helping reduce beam indication signaling overheads.

Figure 19:
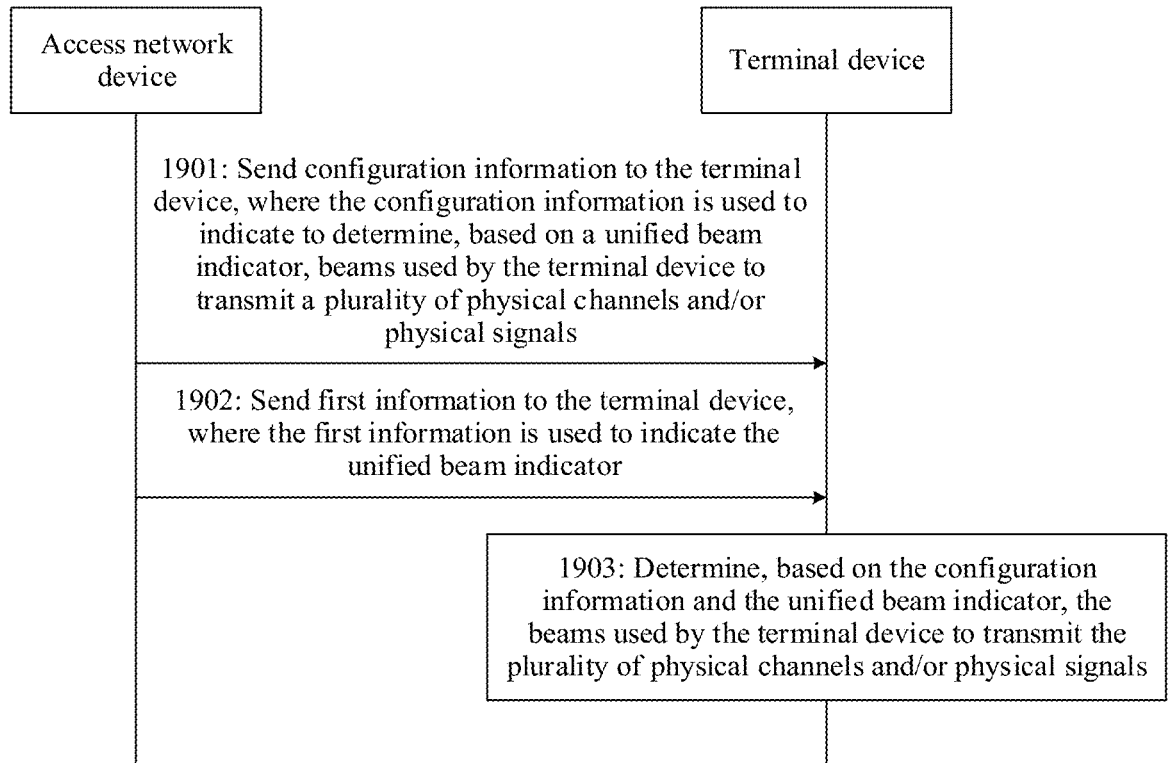
FIG. 19 is a schematic flowchart of still another beam indication method according to an embodiment of this application.

To reduce beam indication signaling overheads, refer to FIG. 19. FIG. 19 is a schematic flowchart of still another beam indication method according to an embodiment of this application. As shown in FIG. 19, the beam indication method includes the following operation 1901 to operation 1903.

1901: An access network device sends configuration information to a terminal device, where the configuration information is used to indicate to determine, based on a unified beam indicator, beams used by the terminal device to transmit a plurality of physical channels and/or physical signals. Correspondingly, the terminal device may receive the configuration information sent by the access network device.

The plurality of physical channels and/or physical signals may include a plurality of the following channels and signals: a PDCCH, a PDSCH, a CSI-RS, a PUSCH, a PUCCH, or an SRS.

1902: The access network device sends first information to the terminal device, where the first information is used to indicate the unified beam indicator. Correspondingly, the terminal device may receive the first information.

The first information may be DCI signaling, or may be other signaling that can indicate a beam.

The unified beam indicator has a unique identifier, but the unified beam indicator is used to indicate the beams used by the terminal device to transmit the plurality of physical channels and/or physical signals. The first information may carry the identifier of the unified beam indicator, to indicate the unified beam indicator.

For example, as shown in the following Table 2, a unified beam indicator 1 includes a TCI state 1 used to indicate a beam used by the terminal device to transmit a PDCCH, and a TCI state 2 used to indicate a beam used by the terminal device to transmit a PDSCH. A unified beam indicator 2 includes a TCI state 3 used to indicate a beam used by the terminal device to transmit a PDCCH, and a TCI state 4 used to indicate a beam used by the terminal device to transmit a PDSCH. Optionally, the beam indicated by the PDCCH TCI state is different from the beam indicated by the PDSCH TCI state. For example, the beam indicated by the PDCCH TCI state is relatively wide, and the beam indicated by the PDSCH TCI state is relatively narrow. Alternatively, the beam indicated by the PDCCH TCI state may be the same as the beam indicated by the PDSCH TCI state.

TABLE 2

| Unified beam indicator 1 | TCI state 1, indicating the beam used by the terminal device to receive the PDCCH<br>TCI state 2, indicating the beam used by the terminal device to receive the PDSCH |
|---|---|
| Unified beam indicator 2 | TCI state 3, indicating the beam used by the terminal device to receive the PDCCH<br>TCI state 4, indicating the beam used by the terminal device to receive the PDSCH |

Further, the unified beam indicator may include beam indicators of more channels/signals, such as a CSI-RS, a PUSCH, a PUCCH, and an SRS. As shown in the following Table 3, the unified beam indicator may further include a beam indicator used to indicate a beam used by the terminal device to send a PUCCH.

TABLE 3

| Unified beam indicator 1 | TCI state 1, indicating the beam used by the terminal device to receive the PDCCH<br>TCI state 2, indicating the beam used by the terminal device to receive the PDSCH |
|---|---|

TABLE 3-continued

| | Spatial relation 1, used to indicate a beam used by a terminal device to send a PUCCH |
|---|---|
| Unified beam indicator 2 | TCI state 3, indicating the beam used by the terminal device to receive the PDCCH<br>TCI state 4, indicating the beam used by the terminal device to receive the PDSCH<br>Spatial relation 2, used to indicate a beam used by the terminal device to send a PUCCH |

In a possible implementation, before receiving the configuration information sent by the access network device, the terminal device may further send capability information to the access network device, where the capability information is used to indicate that the terminal device supports the unified beam indicator. Correspondingly, before sending the configuration information, the access network device may further receive the capability information. After receiving the capability information, the access network device can send the configuration information to the terminal device, to indicate the terminal device to determine, based on the unified beam indicator, the beams used by the terminal device to transmit the plurality of physical channels and/or physical signals.

Optionally, the capability information is further used to indicate physical channels/signals whose beam indicators are supported by the terminal device in being included in the unified beam indicator. For example, the capability information is further used to indicate that the terminal device supports the unified beam indicator in including beam indicators of a PDCCH and a PDSCH. For another example, the capability information is further used to indicate that the terminal device supports the unified beam indicator in including beam indicators of a PDCCH, a PDSCH, and a PUCCH.

Optionally, the capability information is used to indicate a quantity of unified beam indicators supported by the terminal device. For example, the capability information is used to indicate that the terminal device supports a unified beam indicator 1 and a unified beam indicator 2, and the capability information may include an identifier of the unified beam indicator 1 and an identifier of the unified beam indicator 2.

1903: The terminal device determines, based on the configuration information and the unified beam indicator, the beams used by the terminal device to transmit the plurality of physical channels and/or physical signals.

In this embodiment of this application, after receiving the first information, the terminal device determines, based on the configuration information and the unified beam indicator, the beams used by the terminal device to transmit the plurality of physical channels and/or physical signals.

The following uses an example in which the first information is DCI signaling to describe two specific implementations in which the terminal device determines, based on the configuration information and the unified beam indicator, the beams used by the terminal device to transmit the plurality of physical channels and/or physical signals.

Specific Implementation 1

The DCI signaling is used to schedule a second physical channel or signal, and the unified beam indicator indicated by the DCI signaling includes a beam indicator corresponding to the second physical channel or signal and includes a beam indicator corresponding to at least one physical channel or signal other than the second physical channel or signal. The terminal device determines, based on the configuration information and the unified beam indicator, a beam corresponding to the second physical channel or signal scheduled by using the DCI signaling and a beam corresponding to the at least one physical channel or signal other than the second physical channel or signal.

Figure 20:
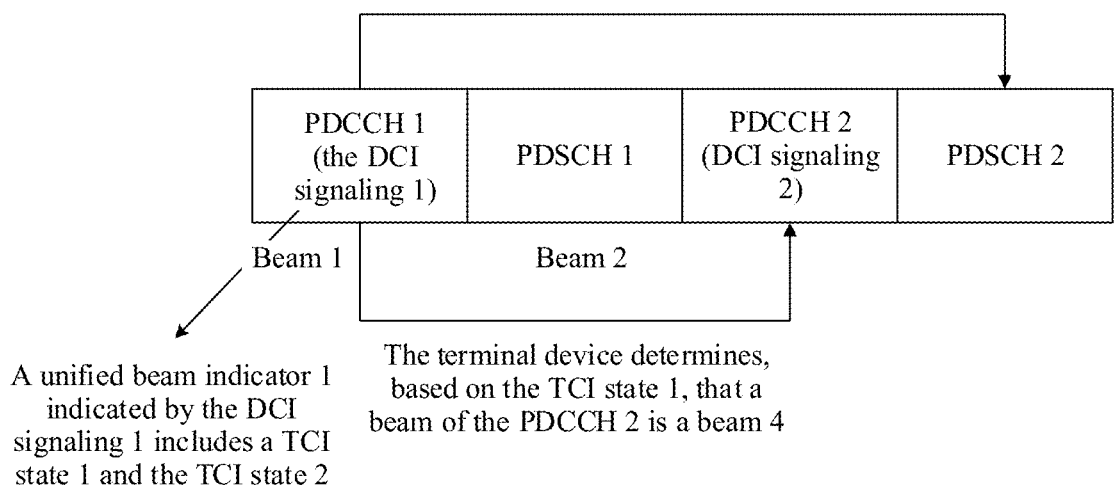
FIG. 20 is a schematic diagram of still another beam indicator according to an embodiment of this application.

For example, as shown in FIG. 20, a PDCCH 1 carries DCI signaling 1, and the DCI signaling 1 is used to schedule a PDSCH 2 and indicate a unified beam indicator 1. As shown in the foregoing Table 2, the unified beam indicator 1 includes a TCI state 1 and a TCI state 2. After receiving the PDCCH 1, the terminal device determines, based on the TCI state 2, that a beam used by the terminal device to receive the PDSCH 2 is a beam 3, and determines, based on the TCI state 1, that a beam used by the terminal device to receive a PDCCH 2 is a beam 4. The description is also applicable to a case in which the unified beam indicator 1 further includes a beam indicator of another physical channel or signal. Details are not described herein again.

In a possible implementation, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam corresponding to the second physical channel or signal scheduled by using the DCI signaling. The time interval between the DCI signaling and the second physical channel or signal scheduled by using the DCI signaling is a time interval between end time of the DCI signaling and start time of the second physical channel or signal scheduled by using the DCI signaling. The time required by the terminal device to adjust the beam to the beam of the second physical channel or signal scheduled by using the DCI signaling is time required by the terminal device to switch from a first target beam to the beam of the second physical channel or signal scheduled by using the DCI signaling. The first target beam is a beam that is different from the beam of the second physical channel or signal scheduled by using the DCI signaling and that is recently used by the terminal device before the terminal device transmits the second physical channel or signal scheduled by using the DCI signaling.

In this optional manner, if a time interval between the second physical channel or signal scheduled by using the DCI signaling and the DCI signaling is less than the first duration, the terminal device cannot successfully receive the second physical channel or signal scheduled by using the DCI signaling. Therefore, based on this optional manner, it is helpful for the terminal device to successfully receive the second physical channel or signal scheduled by using the DCI signaling.

For example, as shown in FIG. 20, one PDCCH and one PDSCH belong to one slot, and FIG. 20 shows two slots. For ease of description, the two slots are referred to as a slot n−1 and a slot n. A time interval between the DCI signaling 1 and the PDSCH 2 is greater than or equal to first duration. The time interval between the DCI signaling 1 and the PDSCH 2 is a time interval between end time of the DCI signaling 1 and start time of the PDSCH 2. The first duration is greater than or equal to a sum of time required by the terminal device to decode the DCI signaling 1 and time required to switch the beam 4 to the beam 3 used to transmit the PDSCH 2. FIG. 20 shows an example in which the time interval between the DCI signaling 1 and the PDSCH 2 is one slot.

In a possible implementation, the unified beam indicator includes the beam indicator corresponding to the at least one physical channel or signal other than the second physical channel or signal, a time interval between the other physical channel or signal and the DCI signaling is greater than or equal to third duration, and the third duration is greater than or equal to a sum of the time required by the terminal device to decode the DCI signaling and time required to adjust a beam to the beam used to transmit the other physical channel or signal. The time interval between the DCI signaling and the other physical channel or signal is a time interval between the end time of the DCI signaling and start time of the other physical channel or signal. The time required by the terminal device to adjust the beam to the beam of the other physical channel or signal is time required by the terminal device to switch from a second target beam to the beam of the other physical channel or signal. The second target beam is a beam that is different from the beam of the other physical channel or signal and that is recently used by the terminal device before the terminal device transmits the other physical channel or signal. Based on this optional manner, it is helpful for the terminal device to successfully receive the other physical channel or signal.

For example, as shown in FIG. 20, one PDCCH and one PDSCH belong to one slot, and FIG. 20 shows two slots. For ease of description, the two slots are referred to as a slot n−1 and a slot n. A time interval between the DCI signaling 1 and the PDCCH 2 is greater than or equal to third duration. The time interval between the DCI signaling 1 and the PDCCH 2 is a time interval between the end time of the DCI signaling 1 and start time of the PDCCH 2. The third duration is greater than or equal to a sum of the time required by the terminal device to decode the DCI signaling 1 and time required to switch a beam 2 to the beam 4 used to transmit the PDCCH 2. FIG. 20 shows an example in which the time interval between the DCI signaling 1 and the PDCCH 2 is one slot.

Specific Implementation 2

The DCI signaling is used to schedule a second physical channel or signal of first time, and the unified beam indicator indicated by the DCI signaling includes a beam indicator corresponding to a second physical channel or signal and includes a beam indicator corresponding to at least one physical channel or signal other than the second physical channel or signal. The terminal device determines, based on the configuration information and the unified beam indicator, a beam corresponding to the second physical channel or signal of second time and a beam corresponding to the at least one physical channel or signal other than the second physical channel or signal.

Figure 21:
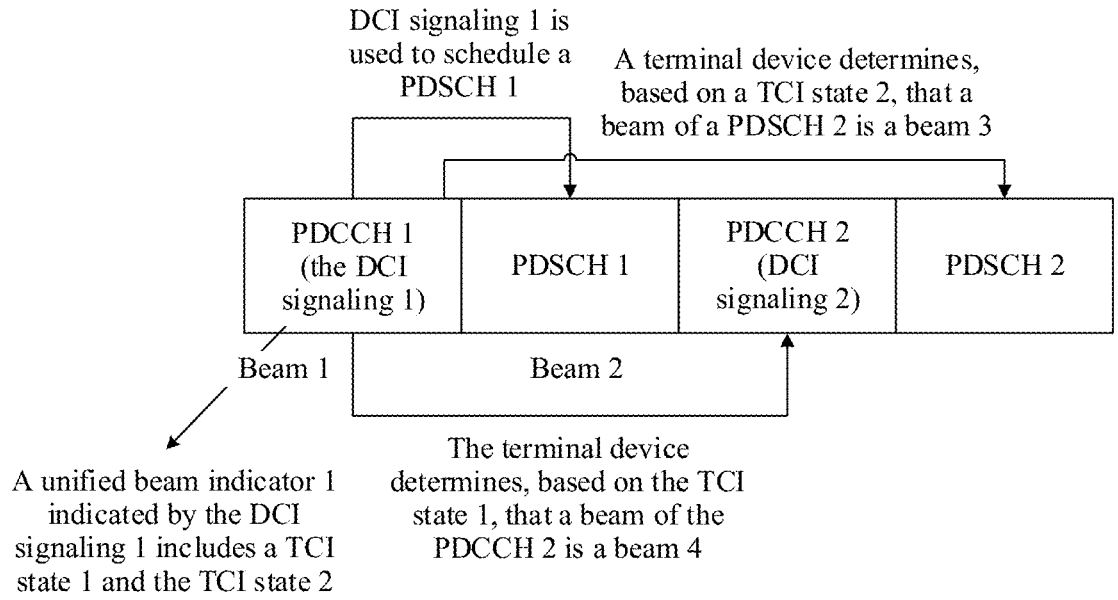
FIG. 21 is a schematic diagram of still another beam indicator according to an embodiment of this application.

For example, as shown in FIG. 21. DCI signaling 1 in a PDCCH 1 is used to schedule a PDSCH 1 and indicate a unified beam indicator 1. As shown in the foregoing Table 2, the unified beam indicator 1 includes a TCI state 1 and a TCI state 2. After receiving the PDCCH 1, the terminal device determines, based on the TCI state 2, that a beam used by the terminal device to receive a PDSCH 2 is a beam 3, and determines, based on the TCI state 1, that a beam used by the terminal device to receive a PDCCH 2 is a beam 4. The description is also applicable to a case in which the unified beam indicator 1 further includes a beam indicator of another physical channel or signal. Details are not described herein again.

In a possible implementation, a time interval between the DCI signaling and the second physical channel or signal scheduled by using the DCI signaling is less than or equal to second duration, and the second duration is greater than or equal to time required by the terminal device to decode the DCI signaling. The time interval between the DCI signaling and the second physical channel or signal scheduled by using the DCI signaling is a time interval between end time of the DCI signaling and start time of the second physical channel or signal scheduled by using the DCI signaling. Based on this possible implementation, it is helpful to schedule the second physical channel or signal in time.

For example, as shown in FIG. 21, one PDCCH and one PDSCH belong to one slot, and FIG. 21 shows two slots. For ease of description, the two slots are referred to as a slot n−1 and a slot n. A time interval between the DCI signaling 1 and the PDSCH 1 is less than or equal to second duration. The time interval between the DCI signaling 1 and the PDSCH 1 is a time interval between end time of the DCI signaling 1 and start time of the PDSCH 1. The second duration is greater than or equal to time required by the terminal device to decode the DCI signaling 1. FIG. 20 shows an example in which the time interval between the PDSCH 1 and the DCI signaling 1 is zero slots.

In a possible implementation, the DCI signaling includes the beam indicator corresponding to the at least one physical channel or signal other than the second physical channel or signal, a time interval between the other physical channel or signal and the DCI signaling is greater than or equal to third duration, and the third duration is greater than or equal to a sum of the time required by the terminal device to decode the DCI signaling and time required to adjust the beam used to transmit the other physical channel or signal. For this possible implementation, refer to the descriptions in the foregoing case 1. Details are not described herein again.

Figure 22:
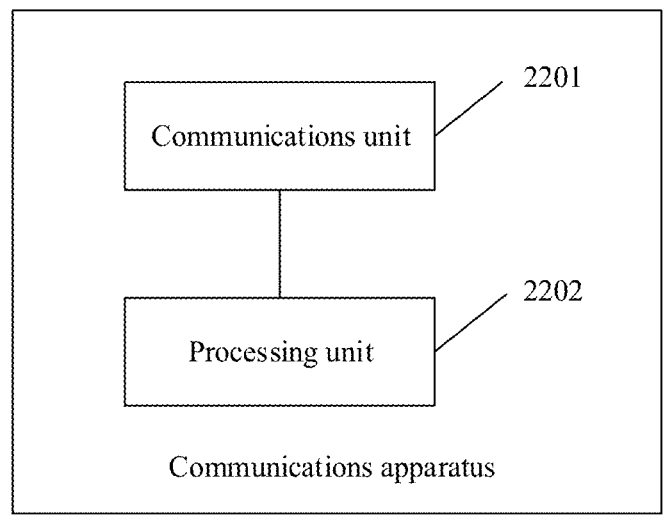
FIG. 22 is a schematic diagram of a structure of a communications apparatus according to an embodiment of this application.

FIG. 22 is a schematic diagram of a structure of a communications apparatus according to an embodiment of this application. The communications apparatus shown in FIG. 22 may be configured to perform some or all functions of the terminal device in the foregoing method embodiment described in FIG. 2, FIG. 3, or FIG. 7. The apparatus may be a terminal device, may be an apparatus in the terminal device, or may be an apparatus that can be used in matching with the terminal device. The communications apparatus may alternatively be a chip system. The communications apparatus shown in FIG. 22 may include a communications unit 2201 and a processing unit 2202. The processing unit 2202 is configured to process data. A receiving unit and a sending unit are integrated into the communications unit 2201. The communications unit 2201 may also be referred to as a transceiver unit. Alternatively, the communications unit 2201 may be divided into a receiving unit and a sending unit. The description is also applicable to the following processing unit 2202 and communications unit 2201. Details are not described below:

The communications unit 2201 is configured to receive configuration information sent by an access network device, where the configuration information is used to indicate the communications apparatus to transmit a plurality of physical channels and/or physical signals based on a unified beam. The communications unit 2201 is further configured to receive downlink control information (DCI) signaling sent by the access network device. The processing unit 2202 is configured to determine, based on configuration information and a beam indicated by the DCI signaling, a beam used by the communications apparatus to transmit a first physical channel or signal, where the beam used by the communications apparatus to transmit the first physical channel or signal is the unified beam.

In a possible implementation, the DCI signaling is used to schedule a second physical channel or signal, and the second physical channel or signal is a physical channel or signal transmitted based on the unified beam. The processing unit 2202 is further configured to determine, as a beam used by the communications apparatus to transmit the second physical channel or signal scheduled by using the DCI signaling, the beam indicated by the DCI signaling.

Optionally, a time interval between the DCI signaling and the second physical channel or signal scheduled by using the DCI signaling is greater than or equal to first duration, and the first duration is greater than or equal to a sum of time required by the communications apparatus to decode the DCI signaling and time required to adjust a beam to the beam of the second physical channel or signal scheduled by using the DCI signaling.

In a possible implementation, after the communications apparatus determines, as the beam used by the communications apparatus to transmit the first physical channel or signal, the beam indicated by the DCI signaling, the processing unit 2202 is further configured to determine, based on the beam used by the communications apparatus to transmit the first physical channel or signal, a beam used to transmit at least one of the plurality of physical channels or signals.

Optionally, the DCI signaling is used to schedule a second physical channel or signal, the at least one physical channel or signal includes the second physical channel or signal, a time interval between the DCI signaling and the second physical channel or signal scheduled by using the DCI signaling is less than or equal to second duration, and the second duration is greater than or equal to time required by the communications apparatus to decode the DCI signaling.

In a possible implementation, a time interval between the DCI signaling and the first physical channel or signal is greater than or equal to third duration, and the third duration is greater than or equal to a sum of the time required by the communications apparatus to decode the DCI signaling and time required to adjust a beam to the beam of the first physical channel or signal.

In a possible implementation, the communications unit 2201 is further configured to: before receiving the configuration information sent by the access network device, send capability information to the access network device, where the capability information is used to indicate that the communications apparatus supports the plurality of physical channels and/or physical signals in being transmitted based on the unified beam.

Optionally, the capability information is further used to indicate channels or signals whose beams are supported in being used as the unified beam, and the configuration information is further used to indicate a channel or signal whose beam is used as the unified beam.

Optionally, the capability information is further used to indicate physical channels and/or physical signals supported in being transmitted based on the unified beam, and the configuration information is further used to indicate a physical channel and/or physical signal transmitted based on the unified beam.

In a possible implementation, the configuration information is specifically used to signals based on the unified beam in a same carrier.

In a possible implementation, the configuration information is specifically used to indicate the terminal device to transmit the plurality of physical channels and/or physical signals based on the unified beam in a same carrier group.

In a possible implementation, the configuration information is specifically used to indicate the terminal device to transmit the plurality of physical channels and/or physical signals based on the unified beam in a same bandwidth.

In a possible implementation, the configuration information is specifically used to indicate the terminal device to transmit the plurality of physical channels and/or physical signals based on the unified beam in a same bandwidth group.

In a possible implementation, the configuration information is specifically used to indicate the terminal device to transmit the plurality of physical channels and/or physical signals based on the unified beam in a same frequency band.

In a possible implementation, the configuration information is specifically used to indicate the terminal device to transmit the plurality of physical channels and/or physical signals based on the unified beam in a same frequency band group.

In a possible implementation, the configuration information is further used to indicate the communications apparatus to transmit the first physical channel or signal on control resource sets in a same group by using a same beam. A manner in which the processing unit 2202 determines, based on the configuration information and the beam indicated by the DCI signaling, the beam used by the communications apparatus to transmit the first physical channel or signal is specifically: determining, based on the configuration information and the beam indicated by the DCI signaling, a beam used by the communications apparatus to transmit the first physical channel or signal on control resource sets in a first group, where the first group is a group to which a control resource set that carries the DCI signaling belongs.

In a possible implementation, the communications unit 2201 is further configured to: after receiving the configuration information sent by the access network device, before receiving the DCI signaling sent by the access network device, receive MAC CE signaling sent by the access network device, where the MAC CE signaling indicates a beam used by the communications apparatus to initially transmit the DCI signaling on a first control resource set.

The processing unit 2202 is further configured to determine, as a beam used by the communications apparatus to initially transmit the DCI signaling on control resource sets in a second group, the beam indicated by the MAC CE signaling, where the second group is a group to which the first control resource set belongs.

FIG. 22 is a schematic diagram of a structure of a communications apparatus according to an embodiment of this application. The communications apparatus shown in FIG. 22 may be configured to perform some or all functions of the access network device in the foregoing method embodiment described in FIG. 2. FIG. 3, or FIG. 7. The apparatus may be an access network device, may be an apparatus in the access network device, or may be an apparatus that can be used in matching with the access network device. The communications apparatus may alternatively be a chip system. The communications apparatus shown in FIG. 22 may include a communications unit 2201 and a processing unit 2202.

The communications unit 2201 is configured to send configuration information to a terminal device, where the configuration information is used to indicate the terminal device to transmit a plurality of physical channels and/or physical signals based on a unified beam. The communications unit 2201 is further configured to send downlink control information (DCI) signaling to the terminal device, where the DCI signaling is used to indicate a beam used by the terminal device to transmit a first physical channel or signal, and the unified beam is the beam used by the terminal device to transmit the first physical channel or signal.

In a possible implementation, the DCI signaling is used to schedule a second physical channel or signal, the second physical channel or signal is a physical channel or signal transmitted based on the unified beam, and the DCI signaling is further used to indicate a beam used by the terminal device to transmit the second physical channel or signal.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam of the second physical channel or signal scheduled by using the DCI signaling.

In a possible implementation, the DCI signaling is used to schedule a second physical channel or signal, the second physical channel or signal is a physical channel or signal transmitted by the terminal device based on the unified beam, a time interval between the DCI signaling and the second physical channel or signal scheduled by using the DCI signaling is less than or equal to second duration, and the second duration is greater than or equal to time required by the terminal device to decode the DCI signaling.

In a possible implementation, a time interval between the DCI signaling and the first physical channel or signal is greater than or equal to third duration, and the third duration is greater than or equal to a sum of the time required by the terminal device to decode the DCI signaling and time required to adjust a beam to the beam of the first physical channel or signal.

In a possible implementation, the communications unit 2201 is further configured to: before sending the configuration information to the terminal device, receive capability information sent by the terminal device, where the capability information is used to indicate that the terminal device supports the plurality of physical channels and/or physical signals in being transmitted based on the unified beam.

Optionally, the capability information is further used to indicate channels or signals whose beams are supported in being used as the unified beam, and the configuration information is further used to indicate a channel or signal whose beam is used as the unified beam.

Optionally, the capability information is further used to indicate physical channels and/or physical signals supported in being transmitted based on the unified beam, and the configuration information is further used to indicate a physical channel and/or physical signal transmitted based on the unified beam.

In a possible implementation, the configuration information is specifically used to indicate the terminal device to transmit the plurality of physical channels and/or physical signals based on the unified beam in a same carrier.

In a possible implementation, the configuration information is specifically used to indicate the terminal device to transmit the plurality of physical channels and/or physical signals based on the unified beam in a same carrier group.

In a possible implementation, the configuration information is specifically used to indicate the terminal device to transmit the plurality of physical channels and/or physical signals based on the unified beam in a same bandwidth.

In a possible implementation, the configuration information is specifically used to indicate the terminal device to transmit the plurality of physical channels and/or physical signals based on the unified beam in a same bandwidth group.

In a possible implementation, the configuration information is specifically used to indicate the terminal device to transmit the plurality of physical channels and/or physical signals based on the unified beam in a same frequency band.

In a possible implementation, the configuration information is specifically used to indicate the terminal device to transmit the plurality of physical channels and/or physical signals based on the unified beam in a same frequency band group.

In a possible implementation, the configuration information is further used to indicate the terminal device to transmit the first physical channel or signal on control resource sets in a same group by using a same beam, the DCI signaling is specifically used to indicate a beam used by the terminal device to transmit the first physical channel or signal on control resource sets in a first group, and the first group is a group to which a control resource set that carries the DCI signaling belongs.

In a possible implementation, the configuration information is further used to indicate the terminal device to transmit the first physical channel or signal on all control resource sets by using a same beam, and the DCI signaling is specifically used to indicate a beam used by the terminal device to transmit the first physical channel or signal on all the control resource sets.

In a possible implementation, the configuration information is further used to indicate a plurality of control resource sets, and indicate the terminal device to transmit the first physical channel or signal on the plurality of control resource sets by using a same beam, the DCI signaling is carried in one of the plurality of control resource sets, and the DCI signaling is specifically used to indicate a beam used by the terminal device to transmit the first physical channel or signal on the plurality of control resource sets.

In a possible implementation, the DCI signaling is carried in a first control resource set, and the DCI signaling is used to indicate a beam used by the terminal device to transmit the first physical channel or signal on the first control resource set.

FIG. 22 is a schematic diagram of a structure of a communications apparatus according to an embodiment of this application. The communications apparatus shown in FIG. 22 may be configured to perform some or all functions of the terminal device in the foregoing method embodiment described in FIG. 19. The apparatus may be a terminal device, may be an apparatus in the terminal device, or may be an apparatus that can be used in matching with the terminal device. The communications apparatus may alternatively be a chip system. The communications apparatus shown in FIG. 22 may include a communications unit 2201 and a processing unit 2202.

The communications unit 2201 is configured to receive configuration information sent by an access network device, where the configuration information is used to indicate to determine, based on a unified beam indicator, beams used by the terminal device to transmit a plurality of physical channels and/or physical signals. The communications unit 2201 is further configured to receive downlink control information (DCI) signaling sent by the access network device, where the DCI signaling is used to indicate the unified beam indicator, and the unified beam indicator is used to indicate the beams used by the terminal device to transmit the plurality of physical channels and/or physical signals. The processing unit 2202 is configured to determine, based on the configuration information and the unified beam indicator, the beams used by the terminal device to transmit the plurality of physical channels and/or physical signals.

In a possible implementation, the DCI signaling is used to schedule a second physical channel or signal, and the unified beam indicator indicated by the DCI signaling includes a beam indicator corresponding to the second physical channel or signal and includes a beam indicator corresponding to at least one physical channel or signal other than the second physical channel or signal. The processing unit 2202 specifically determines, based on the configuration information and the unified beam indicator, a beam corresponding to the second physical channel or signal scheduled by using the DCI signaling and a beam corresponding to the at least one physical channel or signal other than the second physical channel or signal.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam corresponding to the second physical channel or signal scheduled by using the DCI signaling.

Optionally, the unified beam indicator includes the beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust a beam to the beam used to transmit the other physical channel or signal.

In a possible implementation, the DCI signaling is used to schedule a second physical channel or signal of first time, and the unified beam indicator indicated by the DCI signaling includes a beam indicator corresponding to a second physical channel or signal and includes a beam indicator corresponding to at least one physical channel or signal other than the second physical channel or signal. The processing unit 2202 specifically determines, based on the configuration information and the unified beam indicator, a beam corresponding to the second physical channel or signal of second time and a beam corresponding to the at least one physical channel or signal other than the second physical channel or signal.

Optionally, a time interval between the DCI signaling and the second physical channel or signal scheduled by using the DCI signaling is less than or equal to second duration, and the second duration is greater than or equal to time required by the terminal device to decode the DCI signaling.

Optionally, the DCI signaling includes the beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust the beam used to transmit the other physical channel or signal.

In a possible implementation, before receiving the configuration information sent by the access network device, the communications unit 2201 may further send capability information to the access network device, where the capability information is used to indicate that the terminal device supports the unified beam indicator.

Optionally, the capability information is further used to indicate that the terminal device supports the beam indicators that are of the physical channels/signals and that are included in the unified beam indicator.

Optionally, the capability information is used to indicate a quantity of unified beam indicators supported by the terminal device.

FIG. 22 is a schematic diagram of a structure of a communications apparatus according to an embodiment of this application. The communications apparatus shown in FIG. 22 may be configured to perform some or all functions of the access network device in the foregoing method embodiment described in FIG. 19. The apparatus may be an access network device, may be an apparatus in the access network device, or may be an apparatus that can be used in matching with the access network device. The communications apparatus may alternatively be a chip system. The communications apparatus shown in FIG. 22 may include a communications unit 2201 and a processing unit 2202.

The communications unit 2201 is configured to send configuration information to a terminal device, where the configuration information is used to indicate to determine, based on a unified beam indicator, beams used by the terminal device to transmit a plurality of physical channels and/or physical signals. The communications unit 2201 is further configured to send downlink control information (DCI) signaling to the terminal device, where the DCI signaling is used to indicate the unified beam indicator, and the unified beam indicator is used to indicate the beams used by the terminal device to transmit the plurality of physical channels and/or physical signals.

In a possible implementation, the DCI signaling is used to schedule a second physical channel or signal, and the unified beam indicator indicated by the DCI signaling is used to indicate a beam of the second physical channel or signal scheduled by using the DCI signaling, and is used to indicate a beam of at least one physical channel or signal other than the second physical channel or signal.

Optionally, a time interval between the DCI signaling and the second physical channel or signal scheduled by using the DCI signaling is greater than or equal to first duration, and the first duration is greater than or equal to a sum of time required by the terminal device to decode the DCI signaling and time required to adjust a beam to the beam corresponding to the second physical channel or signal scheduled by using the DCI signaling.

Optionally, the unified beam indicator includes a beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust a beam to the beam used to transmit the other physical channel or signal.

In another possible implementation, the DCI signaling is used to schedule a second physical channel or signal of first time, and the unified beam indicator indicated by the DCI signaling is used to indicate a beam of the second physical channel or signal of second time and is used to indicate a beam of the at least one physical channel or signal other than the second physical channel or signal.

Optionally, a time interval between the DCI signaling and the second physical channel or signal scheduled by using the DCI signaling is less than or equal to second duration, and the second duration is greater than or equal to time required by the terminal device to decode the DCI signaling.

Optionally, the DCI signaling includes a beam indicator corresponding to the at least one physical channel or signal other than the second physical channel or signal, a time interval between the DCI signaling and the other physical channel or signal is greater than or equal to third duration, and the third duration is greater than or equal to a sum of the time required by the terminal device to decode the DCI signaling and time required to adjust the beam used to transmit the other physical channel or signal.

In a possible implementation, before sending the configuration information, the communications unit 2201 may further receive capability information sent by the terminal device, where the capability information is used to indicate that the terminal device supports the unified beam indicator.

Optionally, the capability information is further used to indicate physical channels/signals whose beam indicators are supported by the terminal device in being included in the unified beam indicator.

Optionally, the capability information is used to indicate a quantity of unified beam indicators supported by the terminal device.

Figure 23A:
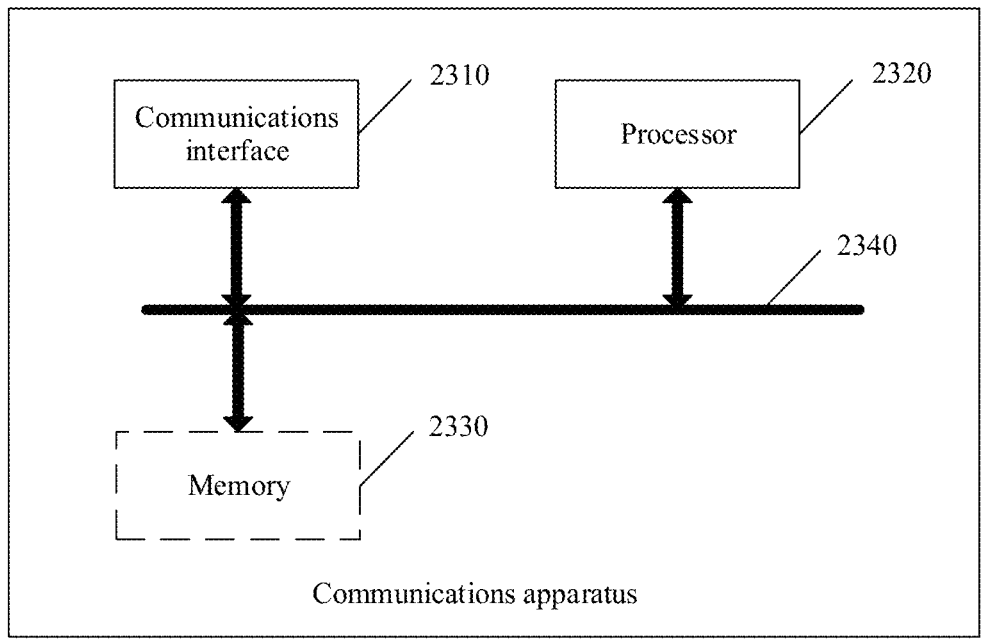
FIG. 23a is a schematic diagram of a structure of another communications apparatus according to an embodiment of this application.

FIG. 23a shows a communications apparatus 230 according to an embodiment of this application. The communications apparatus 230 is configured to implement the functions of the terminal device in FIG. 2, FIG. 3, FIG. 7, or FIG. 19. The apparatus may be a terminal device or an apparatus used in the terminal device. The apparatus used in the terminal device may be a chip system or a chip in the terminal device. The chip system may include a chip, or may include a chip and another discrete device. Alternatively, the communications apparatus 230 is configured to implement the functions of the access network device in FIG. 2, FIG. 3, FIG. 7, or FIG. 19. The apparatus may be an access network device or an apparatus used in the access network device. The apparatus used in the access network device may be a chip system or a chip in the access network device. The chip system may include a chip, or may include a chip and another discrete device.

The communications apparatus 230 includes at least one processor 2320, configured to implement a data processing function of the terminal device or the access network device in the method provided in the embodiments of this application. The apparatus 230 may further include a communications interface 2310, configured to implement a sending/receiving operation of the terminal device or the access network device in the method provided in the embodiments of this application. In this embodiment of this application, the communications interface may be a transceiver, a circuit, a bus, a module, or another type of communications interface, and is configured to communicate with another device by using a transmission medium. For example, the communications interface 2310 is used by an apparatus in the apparatus 230 to communicate with another device. The processor 2320 sends/receives data by using the communications interface 2310, and is configured to implement the method in the foregoing method embodiment shown in FIG. 2, FIG. 3, or FIG. 7.

For example, when the communications apparatus 230 is a terminal device or an apparatus used in the terminal device, as shown in FIG. 2, FIG. 3, FIG. 7, or FIG. 19, the communications interface 2310 may receive the configuration information and the first information.

For another example, when the communications apparatus 230 is a network device or an apparatus used in the network device, as shown in FIG. 2, FIG. 3, FIG. 7, or FIG. 19, the communications interface 2310 may send the configuration information and the first information.

The apparatus 230 may further include at least one memory 2330, configured to store program instructions and/or data. The memory 2330 is coupled to the processor 2320. The coupling in this embodiment of this application is indirect coupling or a communication connection between apparatuses, units, or modules for information exchange between the apparatuses, the units, or the modules, and may be in electrical, mechanical, or other forms. The processor 2320 may perform a cooperative operation with the memory 2330. The processor 2320 may execute the program instructions stored in the memory 2330. At least one of the at least one memory may be included in the processor.

In this embodiment of this application, a specific connection medium between the communications interface 2310, the processor 2320, and the memory 2330 is not limited. In this embodiment of this application, the memory 2330, the processor 2320, and the communications interface 2310 are connected by using a bus 2340 in FIG. 23*a*. In FIG. 23*a*, the bus is indicated by using a bold line. Another component connection manner may be used. This is merely an example for description, and imposes no limitation. The bus may be classified into an address bus, a data bus, a control bus, and the like. For ease of representation, only one thick line is used to represent the bus in FIG. 23*a*, but this does not mean that there is only one bus or only one type of bus.

When the apparatus 230 is specifically an apparatus used in a terminal device or an access network device, for example, when the apparatus 230 is specifically a chip or a chip system, the communications interface 2310 may output or receive a baseband signal. When the apparatus 230 is specifically the terminal device or the access network device, the communications interface 2310 may output or receive a radio frequency signal. In embodiments of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, operations, and logical block diagrams disclosed in embodiments of this application. The general-purpose processor may be a microprocessor, any conventional processor, or the like. The operation of the method disclosed with reference to embodiments of this application may be directly performed and completed by a hardware processor, or may be performed and completed by using a combination of hardware in the processor and a software module.

Figure 23B:
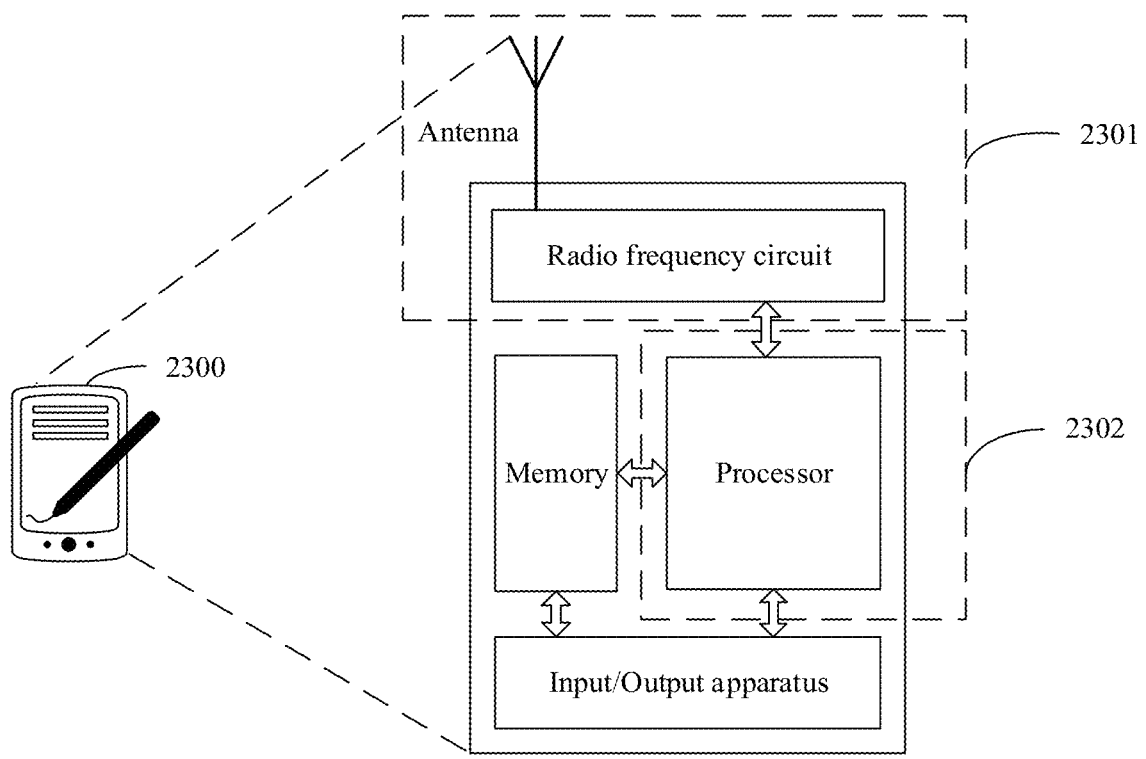
FIG. 23b is a schematic diagram of a structure of a terminal device according to an embodiment of this application.

As an example, FIG. 23*b* is a schematic diagram of a structure of another terminal device 2300 according to an embodiment of this application. The terminal device may perform the operations performed by the terminal device in the foregoing method embodiment.

For ease of description, FIG. 23*b* shows only main components of the terminal device. As shown in FIG. 23*b*, the terminal device 2300 includes a processor, a memory, a radio frequency circuit, an antenna, and an input/output apparatus. The processor is mainly configured to: process a communications protocol and communication data, control the entire terminal device, execute a software program, and process data of the software program, for example, configured to support the terminal device in performing the procedure described in FIG. 2, FIG. 3, FIG. 7, or FIG. 19. The memory is mainly configured to store the software program and the data. The radio frequency circuit is mainly configured to perform conversion between a baseband signal and a radio frequency signal and process the radio frequency signal. The antenna is mainly configured to receive and send radio frequency signals in a form of an electromagnetic wave. The terminal device 2300 may further include the input/output apparatus, such as a touchscreen, a display screen, or a keyboard. The input/output apparatus is mainly configured to: receive data entered by a user, and output data to the user. It should be noted that some types of terminal devices may have no input/output apparatus.

After the terminal device is powered on, the processor may read a software program in a storage unit, interpret and execute the software program, and process data of the software program. When data needs to be wirelessly sent, after performing baseband processing on the to-be-sent data, the processor outputs a baseband signal to the radio frequency circuit. After performing radio frequency processing on the baseband signal, the radio frequency circuit sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data.

Persons skilled in the art may understand that for ease of description, FIG. 23*b* shows only one memory and only one processor. In an actual terminal device, there may be a plurality of processors and a plurality of memories. The memory may also be referred to as a storage medium, a storage device, or the like. This is not limited in embodiments of this application.

As an optional implementation, the processor may include a baseband processor and a central processing unit (CPU). The baseband processor is mainly configured to process the communications protocol and the communication data, and the CPU is mainly configured to: control the entire terminal device, execute the software program, and process the data of the software program. Optionally, the processor may be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random access memory (RAM); the memory may include a nonvolatile memory, for example, a flash memory, a hard disk drive (HDD), or a solid-state drive (SSD); or the memory may include a combination of the foregoing types of memories.

For example, in this embodiment of this application, as shown in FIG. 23*b*, the antenna having a sending/receiving function and the radio frequency circuit may be considered as a communications unit 2301 of the terminal device 2300, and the processor having a processing function may be considered as a processing unit 2302 of the terminal device 2300.

The communications unit 2301 may also be referred to as a transceiver, a transceiver machine, a transceiver apparatus, a transceiver unit, or the like, and is configured to implement a sending/receiving function. Optionally, a component that is in the communications unit 2301 and that is configured to implement a receiving function may be considered as a receiving unit, and a component that is in the communications unit 2301 and that is configured to implement a sending function may be considered as a sending unit. In other words, the communications unit 2301 includes the receiving unit and the sending unit. For example, the receiving unit may also be referred to as a receiver, a receiver circuit, or the like, and the sending unit may be referred to as a transmitter, a transmitter circuit, or the like.

In some embodiments, the communications unit 2301 and the processing unit 2302 may be integrated into one component, or may be separated into different components. In addition, the processor and the memory may be integrated into one component, or may be separated into different components.

The communications unit 2301 may be configured to perform a sending/receiving operation of the terminal device in the foregoing method embodiment. The processing unit 2302 may be configured to perform a data processing operation of the terminal device in the foregoing method embodiment.

An embodiment of this application further provides a computer-readable storage medium. The computer-readable storage medium stores instructions. When the instructions run on a processor, the method procedure in the foregoing method embodiment is implemented.

An embodiment of this application further provides a computer program product. When the computer program product runs on a processor, the method procedure of the foregoing method embodiment is implemented.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that embodiments described in this specification all belong to example embodiments, and the involved actions and modules are not necessarily required by this application.

For descriptions of the embodiments provided in this application, refer to each other. The descriptions of the embodiments have respective focuses. For a part that is not described in detail in an embodiment, refer to the related description in another embodiment. For convenience and brevity of description, for example, for functions and performed operations of the apparatuses and devices provided in the embodiments of this application, refer to the related descriptions in the method embodiments of this application. Mutual reference or combination may be also performed between the method embodiments or the apparatus embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof. Such modifications or replacements do not make the essence of the corresponding technical solutions depart from the scope of the technical solutions of the embodiments of this application.

What is claimed is:

1. A beam indication method performed by an access network device, the method comprising:
    sending configuration information to a terminal device, wherein the configuration information is used to indicate, based on a unified beam indicator, one or more beams used by the terminal device to transmit or receive a plurality of physical channels or physical signals, the plurality of physical channels or physical signals comprise one or more downlink physical channels or physical signals and one or more uplink physical channels or physical signals; and
    sending first information to the terminal device;
    wherein the first information is used to indicate the unified beam indicator;
    wherein the unified beam indicator includes a downlink transmission configuration indicator (TCI) state and an uplink TCI state;
    wherein the downlink TCI state is used to indicate a receive beam of the one or more beams for receiving the one or more downlink physical channels or physical signals, and the uplink TCI state is used to indicate a transmit beam of the one or more beams for transmitting the one or more uplink physical channels or physical signals; and
    wherein the configuration information is further used to indicate the terminal device to transmit the plurality of physical channels or physical signals based on a unified beam.

2. The method according to claim 1, wherein:
    the plurality of physical channels comprise one or more of the following: a physical downlink control channel (PDCCH), a physical downlink shared channel (PDSCH), a physical uplink shared channel (PUSCH), or a physical uplink control channel (PUCCH); and
    the physical signals comprise one or more of the following: a channel state information-reference signal (CSI-RS) or a sounding reference signal (SRS).

3. The method according to claim 1, wherein:
    the first information is downlink control information (DCI) or a medium access control-control element (MAC-CE).

4. The method according to claim 1, wherein before the configuration information is sent to the terminal device, the method further comprises:
    receiving capability information from the terminal device, wherein the capability information is used to indicate that the terminal device supports transmission of the plurality of physical channels or physical signals based on the unified beam.

5. The method according to claim 1, wherein the receive beam and the transmit beam has a same spatial transmission filter.

6. A beam indication method performed by a terminal device, the method comprising:
    receiving configuration information from an access network device, wherein the configuration informations used to indicate, based on a unified beam indicator, one or more beams used by the terminal device to transmit or receive a plurality of physical channels or physical signals, and the plurality of physical channels or physical signals comprise one or more downlink physical channels or physical signals and one or more uplink physical channels or physical signals;
    receiving first information from the access network device, wherein the first information is used to indicate the unified beam indicator; and
    determining, based on the configuration information and the unified beam indicator, the beams used by the terminal device to transmit the plurality of physical channels or physical signals, wherein:
    the unified beam indicator includes a downlink transmission configuration indicator (TCI) state and an uplink TCI state;
    the downlink TCI state is used to indicate a receive beam of the one or more beams for receiving the one or more downlink physical channels or physical signals, and the uplink TCI state is used to indicate a transmit beam of the one or more beams for transmitting the one or more uplink physical channels or physical signals; and the configuration information is further used to indicate the terminal device to transmit the plurality of physical channels or physical signals based on a unified beam.

7. The method according to claim 6, wherein:

the physical channels comprise one or more of the following: a physical downlink control channel (PDCCH), a physical downlink shared channel (PDSCH), a physical uplink shared channel (PUSCH), or a physical uplink control channel (PUCCH); and the physical signals comprise one or more of the following: a channel state information-reference signal (CSI-RS) or a sounding reference signal (SRS).

8. The method according to claim 6, wherein:

the first information is downlink control information (DCI) or a medium access control-control element (MAC-CE).

9. The method according to claim 6, wherein before the configuration information is received, the method further comprises:

sending capability information to the access network device, wherein the capability information is used to indicate that the terminal device supports transmission of the plurality of physical channels or physical signals based on the unified beam.

10. The method according to claim 6, wherein the receive beam and the transmit beam has a same spatial transmission filter.

11. A communications apparatus, comprising:

a receiver, configured to:

receive configuration information from an access network device, wherein the configuration information is used to indicate, based on a unified beam indicator, one or more beams used by a terminal device to transmit or receive a plurality of physical channels or physical signals, and the plurality of physical channels or physical signals comprise one or more downlink physical channels or physical signals and one or more uplink physical channels or physical signals; and receive first information from the access network device, wherein the first information is used to indicate the unified beam indicator; and a processor, configured to determine, based on the configuration information and the unified beam indicator, the beams used by the terminal device to transmit the plurality of physical channels or physical signals, wherein:

the unified beam indicator includes a downlink transmission configuration indicator (TCI) state and an uplink TCI state;

the downlink TCI state is used to indicate a receive beam of the one or more beams for receiving the one or more downlink physical channels or physical signals, and the uplink TCI state is used to indicate a transmit beam of the one or more beams for transmitting the one or more uplink physical channels or physical signals; and the configuration information is further used to indicate the terminal device to transmit the plurality of physical channels or physical signals based on a unified beam.

12. The communications apparatus according to claim 11, wherein:

the first information is downlink control information (DCI) or a medium access control-control element (MAC-CE).

13. The communications apparatus according to claim 11, wherein the communications apparatus is the terminal device or a chip of the terminal device.

14. The communications apparatus according to claim 11, further comprising:

a transmitter, configured to send capability information to the access network device, wherein the capability information is used to indicate that the terminal device supports transmission of the plurality of physical channels or physical signals based on the unified beam.

15. The communications apparatus according to claim 11, wherein:

the physical channels comprise one or more of the following: a physical downlink control channel (PDCCH), a physical downlink shared channel (PDSCH), a physical uplink shared channel (PUSCH), or a physical uplink control channel (PUCCH); and the physical signals comprise one or more of the following: a channel state information-reference signal (CSI-RS) or a sounding reference signal (SRS).

16. A communications apparatus, comprising:

a transmitter, configured to:

send configuration information to a terminal device, wherein the configuration information is used to indicate, based on a unified beam indicator, one or more beams used by the terminal device to transmit or receive a plurality of physical channels or physical signals, the plurality of physical channels or physical signals comprise one or more downlink physical channels or physical signals and one or more uplink physical channels or physical signals; and send first information to the terminal device;

wherein the first information is used to indicate the unified beam indicator;

wherein the unified beam indicator includes a downlink transmission configuration indicator (TCI) state and an uplink TCI state;

wherein the downlink TCI state is used to indicate a receive beam of the one or more beams for receiving the one or more downlink physical channels or physical signals, and the uplink TCI state is used to indicate a transmit beam of the one or more beams for transmitting the one or more uplink physical channels or physical signals; and wherein the configuration information is further used to indicate the terminal device to transmit the plurality of physical channels or physical signals based on a unified beam.

17. The communications apparatus according to claim 16, further comprising:

a receiver, configured to receive capability information from the terminal device, wherein the capability information is used to indicate that the terminal device supports transmission of the plurality of physical channels or physical signals based on the unified beam.

18. The communications apparatus according to claim 16, wherein:

wherein the communications apparatus is an access network device or a chip of the access network device.

19. The method according to claim 16, wherein:

the plurality of physical channels comprise one or more of the following: a physical downlink control channel (PDCCH), a physical downlink shared channel (PDSCH), a physical uplink shared channel (PUSCH), or a physical uplink control channel (PUCCH); and the physical signals comprise one or more of the following: a channel state information-reference signal (CSI-RS) or a sounding reference signal (SRS).

20. The method according to claim 16, wherein:
the first information is downlink control information (DCI) or a medium access control-control element (MAC-CE).

\* \* \* \* \*